(12) United States Patent
Kim et al.

(10) Patent No.: US 9,931,011 B2
(45) Date of Patent: Apr. 3, 2018

(54) CLEANING ROBOT AND METHOD FOR CONTROLLING THE SAME

(71) Applicant: SAMSUNG ELECTRONICS CO., LTD., Suwon-si, Gyeonggi-do (KR)

(72) Inventors: In Joo Kim, Suwon-si (KR); Jeong Ki Yoo, Suwon-si (KR); Dong Hyun Lee, Suwon-si (KR); Dong Hun Lee, Ansan-si (KR); Jin Sung Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/297,432

(22) Filed: Oct. 19, 2016

(65) Prior Publication Data

US 2017/0035263 A1    Feb. 9, 2017

Related U.S. Application Data

(63) Continuation of application No. 14/531,511, filed on Nov. 3, 2014, now Pat. No. 9,504,367.

(Continued)

(30) Foreign Application Priority Data

Nov. 20, 2013  (KR) .................. 10-2013-0141033
Sep. 3, 2014   (KR) .................. 10-2014-0116768

(51) Int. Cl.
*A47L 11/40*   (2006.01)
*A47L 11/282*  (2006.01)
(Continued)

(52) U.S. Cl.
CPC ......... *A47L 11/4011* (2013.01); *A47L 11/282* (2013.01); *A47L 11/283* (2013.01);
(Continued)

(58) Field of Classification Search
CPC .. G05D 1/0214; G05D 1/0217; G05D 1/0242; G05D 1/0246; G05D 1/0255;
(Continued)

(56) References Cited

U.S. PATENT DOCUMENTS 4,719,659 A * 1/1988 Urakami ................. A47L 11/16
                                                15/49.1
4,845,798 A * 7/1989 Genovese ............. A47L 11/162
                                                15/98

(Continued)

FOREIGN PATENT DOCUMENTS

JP    9-299298      11/1997
JP    2000-202792    7/2000

(Continued)

OTHER PUBLICATIONS

International Search Report dated Mar. 4, 2015 for corresponding International Patent Application No. PCT/KR2014/011214.

(Continued)

*Primary Examiner* — Khoi H Tran
*Assistant Examiner* — Robert Nguyen
(74) *Attorney, Agent, or Firm* — Staas & Halsey LLP

(57) ABSTRACT

A cleaning robot includes a main body; a plurality of pad assemblies mounted on the bottom of the main body for doing cleaning; a drive assembly for applying drive power for each of the plurality of pad assemblies; and a detection unit for detecting an obstacle. The drive assembly adjusts slopes of the plurality of pad assemblies individually based on the height of the obstacle.

25 Claims, 60 Drawing Sheets

Related U.S. Application Data

(60) Provisional application No. 61/984,974, filed on Apr. 28, 2014.

(51) Int. Cl.
*G05D 1/02* (2006.01)
*A47L 11/283* (2006.01)

(52) U.S. Cl.
CPC ....... *A47L 11/4038* (2013.01); *A47L 11/4061* (2013.01); *A47L 11/4069* (2013.01); *A47L 11/4083* (2013.01); *G05D 1/024* (2013.01); *G05D 1/0217* (2013.01); *G05D 1/0238* (2013.01); *G05D 1/0242* (2013.01); *G05D 1/0246* (2013.01); *G05D 1/0255* (2013.01); *G05D 1/0274* (2013.01); *A47L 2201/022* (2013.01); *A47L 2201/04* (2013.01); *A47L 2201/06* (2013.01); *G05D 2201/0203* (2013.01); *Y10S 901/01* (2013.01)

(58) Field of Classification Search
CPC .......... G05D 1/0274; G05D 2201/0203; Y10S 901/01; A47L 2201/04; A47L 11/282; A47L 11/283; A47L 11/4011; A47L 11/4038; A47L 11/4061; A47L 11/4069; A47L 11/4083
See application file for complete search history.

(56) References Cited

U.S. PATENT DOCUMENTS

| | | | | |
|---|---|---|---|---|
| 5,161,631 A | * | 11/1992 | Urakami | B24C 3/06 180/164 |
| 6,280,292 B1 | * | 8/2001 | Sato | B23Q 11/0032 451/10 |
| 9,265,396 B1 | * | 2/2016 | Lu | A47L 9/0673 |
| 2004/0088080 A1 | | 5/2004 | Song | |
| 2007/0060024 A1 | * | 3/2007 | Shirasu | B24B 37/30 451/41 |
| 2012/0232738 A1 | | 9/2012 | Jeon | |
| 2014/0124004 A1 | * | 5/2014 | Rosenstein | A47L 9/2852 134/18 |
| 2014/0127975 A1 | * | 5/2014 | Roy | A47L 11/16 451/28 |
| 2015/0166060 A1 | * | 6/2015 | Smith | B60W 30/09 701/23 |

FOREIGN PATENT DOCUMENTS

| | | |
|---|---|---|
| KR | 10-2007-0091718 | 9/2007 |
| KR | 10-2008-0091042 | 10/2008 |
| KR | 20080091042 | 10/2008 |
| KR | 10-2013-0031607 | 3/2013 |
| WO | WO 2012/086604 A1 | 6/2012 |

OTHER PUBLICATIONS

U.S. Office Action dated Feb. 5, 2016 from U.S. Appl. No. 14/531,511.
U.S. Office Action dated Mar. 25, 2016 from U.S. Appl. No. 14/531,511.
U.S. Office Action dated Aug. 2, 2016, 2016 from U.S. Appl. No. 14/531,511.
U.S. Appl. No. 14/531,511, filed Nov. 3, 2014, In Joo Kim, Samsung Electronics Co., Ltd.
Partial Supplementary European Search Report dated Aug. 2, 2017 in European Application No. 14863108.8.
Extended European Search Report dated Nov. 7, 2017 in corresponding European Patent Application No. 14863108.8, 12 pages.

* cited by examiner

FIG. 18
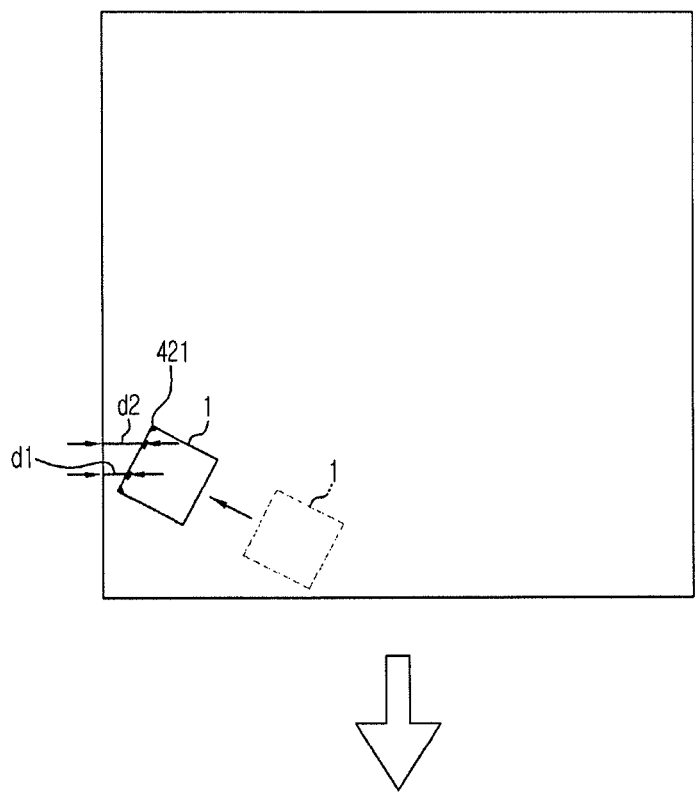
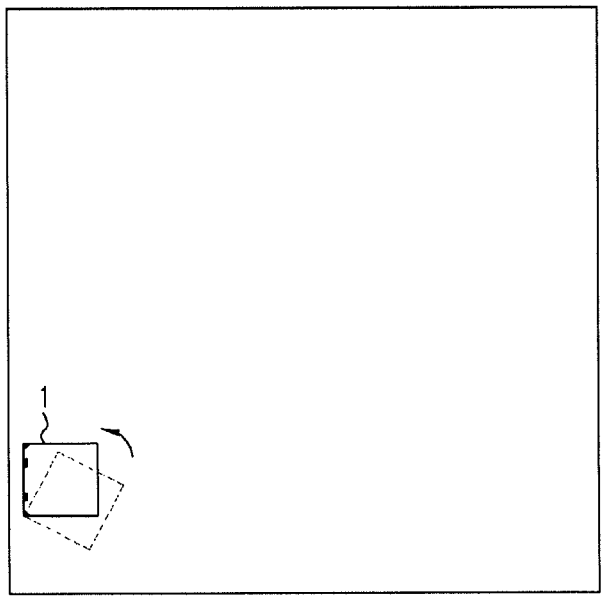

CLEANING ROBOT AND METHOD FOR CONTROLLING THE SAME

CROSS-REFERENCE TO RELATED APPLICATIONS

This application is a divisional of U.S. application Ser. No. 14/531,511 filed on Nov. 3, 2014, which claims the benefit of Korean Patent Applications Nos. 10-2013-0141033 and 10-2014-0116768 filed on Nov. 20, 2013 and Sep. 3, 2014, respectively, in the Korean Intellectual Property Office, and of U.S. Provisional Patent Application No. 61/984,974, filed on Apr. 28, 2014 in the US Patent and Trademark Office, the disclosures of which are incorporated herein by reference.

BACKGROUND

1. Field

Embodiments of the present disclosure relate to a cleaning robot to achieve enhanced movement performance and a control method for the same.

2. Description of the Related Art

A cleaning robot is an apparatus that automatically cleans a region to be cleaned (hereinafter referred to as a cleaning region) by suctioning impurities, such as dust, etc., from a floor while autonomously moving about the cleaning region without user intervention.

Such a cleaning robot repeatedly implements cleaning using cleaning tools while moving about a cleaning region using two parallel wheels rotatably mounted at the bottom of a main body. During implementation of cleaning, the cleaning robot senses an obstacle or a wall located in the cleaning region via a variety of sensors, etc., and controls a cleaning motion and movement route thereof based on the sensed result.

A typical cleaning robot is devised to clean a floor by suctioning dust from the floor in a dry manner. The cleaning robot to implement cleaning in a dry manner moves about a cleaning region in a zigzag or spiral pattern, to achieve efficient cleaning within the shortest duration.

However, when implementing cleaning in a dry manner, impurities adhered to the floor or impurities beyond a given size may not be suctioned and remain on the floor even after termination of cleaning.

Accordingly, in addition to the cleaning robot that enables dry cleaning by suctioning dust, a cleaning robot that enables wet cleaning by wiping a floor with water using a pad mounted to the bottom of a main body has recently been developed.

The cleaning robot to implement cleaning in a wet manner is devised to move about a cleaning space in a curvilinear pattern that imitates a human wiping motion, to enhance cleaning efficiency.

During cleaning, movement of the cleaning robot about a cleaning region is accomplished using two wheels. In this case, the two wheels may be rotated at a uniform velocity to achieve straight movement of the cleaning robot, or may be rotated at different velocities to rotate a main body by a selected angle for change of a movement direction of the cleaning robot.

That is, the cleaning robot may implement cleaning while moving about a cleaning space in a curvilinear pattern that ensures free change in the orientation of the main body based on rotation of the main body.

The above-described cleaning robot, however, may need angular rotation of the main body during curvilinear movement. In particular, with regard to a curvilinear movement pattern that needs great angular rotation of the main body, slower movement and extended cleaning time may occur. In addition, the cleaning robot may have a limit to rotate within a radius of the main body during curvilinear movement.

SUMMARY

Therefore, it is one aspect to provide a cleaning robot, which acquires vector information using current position information and target position information, and implements movement and cleaning using the acquired vector information, and a control method for the same.

It is another aspect to provide a cleaning robot, which detects an obstacle using a plurality of obstacle detectors provided at respective faces of a main body and adjusts friction applied to a plurality of pad assemblies based on the obstacle detection result to change a movement direction thereof, and a control method for the same.

It is a further aspect to provide a cleaning robot, which detects a stain on a floor using a stain detector and changes a movement pattern and a cleaning strength based on the stain detection result, and a control method for the same.

Additional aspects of the disclosure will be set forth in part in the description which follows and, in part, will be apparent from the description, or may be learned by practice of the disclosure.

In accordance with one aspect, a cleaning robot includes a main body, a pad mounted below the main body to implement cleaning, and a drive assembly to apply drive power to the pad, wherein the drive assembly moves the main body to a target position by adjusting the drive power.

The drive power may be based on an application direction and application position of friction to be applied to the pad coming into contact with a floor.

The drive assembly may include a position variable member to vary a contact position of the pad coming into contact with a floor to be cleaned, and a rotation variable member to rotate the pad about a rotation axis.

The position variable member may vary friction between the pad and the floor by adjusting a tilting angle of the pad.

The position variable member may include a first drive member to tilt the pad in a first direction, and a second drive member to tilt the pad in a second direction perpendicular to the first direction.

The first drive member may include a first rotating member to rotate the pad in a first direction, and a first motor connected to the first rotating member to apply torque to the first rotating member.

The second drive member may include a second rotating member to rotate the pad in a direction perpendicular to the first direction, and a second motor to apply torque to the second rotating member.

The cleaning robot may further include a controller to control the drive assembly by determining a contact position of the pad coming into contact with the floor and a rotation direction of the pad to move the main body to the target position.

The pad may include a first pad and a second pad, and the drive assembly may include a first drive assembly to drive the first pad and a second drive assembly to drive the second pad.

The controller may control the first drive assembly and the second drive assembly respectively such that friction is applied to the first pad and the second pad in opposite directions when the main body implements motion in place.

The controller may control the first drive assembly and the second drive assembly respectively such that friction is applied to the first pad and the second pad in a direction opposite to a forward movement direction when the main body implements forward movement.

The controller may control the first drive assembly and the second drive assembly respectively such that friction is applied to the first pad and the second pad in a direction opposite to a lateral movement direction when the main body implements lateral movement.

The controller may control the first drive assembly and the second drive assembly respectively such that friction is applied to the first pad and the second pad in a direction opposite to a diagonal movement direction when the main body implements diagonal movement.

The pad may include a first pad, a second pad, a third pad, and a fourth pad, and the drive assembly may include a first drive assembly to drive the first pad, a second drive assembly to drive the second pad, a third drive assembly to drive the third pad, and a fourth drive assembly to drive the fourth pad.

The third drive assembly may include a rotation variable member to rotate the third pad about a rotation axis, and the fourth drive assembly may include a rotation variable member to rotate the fourth pad about a rotation axis.

The controller may acquire spatial information of a cleaning region based on map information, produce a movement route and movement pattern based on the spatial information of the cleaning region, and control the main body to move the main body based on the movement route and movement pattern.

The controller may divide the cleaning region into a plurality of cells, and produce the movement route and movement pattern based on information regarding the cells.

The movement pattern may include a curvilinear pattern, a diameter of which is less than a length of the main body.

The cleaning robot may further include a position detector to detect a position of the main body, and the controller may judge whether or not to change a movement direction based on information regarding a current position of the main body and a target cleaning position, and control the drive assembly to change a contact position and a rotation direction of the pad when changing a movement direction.

The cleaning robot may further include an obstacle detector to detect an obstacle in a cleaning region, and the controller may judge whether or not wall following is necessary to acquire map information of a cleaning region, detect a wall using the obstacle detector upon judging that wall following is necessary, and rotate the main body to follow the detected wall using the drive assembly for the pad such that a direction of a boundary of the detected wall coincides with a movement direction of the main body.

The cleaning robot may further include an obstacle detector to detect an obstacle in a cleaning region, and the controller may change a movement route or a movement pattern when the obstacle is detected.

The cleaning robot may further include a stain detector to detect a stain on the floor, and the controller may change a movement route or a movement pattern when the stain is detected.

The controller may vary the movement pattern or friction between the pad and the floor by adjusting a tilting angle of the pad based on the size of the stain detected by the stain detector.

In accordance with another aspect, a cleaning robot includes a main body, a plurality of pads mounted below the main body to implement cleaning, and a plurality of drive assemblies to drive the respective pads, wherein the drive assemblies move the main body to a target position by adjusting application positions and application directions of friction to be applied to the pads respectively.

The cleaning robot may further include a controller to control the drive assemblies by determining contact positions of the pads coming into contact with a floor and rotation directions of the pads based on the application positions and application directions of friction.

The controller may acquire a movement distance and a movement direction based on target position information and current position information of the main body, acquire vector information based on the acquired movement distance and movement direction, and control movement of the main body based on the vector information.

The controller may adjust the application directions and application positions of friction while maintaining the attitude of the main body during movement.

The cleaning robot may further include a plurality of obstacle detectors mounted to front, rear, left and right faces of the main body to detect an obstacle in a cleaning region, and the controller may control operation of the obstacle detectors mounted to the faces corresponding respectively to a direction in which the obstacle is detected and a movement direction.

In accordance with a further aspect, a control method for a cleaning robot, includes checking a target position, determining gradients and rotation directions of a plurality of pads mounted below a main body based on the target position respectively, and moving the main body to the target position by adjusting the pads to the determined gradients and operating the pads in the determined rotation directions.

The determining may include checking information regarding the target position and information regarding a current position, acquiring a movement distance and a movement direction of the main body based on the checked current position information and target position information, determining application positions and application directions of friction between the pads and a floor based on the movement distance and movement direction, and determining the gradients and rotation directions of the pads based on the application positions and application directions of friction.

The control method may further include judging whether or not a point in time to change a movement direction arrives based on information regarding the target position, and changing positions of contact portions of the pads, to which friction is applied, and application directions of friction by controlling the respective drive assemblies applying drive power to the pads upon judging that a point in time to change a movement direction arrives.

The changing may include changing the application directions and application positions of friction while maintaining the attitude of the main body.

The acquiring may include acquiring vector information using the movement distance and movement direction of the main body.

The control method may further include judging whether or not wall following is necessary to acquire map information of a cleaning region, detecting a wall using an obstacle detector upon judging that wall following is necessary, rotating the main body using friction of the pads such that a movement direction of the main body coincides with a direction of a boundary of the detected wall, and following the detected wall using friction of the pads.

The control method may further include changing friction application positions and application directions of the pads based on a direction of the wall at the front when the wall at the front is detected during wall following, and redetecting a wall in the surroundings using the obstacle detector upon judging that a wall that the cleaning robot is following is not detected based on detection signals of the obstacle detector during wall following, and changing friction application positions and application directions of the pads based on a position of the redetected wall.

Implementing movement and cleaning may include acquiring spatial information of a cleaning region based on map information, dividing the cleaning region into a plurality of cells based on the spatial information of the cleaning region, producing a movement route and a movement pattern based on information regarding the cells, and implementing cleaning and movement while changing friction application positions and application directions of the pads based on the movement route and movement pattern.

The control method may further include detecting an obstacle while implementing cleaning and movement, and changing the movement route and movement pattern when the obstacle is detected.

The control method may further include detecting a stain on a floor while implementing cleaning and movement, and changing the movement pattern when the stain is detected.

The control method may further include increasing the magnitude of friction when the stain is detected.

The control method may further include determining a strength of cleaning based on a cleaning mode, and adjusting the magnitude of friction based on the determined strength of cleaning.

In accordance with a further aspect, a cleaning robot includes a main body; a plurality of pad assemblies mounted on the bottom of the main body for doing cleaning; a drive assembly for applying drive power for each of the plurality of pad assemblies; and a detection unit for detecting an obstacle, wherein the drive assembly adjusts slopes of the plurality of pad assemblies individually based on the height of the obstacle.

The drive assembly may adjust a tilting angle of at least one pad assembly toward a vertical direction based on the horizontal width of the obstacle.

The tilting angle toward the vertical direction may be greater than a tilting angle of a pad assembly for flat ground movement.

The detection unit may include an image capturer for capturing an image of a cleaning region, and the drive assembly may recognize an obstacle based on the captured image and determine the height of the obstacle.

The detection unit may include a first detector for detecting whether there is an obstacle; and a second detector for detecting the height of the obstacle.

The first detector may include a load detector for detecting an amount of load applied to the pad assembly.

The second detector may be an infrared (IR) sensor, a laser sensor, or an ultrasonic sensor.

The drive assembly may perform avoidance movement if the height of the obstacle exceeds a reference height.

The drive assembly may change a moving direction by individually adjusting positions and directions to which frictional forces applied to the plurality of pad assemblies are applied.

The drive assembly may adjust the tilting angle of a pad assembly adjacent to the obstacle to a certain angle if the height of the obstacle is less than a reference height and individually adjust positions and directions to which frictional forces applied to the remaining pad assemblies are applied, thereby applying a movement force to the main body.

In accordance with a further aspect, a cleaning robot includes a main body; a plurality of pad assemblies mounted on the bottom of the main body for doing cleaning; a drive assembly for applying drive power for each of the plurality of pad assemblies; and a detection unit for detecting a stepped part, wherein the drive assembly adjusts the slope of at least one pad assembly based on the height of the stepped part and adjusts positions and directions to which frictional forces applied to the remaining pad assemblies are applied, thereby enabling the main body to move along the stepped part.

The drive assembly may adjust a tilting angle of the at least one pad assembly to a predetermined maximum tilting angle.

The drive assembly may adjust a tilting angle of the at least one pad assembly to an angle that corresponds to the height of the stepped part.

The drive assembly may control rotation of the at least one pad assembly such that a frictional force is applied to the at least one pad assembly, if the at least one pad assembly is located on the top of the stepped part.

The drive assembly may adjust a tilting direction of the at least one pad assembly to a first direction if the stepped part leads to a surface higher than a floor, and to a second direction if the stepped part leads to a surface lower than the floor, the first and second directions being opposite to each other.

The drive assembly may control the plurality of pad assemblies to avoid the stepped part, if the height of the stepped part is greater than a reference height.

In accordance with a further aspect, a method for controlling a cleaning robot includes determining a target position; determining slopes and turning directions of a plurality of pad assemblies mounted on the bottom of a main body of the cleaning robot, based on the target position; controlling the plurality of pad assemblies to have the determined slopes and rotate in the determined turning directions, thus enabling the main body to move to the target position in a flat ground movement mode; detecting an obstacle in the flat ground movement mode; controlling the slope of at least one of the plurality of pad assemblies based on the height of the detected obstacle; and adjusting positions and directions to which frictional forces applied to remaining pad assemblies are applied, thereby enabling the main body to move along the obstacle.

The slope of the at least one pad assembly may be greater than any of the slopes of the remaining pad assemblies.

Detecting an obstacle may include capturing an image in front of the cleaning robot; and recognizing an obstacle from the captured image.

Detecting an obstacle may include detecting amounts of load applied to the plurality of pad assemblies; and recognizing an obstacle based on the detected amounts of load.

The method may further include performing avoidance movement if the height of the obstacle exceeds a reference height.

Performing avoidance movement may include changing a moving direction by individually adjusting positions and directions to which frictional forces applied to the plurality of pad assemblies are applied.

Controlling the slope of at least one of the plurality of pad assemblies may include controlling the at least one pad assembly to have a predetermined maximum tilting angle.

Controlling the slope of at least one of the plurality of pad assemblies may include determining the height of a stepped part; determining an angle that corresponds to the height of the stepped part; and controlling the at least one pad assembly to have the determined angle.

The method may further include controlling rotation of the at least one pad assembly such that a frictional force is applied to the at least one pad assembly, if the at least one pad assembly is located on the top of the stepped part.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 18 to 21 are views illustrating wall following of the cleaning robot according to the embodiment;

DETAILED DESCRIPTION

Figure 1:
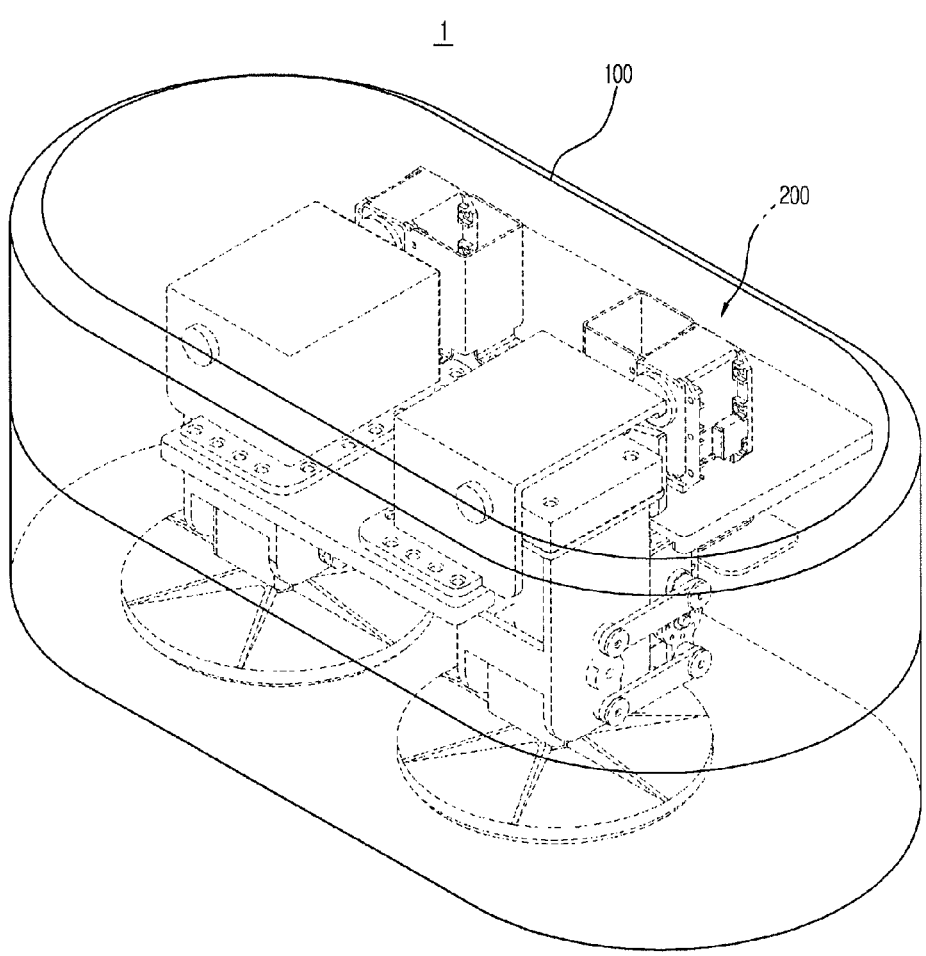
FIG. 1 is a perspective view of a cleaning robot according to one embodiment.

Reference will now be made in detail to the embodiments of the present disclosure, examples of which are illustrated in the accompanying drawings, wherein like reference numerals refer to like elements throughout.

Figure 2:
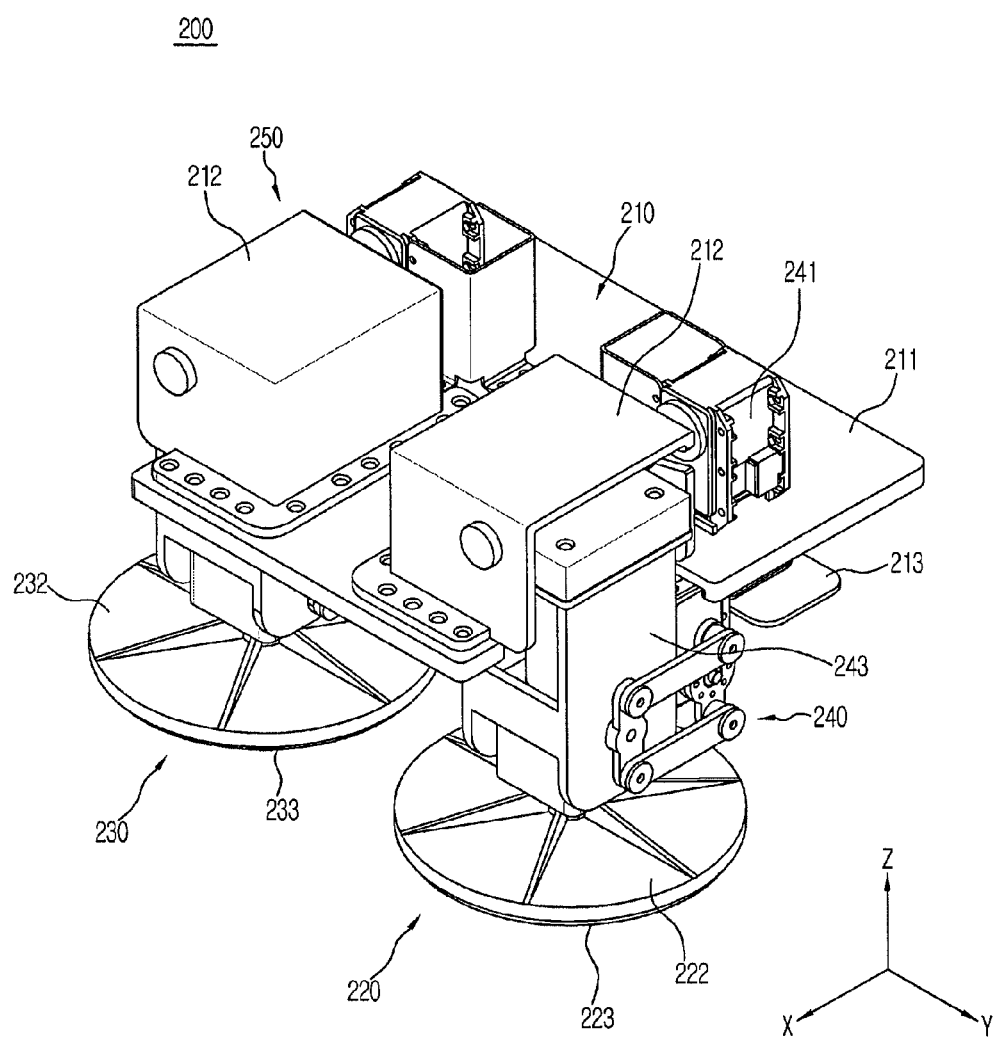
FIG. 2 is a perspective view illustrating a main body of the cleaning robot according to the one embodiment.

FIG. 1 is a perspective view of a cleaning robot according to one embodiment, FIG. 2 is a perspective view illustrating a main body of the cleaning robot according to the one embodiment, and FIG. 3 is an exploded perspective view of a first pad assembly and a first drive assembly included in the cleaning robot according to the one embodiment.

The cleaning robot, designated by reference numeral 1, is devised to implement cleaning by wiping impurities, such as dust, on a floor while autonomously moving about a cleaning region at home when a user inputs a cleaning instruction or when a reserved cleaning time arrives.

Then, when the user inputs a cleaning end instruction, when completion of cleaning is judged, or when the charge rate of a battery becomes less than a reference value, the cleaning robot 1 implements docking with a charger (not shown) and after docking is completed, implements charging by receiving power from the charger (not shown).

As exemplarily shown in FIG. 1, the cleaning robot 1 includes a housing 100 defining an external appearance of the cleaning robot 1, and a main body 200 accommodated in the housing 100 for movement and cleaning of the cleaning robot 1.

As exemplarily shown in FIG. 2, the main body 200 includes a frame 210, at least two pad assemblies 220, 230 mounted below the frame 210 so as to come into contact with and be separable from a floor, and at least two drive assemblies 240, 250 coupled to the respective pad assemblies 220, 230 to drive the pad assemblies 220, 230.

Here, the frame 210 includes a main frame 211, and a plurality of auxiliary frames 212 mounted on the main frame 211, the first and second drive assemblies 240, 250 being rotatably coupled to the respective auxiliary frames 212 so as to be partially covered with the auxiliary frames 212.

The frame 210 further includes a support frame 213 extending from the main frame 211 to the floor so as to come into contact with the floor. Thereby, the support frame 213 serves to support the main frame 211.

Specifically, the support frame 213 ensures stable movement of the main body 200 on the floor without shaking, despite rotation of the pad assemblies 220, 230.

The pad assemblies 220, 230 are adapted to come into contact with the floor or to be separated from the floor.

When coming into contact with the floor, the pad assemblies 220, 230 partially or wholly come into contact with the floor, and assist the main body 200 in moving about a cleaning region or cleaning the floor via adjustment of a contact surface area between each pad member and the floor and a contact direction. In addition, the pad assemblies 220, 230 may simultaneously implement movement and cleaning.

In the present embodiment, the pad assemblies include a first pad assembly 220 and a second pad assembly 230 arranged in parallel to each other below the frame 210, and the drive assemblies include a first drive assembly 240 to drive the first pad assembly 220 and a second drive assembly 250 to drive the second pad assembly 230.

The first and second pad assemblies 220, 230 have the same configuration, and likewise, the first and second drive assemblies 240, 250 have the same configuration.

Accordingly, hereinafter, the first pad assembly 220 among the first and second pad assemblies 220, 230 will be described by way of example, and the first drive assembly 240 among the first and second drive assemblies 240, 250 will be described by way of example.

Figure 3A:
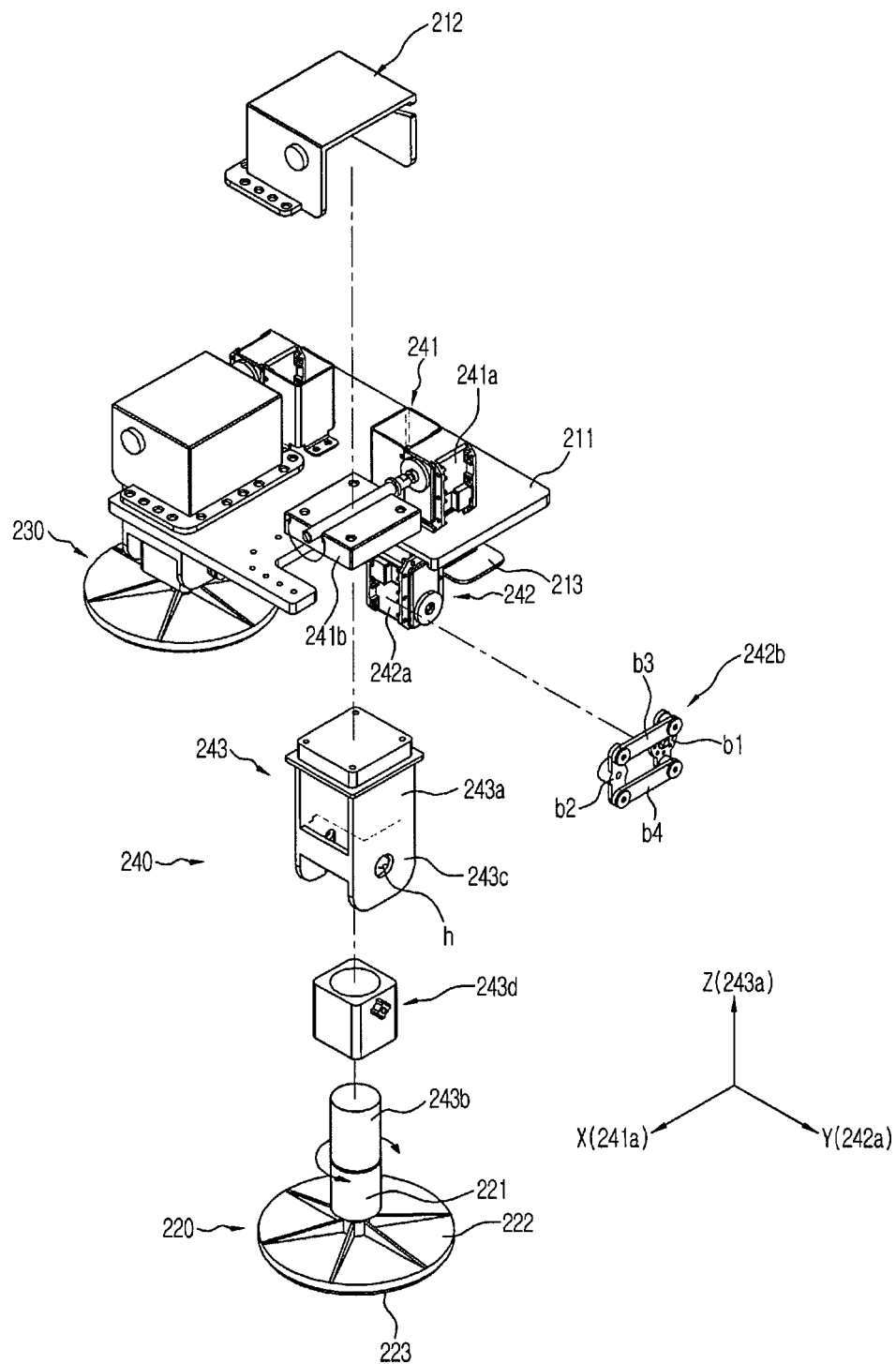
FIG. 3A is an exploded perspective view of a first pad assembly and a first drive assembly included in the cleaning robot according to the one embodiment.
Figure 3B:
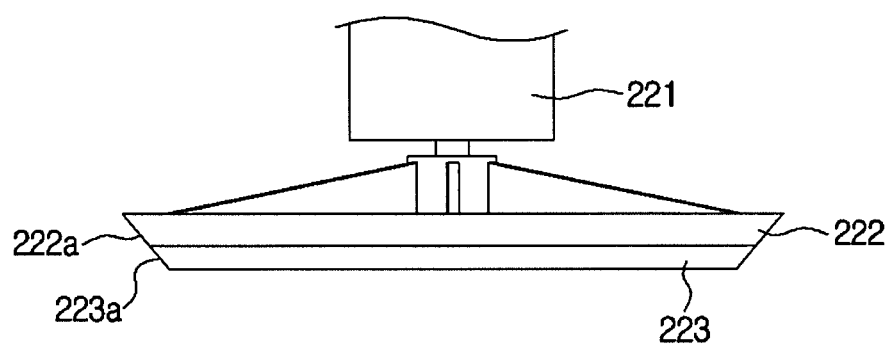
FIG. 3B is a view illustrating a first pad assembly included in the cleaning robot, according to the embodiment.

As exemplarily shown in FIGS. 3A and 3B, the first pad assembly 220 includes a coupling member 221 coupled to the first drive assembly 240, a rotating plate 222 mounted to the coupling member 221, and a pad member 223 separably mounted to the rotating plate 222.

Here, the pad member 223 is formed of a fiber material to enable wet cleaning.

The first drive assembly 240 includes a first drive member 241 mounted to an upper surface of the main frame 211 to rotate the rotating plate 222 of the first pad assembly 220 about the X-axis, a second drive member 242 mounted to a lower surface of the main frame 211 to rotate the rotating plate 222 of the first pad assembly 220 about the Y-axis, and a third drive member 243 connected to the first drive member 241 and the second drive member 242 so as to be rotatable about the X-axis and the Y-axis, the third drive member 243 serving to rotate the rotating plate 222 of the first pad assembly 220 about the Z-axis.

Specifically, the first drive member 241 and the second drive member 242 serve as position variable members that vary a position of the pad member coming into contact with the floor, and implement a tilting motion of the pad member. The third drive member 243 serves as a rotation variable member to vary, e.g., a rotation direction and revolutions per minute of the pad member.

The first drive member 241 includes a first motor 241a to generate X-axis torque required to rotate the rotating plate 222 of the first pad assembly 220 about the X-axis, and a first rotating member 241b connected to a rotating shaft of the first motor 241a.

The second drive member 242 includes a second motor 242a to generate Y-axis torque required to rotate the rotating plate 222 of the first pad assembly 220 about the Y-axis, and a second rotating member 242b connected to a rotating shaft of the second motor 242a.

Here, the second rotating member 242b includes a first link b1, a second link b2, a third link b3, and a fourth link b4, distal ends of which are connected to one another.

The third drive member 243 includes a third motor 243a to generate Z-axis torque required to rotate the rotating plate 222 of the first pad assembly 220 about the Z-axis, and a third rotating member 243b connected to a rotating shaft of the third motor 243a. The third drive member 243 further includes a first connection member 243c in which the third motor 243a and the third rotating member 243b are received, and a second connection member 243d received in the first connection member 243c. One face of the first connection member 243c is coupled to the first rotating member 241b of the first drive member 241, and the coupling member 221 of the first pad assembly 220 is coupled to the first connection member 243c. The second connection member 243d is coupled to the second rotating member 242b of the second drive member 242 through a hole h formed in the first connection member 243c.

The first drive assembly 240 may control the pad member 223 of the first pad assembly 220 so as to be tilted relative to the floor by a set angle by driving the first motor 241a and the second motor 242a. In addition, the first drive assembly 240 may control clockwise or counterclockwise rotation of the first pad assembly 220 by driving the third motor 243a.

In addition, the first drive assembly 240 may vary a portion of the pad member 223 of the first pad assembly 220 coming into contact with the floor using the first motor 241a, the second motor 242a, and the third motor 243a, which allows the pad member 223 to move about a cleaning region and clean the floor.

In the same manner as the first drive assembly 240, the second drive assembly 250 may vary a portion of a pad member 233 of the second pad assembly 230 coming into contact with the floor, which allows the pad member 233 to move about a cleaning region and clean the floor.

The main body 200 further includes a plurality of obstacle detectors (not shown) provided at the main frame 211 to detect obstacles in the surroundings.

In addition, the cleaning robot 1 may further include a stain detector (not shown) provided at the housing 100 or the main body 200 to detect stains on the floor.

Referring to FIG. 3B, the first pad assembly 220 included in the cleaning robot includes a coupling member 221 coupled to the first drive assembly 240, a rotating plate 222 mounted to the coupling member 221, and a pad member 223 separably mounted to the rotating plate 222.

The rotating plate 222 has sloped side 222a with the bottom narrower than the top.

The sloped side 222a is tilted at a certain angle.

The pad member may also have sloped side 223a with the bottom narrower than its top.

The sloped side 223a is tilted at a certain angle.

This enables the cleaning robot to easily climb over a low obstacle when the cleaning robot runs across the obstacle while moving around an even ground.

Figure 4:
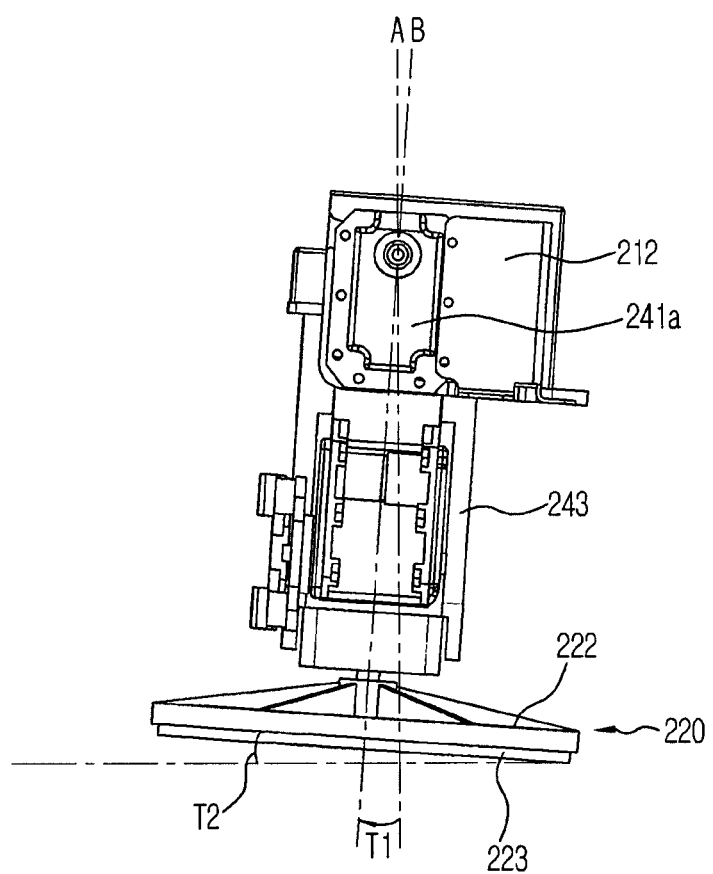
FIG. 4 is a view illustrating rotation of the first pad assembly of the cleaning robot about the X-axis according to the one embodiment.
Figure 5:
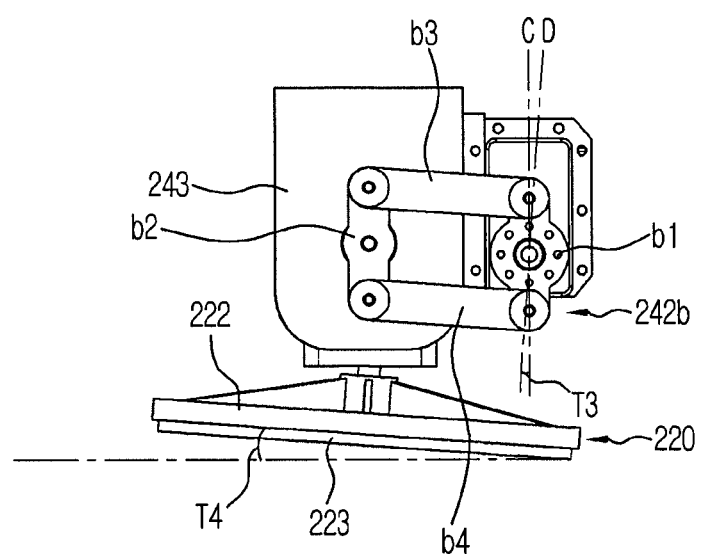
FIG. 5 is a view illustrating rotation of the first pad assembly of the cleaning robot about the Y-axis according to the one embodiment.

FIG. 4 is a view illustrating rotation of the first pad assembly of the cleaning robot about the X-axis according to the one embodiment, and FIG. 5 is a view illustrating rotation of the first pad assembly of the cleaning robot about the Y-axis according to the one embodiment.

As exemplarily shown in FIG. 4, when the rotating shaft of the first motor 241a is rotated clockwise or counterclockwise about the X-axis via driving of the first motor 241a, the first rotating member 241b coupled to the rotating shaft of the first motor 241a, the first connection member 243c, the second connection member 243d, and the third rotating member 243d are rotated thereby.

A first line A as a center axis of the first pad assembly 220 before rotation of the rotating shaft of the first motor 241a and a second line B as a center axis of the first pad assembly 220 after rotation of the rotating shaft of the first motor 241a form a first angle T1. In this case, a lower surface of the rotating plate 222 of the first pad assembly 220 and the floor form a second angle T2.

Here, the first angle T1 refers to a rotation angle of the rotating shaft of the first motor 241a may be equal to the second angle T2 between the lower surface of the rotating plate 222 and the floor. As described above, the rotating plate 222 may be rotated about the X-axis.

As exemplarily shown in FIG. 5, when the rotating shaft of the second motor 242a is rotated via driving of the second motor 242a, the first link b1 connected to the rotating shaft of the second motor 242a is rotated thereby. As the first link b1 is rotated, the second link b2 connected to the first link b1 via the third link b3 and the fourth link b4 is rotated in the same direction as a rotation direction of the first link b1.

Thereby, lines C and D, which connect a contact point of the first link b1 and the third link b3 and a contact point of the first link b1 and the fourth link b4 to each other before and after rotation of the rotating shaft of the second motor 242a, form a third angle T3. Likewise, lines, which connect a contact point of the second link b2 and the third link b3 and a contact point of the second link b2 and the fourth link b4 to each other before and after rotation of the rotating shaft of the second motor 242a, form the third angle T3.

As the second link b2 of the second rotating member 242b is rotated, the third connection member 243 connected to the second link b2 and the first pad assembly 220 are rotated.

Thereby, the lower surface of the rotating plate 222 of the first pad assembly 220 and the floor form a fourth angle T4.

Here, the third angle T3 and the fourth angle T4 may be equal to each other. As described above, the rotating plate 222 of the first pad assembly 220 may be rotated about the Y-axis.

In this way, as a result of tilting the rotating plate 222 of the first pad assembly 220 relative to the floor, the cleaning robot 1 may generate uneven friction between the pad member 223 mounted to the lower surface of the rotating plate 222 and the floor.

The first pad assembly 220 is rotated by the third rotating member 243b connected to the coupling member 221 defining a center axis thereof. As such, the rotating plate 222 may be rotated about the Z-axis.

In addition, the rotating plate 222 may be rotated by the first motor 241a and the second motor 242a in a state in which the rotating plate 222 is tilted relative to the floor by a set angle. The first motor 241a and the second motor 242a may adjust a tilting direction of the rotating plate 222 relative to the floor, and may also adjust a contact surface area of the pad member 223 mounted to the lower surface of the rotating plate 222 when the pad member 223 comes into contact with the floor.

The pad member 223 of the first pad assembly 220 may have different friction based on a tilting angle of the rotating plate 222.

More specifically, friction between the pad member 223 and the floor at a position where the rotating plate 222 is close to the floor is greater than friction between the pad member 223 and the floor at a position where the rotating plate 222 is distant from the floor. A movement direction and movement speed of the cleaning robot 1 may be adjusted using difference in friction between the pad member 223 and the floor.

The cleaning robot 1 as described above may move in a direction in which friction between the pad member 223 and the floor is great. Great friction between the pad member 223 and the floor means that friction for movement of the cleaning robot 1 is great. Thus, the cleaning robot 1 may achieve an increased movement speed.

The pad member 223 mounted to the lower surface of the rotating plate 222 may be formed of a compressible material to ensure that the entire surface of the pad member 223 comes into contact with the floor despite tilting of the rotating plate 222.

In this case, a portion of the pad member 223 having great friction with the floor will exert great floor wiping force, and thus provide enhanced cleaning efficiency sufficient to even remove stains from the floor.

The cleaning robot 1 may implement cleaning while moving in a set direction based on a position where the pad member 223 comes into contact with the floor or based on a rotation direction of the rotating plate 222 or the pad member 223 about the Z-axis.

More specifically, a movement direction of the cleaning robot 1 may vary based on relative positions where the pad member 223 of the first pad assembly 220 and the pad member 233 of the second pad assembly 230 come into contact with the floor, and may also vary based on rotation directions of the pad member 223 of the first pad assembly 220 and the pad member 233 of the second pad assembly 230 about the Z-axis.

For example, even if the pad member 223 of the first pad assembly 220 and the pad member 233 of the second pad assembly 230 come into contact with the floor at the same position, the cleaning robot 1 may have different movement directions between clockwise rotation and counterclockwise rotation of the two pad members 223 and 233.

When friction between the pad members 223, 233 of the first and second pad assemblies 220, 230 and the floor serves as force to move the cleaning robot 1 as described above, the cleaning robot 1 may move with less restriction due to materials of the floor or obstacles than a cleaning robot that moves using wheels.

In addition, the cleaning robot 1 may move in all selected directions based on adjustment of tilting angles and tilting directions of the rotating plates 222, 232 of the first and second pad assemblies 220, 230 and rotation directions of the pad members 223, 233.

That is, the cleaning robot 1 is omni-directionally movable without rotation of the main body 200. In the following description, movement of the cleaning robot 1 will be described based on any one point designated as a front face of the main body 200.

Configurations with regard to control of a movement direction of the above-described cleaning robot 1 will hereinafter be described with reference to FIGS. 6A, 6B, 7A, 7B, 8A, 8B, 9A and 9B.

Figure 6A:
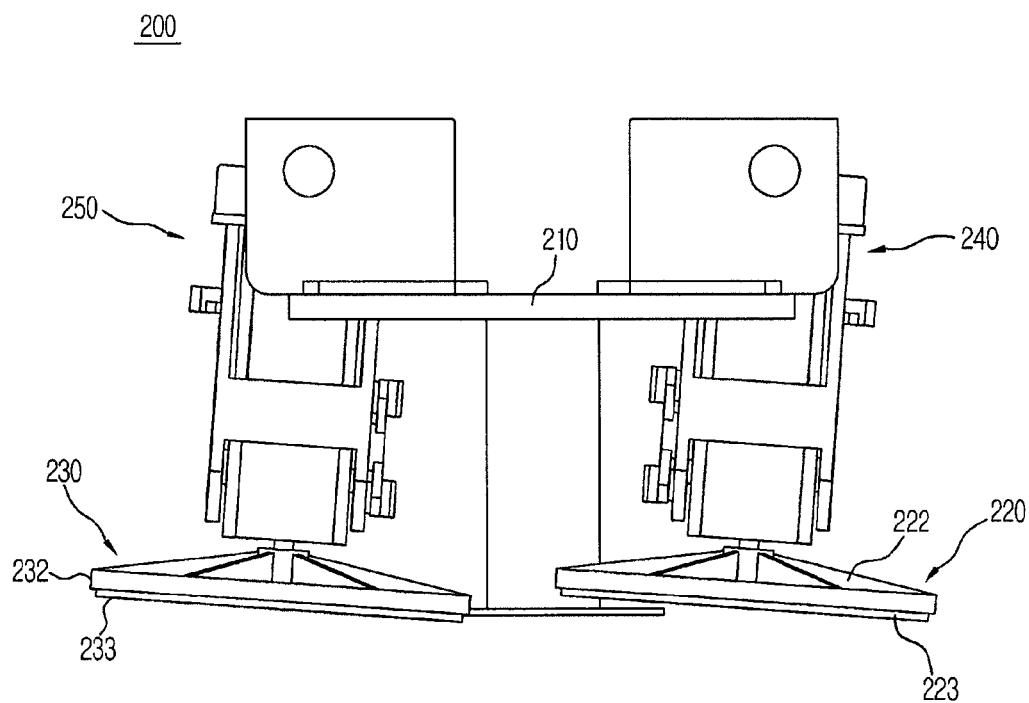
FIG. 6A is a view illustrating motion of the cleaning robot in place according to the one embodiment.
Figure 6B:
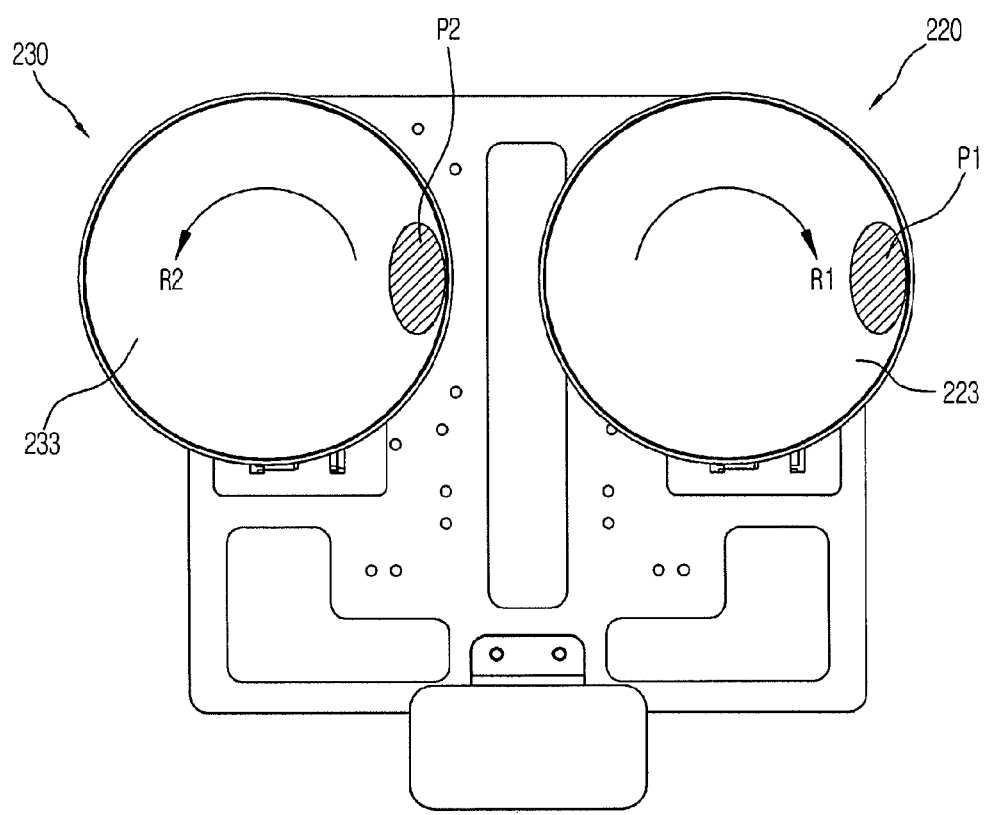
FIG. 6B is a view illustrating a contact portion of a pad member while the cleaning robot remains in place according to the one embodiment.

FIG. 6A is a view illustrating motion of the cleaning robot in place according to the one embodiment, and FIG. 6B is a view illustrating a contact portion of the pad member while the cleaning robot remains in place according to the one embodiment.

As exemplarily shown in FIGS. 6A and 6B, as the first drive motor of the first drive assembly 240 and the first motor of the second drive assembly 250 included in the cleaning robot 1 are rotated in a first rotation direction R1, the rotating plate 222 of the first pad assembly 220 and the rotating plate 232 of the second pad assembly 230 are tilted relative to the floor by a set angle.

In this case, the rotating plate 222 of the first pad assembly 220 and the rotating plate 232 of the second pad assembly 230 are tilted in the same direction on the basis of each center axis, causing the pad member 223 of the first pad assembly 220 and the pad member 233 of the second pad assembly 230 to come into contact with the floor at their portions located in the same direction on the basis of each center axis. That is, a right portion of the pad member 223 of the first pad assembly 220 and a right portion of the pad member 233 of the second pad assembly 230 come into contact with the floor.

Accordingly, a contact portion P1 of the pad member 223 of the first pad assembly 220 and a contact portion P2 of the pad member 233 of the second pad assembly 230 come into contact with the floor. In this case, when the third motor of the first drive assembly 240 is rotated in a first rotation direction and a third motor of the second drive assembly 250 is rotated in a second rotation direction R2, friction is generated between the contact portion P1 of the pad member 223 of the first pad assembly 220 and the floor, and friction is generated between the contact portion P2 of the pad member 233 of the second pad assembly 230 and the floor.

Here, the respective contact portions P1 and P2 of the two pad members 223 and 233 assist the main body 200 in moving while keeping balance thereof, and may be set in consideration of a friction application direction corresponding to a target position.

In addition, friction between the contact portion P1 of the pad member 223 of the first pad assembly 220 and the floor and friction between the contact portion P2 of the pad member 233 of the second pad assembly 230 and the floor are greater than friction between the remaining portion of each pad member and the floor.

As described above, in a state in which friction between the contact portions P1 and P2 of the pad member 223 of the first pad assembly 220 and the pad member 233 of the second pad assembly 230 and the floor is greater than friction between the remaining portion of each pad member and the floor, the rotating plate 222 of the first pad assembly 220 is rotated in the first rotation direction R1 and the rotating plate 232 of the second pad assembly 230 is rotated in the second rotation direction R2. In this case, the first rotation direction R1 is opposite to the second rotation direction R2. As the rotating plate 222 of the first pad assembly 220 and the rotating plate 232 of the second pad assembly 230 are rotated in opposite directions, the cleaning robot 1 may wipe the floor in place without movement.

In addition, friction at the first contact portion P1 of the pad member 223 of the first pad assembly 220 and friction at the second contact portion P2 of the pad member 233 of the second pad assembly 230 are applied in opposite directions, but have the same magnitude.

Figure 7A:
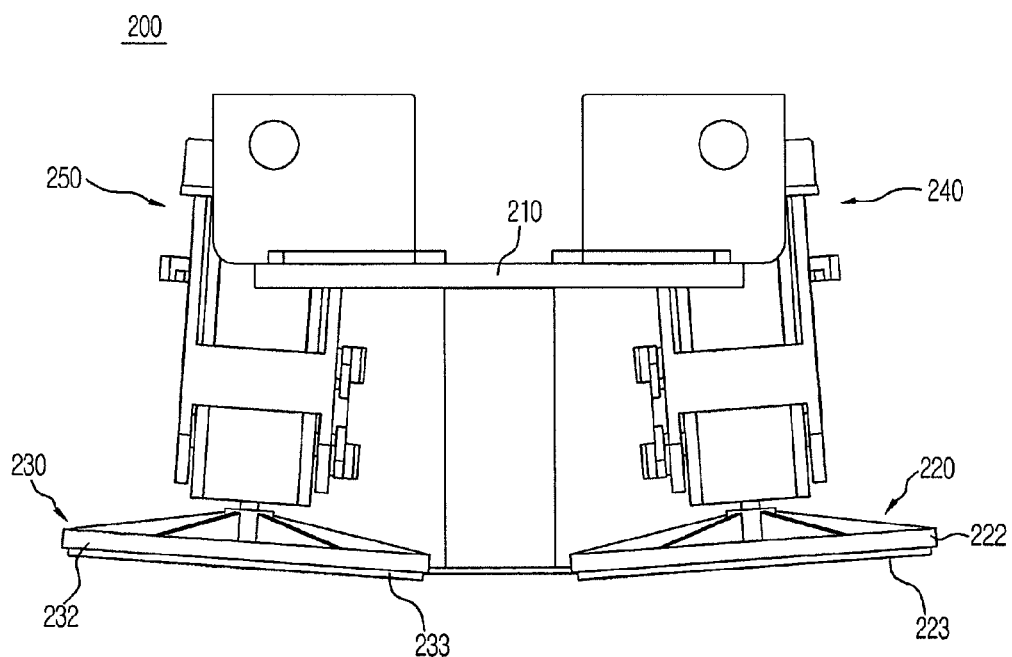
FIG. 7A is a view illustrating forward movement of the cleaning robot according to the one embodiment.
Figure 7B:
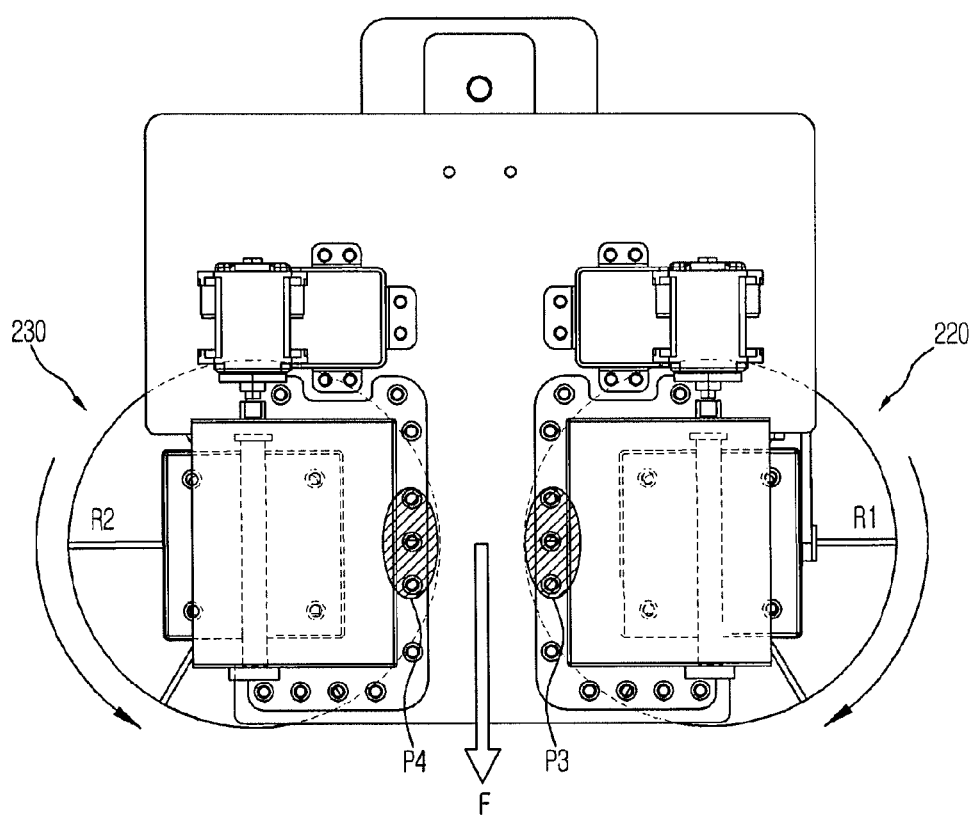
FIG. 7B is a view illustrating a contact portion of the pad member during forward movement of the cleaning robot according to the one embodiment.

FIG. 7A is a view illustrating forward movement of the cleaning robot according to the one embodiment, and FIG. 7B is a view illustrating a contact portion of the pad member during forward movement of the cleaning robot according to the one embodiment.

As exemplarily shown in FIGS. 7A and 7B, as the first motor of the first drive assembly 240 of the cleaning robot 1 is rotated in the second rotation direction R2 and the first motor of the second drive assembly 250 is rotated in the first rotation direction R1, the rotating plate 222 of the first pad assembly 220 and the rotating plate 232 of the second pad assembly 230 are tilted relative to the floor by a given angle.

In this case, the rotating plate 222 of the first pad assembly 220 and the rotating plate 232 of the second pad assembly 230 are tilted in opposite directions on the basis of each center axis, causing the pad member 223 of the first pad assembly 220 and the pad member 233 of the second pad assembly 230 to come into contact with the floor at their portions located in opposite directions on the basis of each center axis thereof.

That is, a left portion of the pad member 223 of the first pad assembly 220 and a right portion of the pad member 233 of the second pad assembly 230 come into contact with the floor.

Accordingly, a contact portion P3 of the pad member 223 of the first pad assembly 220 and a contact portion P4 of the pad member 233 of the second pad assembly 230 come into contact with the floor. In this case, when the third motor of the first drive assembly 240 is rotated in the first rotation direction R1 and the third motor of the second drive assembly 250 is rotated in the second rotation direction R2, friction is generated between the contact portion P3 of the pad member 223 of the first pad assembly 220 and the floor, and friction is generated between the contact portion P4 of the pad member 233 of the second pad assembly 230 and the floor.

In addition, friction between the contact portion P3 of the pad member 223 of the first pad assembly 220 and the floor and friction between the contact portion P4 of the pad member 233 of the second pad assembly 230 and the floor are greater than friction between the remaining portion of each pad member and the floor.

As described above, in a state in which friction between the contact portions P3 and P4 of the pad member 223 of the first pad assembly 220 and the pad member 233 of the second pad assembly 230 and the floor is greater than friction between the remaining portion of each pad member and the floor, the rotating plate 222 of the first pad assembly 220 is rotated in the first rotation direction R1 and the rotating plate 232 of the second pad assembly 230 is rotated in the second rotation direction R2.

Here, the first rotation direction R1 is opposite to the second rotation direction R2. As the rotating plate 222 of the first pad assembly 220 and the rotating plate 232 of the second pad assembly 230 are rotated in opposite directions, friction is applied to the two contact portions P3 and P4 in the same direction, which causes the cleaning robot 1 to wipe the floor while moving forward (designated by arrow F).

Friction at the first contact portion P3 of the pad member 223 of the first pad assembly 220 and friction at the second contact portion P4 of the pad member 233 of the second pad assembly 230, which are applied in the same direction, have the same magnitude.

Figure 8A:
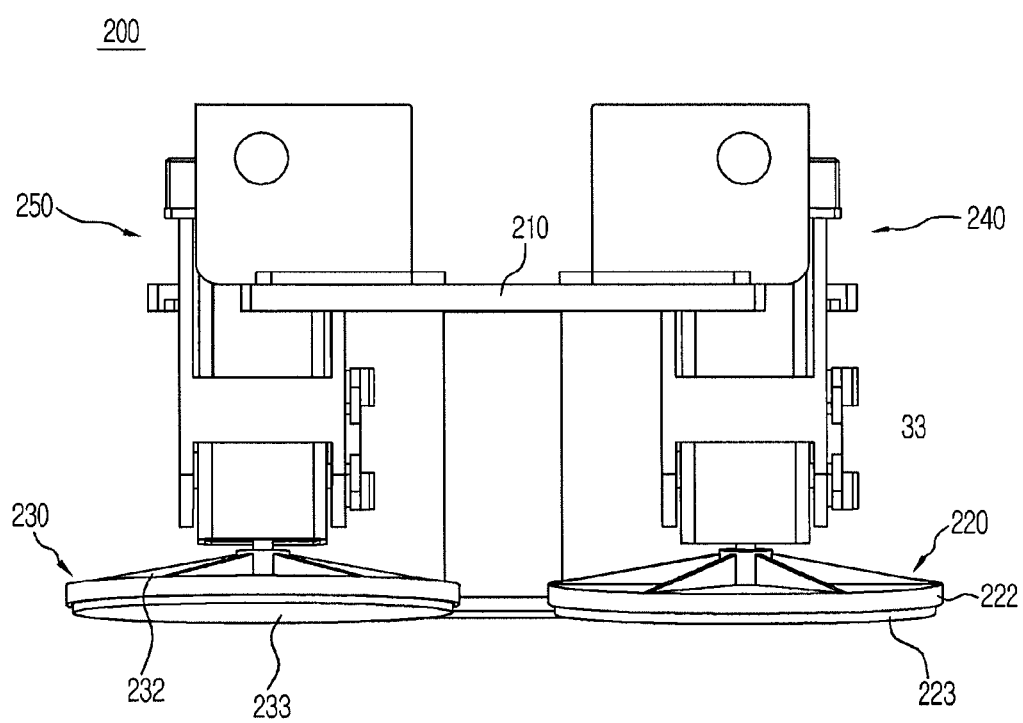
FIG. 8A is a view illustrating lateral movement of the cleaning robot according to the one embodiment.
Figure 8B:
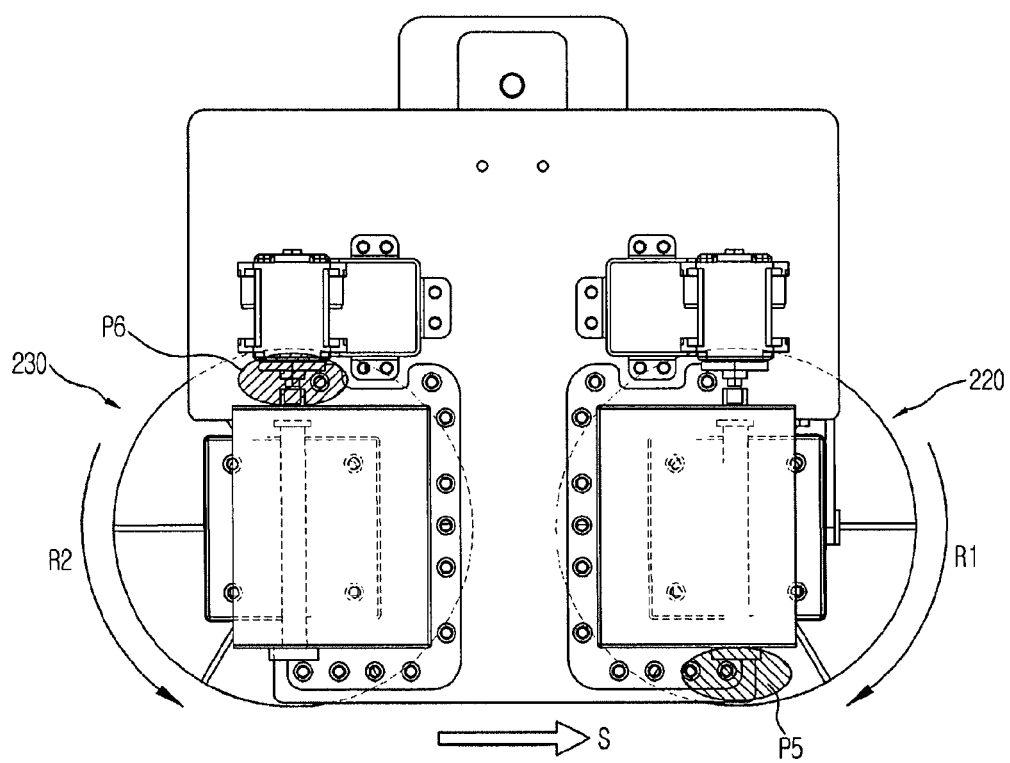
FIG. 8B is a view illustrating a contact portion of the pad member during lateral movement of the cleaning robot according to the one embodiment.

FIG. 8A is a view illustrating lateral movement of the cleaning robot according to the one embodiment, and FIG. 8B is a view illustrating a contact portion of the pad member during lateral movement of the cleaning robot according to the one embodiment.

As exemplarily shown in FIGS. 8A and 8B, as the second motor of the first drive assembly 240 of the cleaning robot 1 is rotated in the first rotation direction R1 and the second motor of the second drive assembly 250 is rotated in the second rotation direction R2, the rotating plate 222 of the first pad assembly 220 and the rotating plate 232 of the second pad assembly 230 are tilted relative to the floor by a given angle.

In this case, the rotating plate 222 of the first pad assembly 220 and the rotating plate 232 of the second pad assembly 230 are tilted in opposite directions on the basis of each center axis, causing the pad member 223 of the first pad assembly 220 and the pad member 233 of the second pad assembly 230 to come into contact with the floor at their portions located in opposite directions on the basis of each center axis thereof.

That is, a front portion of the pad member 223 of the first pad assembly 220 and a rear portion of the pad member 233 of the second pad assembly 230 come into contact with the floor.

Accordingly, a contact portion P5 of the pad member 223 of the first pad assembly 220 and a contact portion P6 of the pad member 233 of the second pad assembly 230 come into contact with the floor. In this case, when the third motor of the first drive assembly 240 is rotated in the first rotation direction R1 and the third motor of the second drive assembly 250 is rotated in the second rotation direction R2, friction is generated between the contact portion P5 of the pad member 223 of the first pad assembly 220 and the floor, and friction is generated between the contact portion P6 of the pad member 233 of the second pad assembly 230 and the floor.

In addition, friction between the contact portion P5 of the pad member 223 of the first pad assembly 220 and the floor and friction between the contact portion P6 of the pad member 233 of the second pad assembly 230 and the floor are greater than friction between the remaining portion of each pad member and the floor.

As described above, in a state in which friction between the contact portions P5 and P6 of the pad member 223 of the first pad assembly 220 and the pad member 233 of the second pad assembly 230 and the floor is greater than friction between the remaining portion of each pad member and the floor, the rotating plate 222 of the first pad assembly 220 is rotated in the first rotation direction R1 and the rotating plate 232 of the second pad assembly 230 is rotated in the second rotation direction R2.

Here, the first rotation direction R1 is opposite to the second rotation direction R2. As the rotating plate 222 of the first pad assembly 220 and the rotating plate 232 of the second pad assembly 230 are rotated in opposite directions, friction is applied to the two contact portions P5 and P6 in the same direction, which causes the cleaning robot 1 to wipe the floor while moving in a lateral direction (designated by arrow S).

Friction at the first contact portion P5 of the pad member 223 of the first pad assembly 220 and friction at the second contact portion P6 of the pad member 233 of the second pad assembly 230, which are applied in the same direction, have the same magnitude.

Figure 9A:
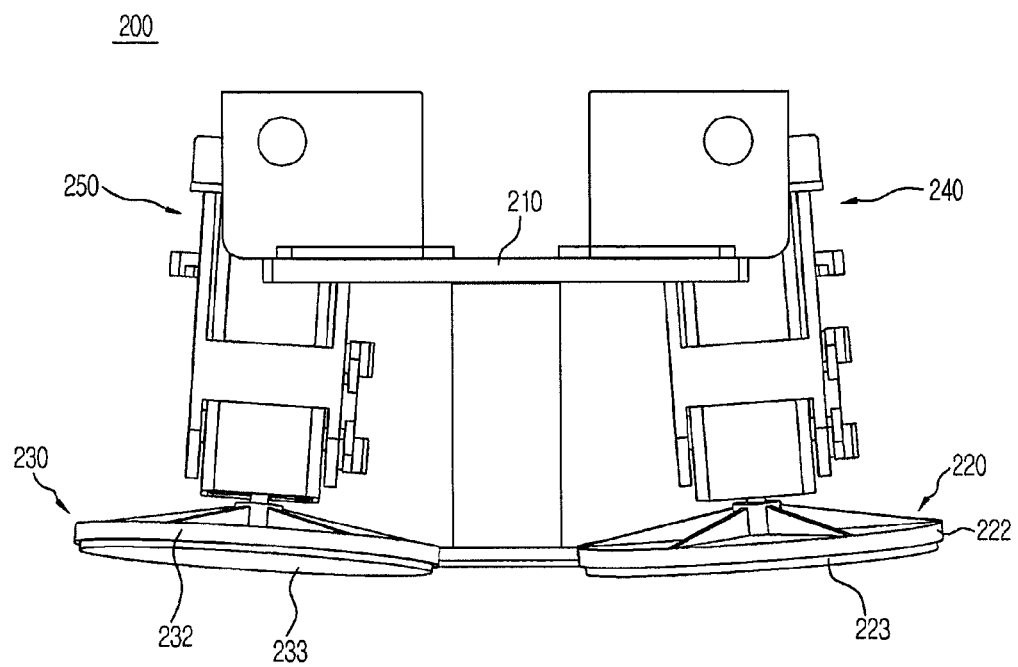
FIG. 9A is a view illustrating diagonal movement of the cleaning robot according to the one embodiment.
Figure 9B:
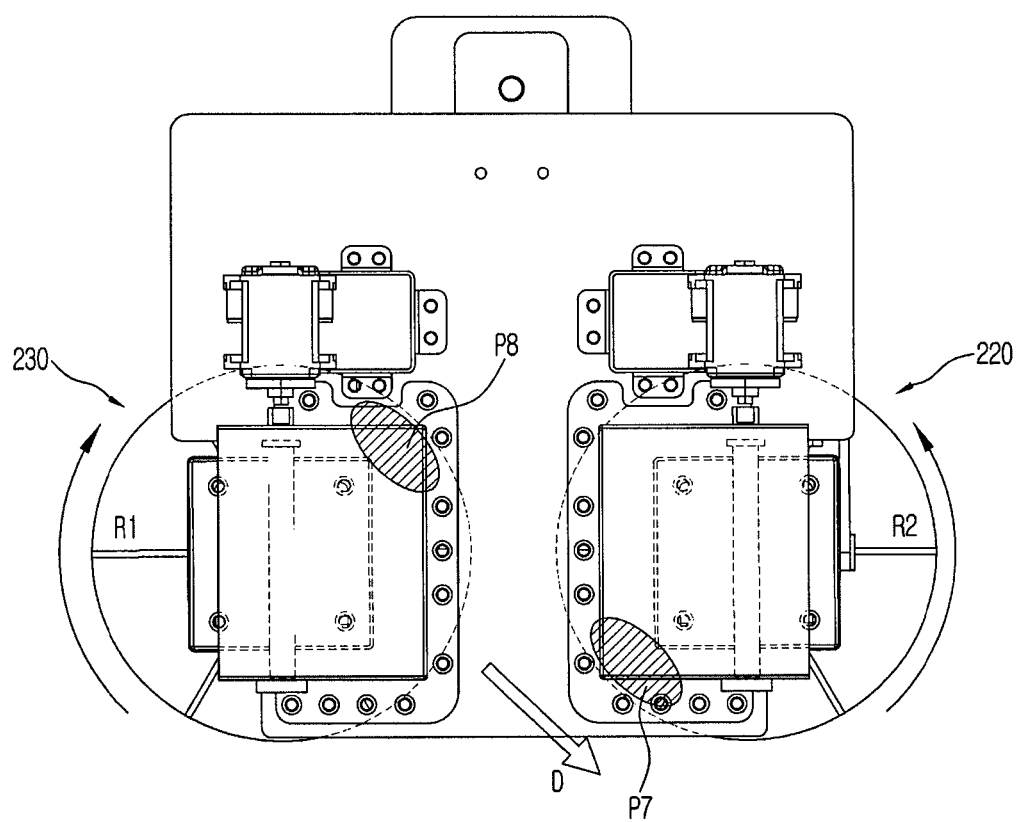
FIG. 9B is a view illustrating a contact portion of the pad member during diagonal movement of the cleaning robot according to the one embodiment.

FIG. 9A is a view illustrating diagonal movement of the cleaning robot according to the one embodiment, and FIG. 9B is a view illustrating a contact portion of the pad member during diagonal movement of the cleaning robot according to the one embodiment.

As exemplarily shown in FIGS. 9A and 9B, as the first motor and the second motor of the first drive assembly 240 of the cleaning robot 1 are rotated and the first motor and the second motor of the second drive assembly 250 are rotated, the rotating plate 222 of the first pad assembly 220 and the rotating plate 232 of the second pad assembly 230 are tilted relative to the floor by a given angle.

In this case, a front left portion of the pad member 223 of the first pad assembly 220 and a rear right portion of the pad member 233 of the second pad assembly 230 come into contact with the floor.

Accordingly, a contact portion P7 of the pad member 223 of the first pad assembly 220 and a contact portion P8 of the pad member 233 of the second pad assembly 230 come into contact with the floor. In this case, when the third motor of the first drive assembly 240 is rotated in the first rotation direction R1 and the third motor of the second drive assembly 250 is rotated in the second rotation direction R2, friction is generated between the contact portion P7 of the pad member 223 of the first pad assembly 220 and the floor, and friction is generated between the contact portion P8 of the pad member 233 of the second pad assembly 230 and the floor.

In addition, friction between the contact portion P7 of the pad member 223 of the first pad assembly 220 and the floor and friction between the contact portion P8 of the pad member 233 of the second pad assembly 230 and the floor are greater than friction between the remaining portion of each pad member and the floor.

As described above, in a state in which friction between the contact portions P7 and P8 of the pad member 223 of the first pad assembly 220 and the pad member 233 of the second pad assembly 230 and the floor is greater than friction between the remaining portion of each pad member and the floor, the rotating plate 222 of the first pad assembly 220 is rotated in the first rotation direction R1 and the rotating plate 232 of the second pad assembly 230 is rotated in the second rotation direction R2.

Here, the first rotation direction R1 is opposite to the second rotation direction R2. As the rotating plate 222 of the first pad assembly 220 and the rotating plate 232 of the second pad assembly 230 are rotated in opposite directions, friction is applied to the two contact portions P7 and P8 in the same direction, which causes the cleaning robot 1 to wipe the floor while moving in a diagonal direction (designated by arrow D).

Friction at the first contact portion P7 of the pad member 223 of the first pad assembly 220 and friction at the second contact portion P8 of the pad member 233 of the second pad assembly 230, which are applied in the same direction, have the same magnitude.

Although the above-described embodiment illustrates a configuration in which each pad member is tilted in the X-axis and the Y-axis using respective X-axis and Y-axis tilting mechanisms, a tilting configuration is not limited thereto.

For example, only one tilting mechanism to tilt each pad member in the X-axis and the Y-axis may be adopted, in the same principle as driving of a pulsator used in a washing machine.

Figure 10:
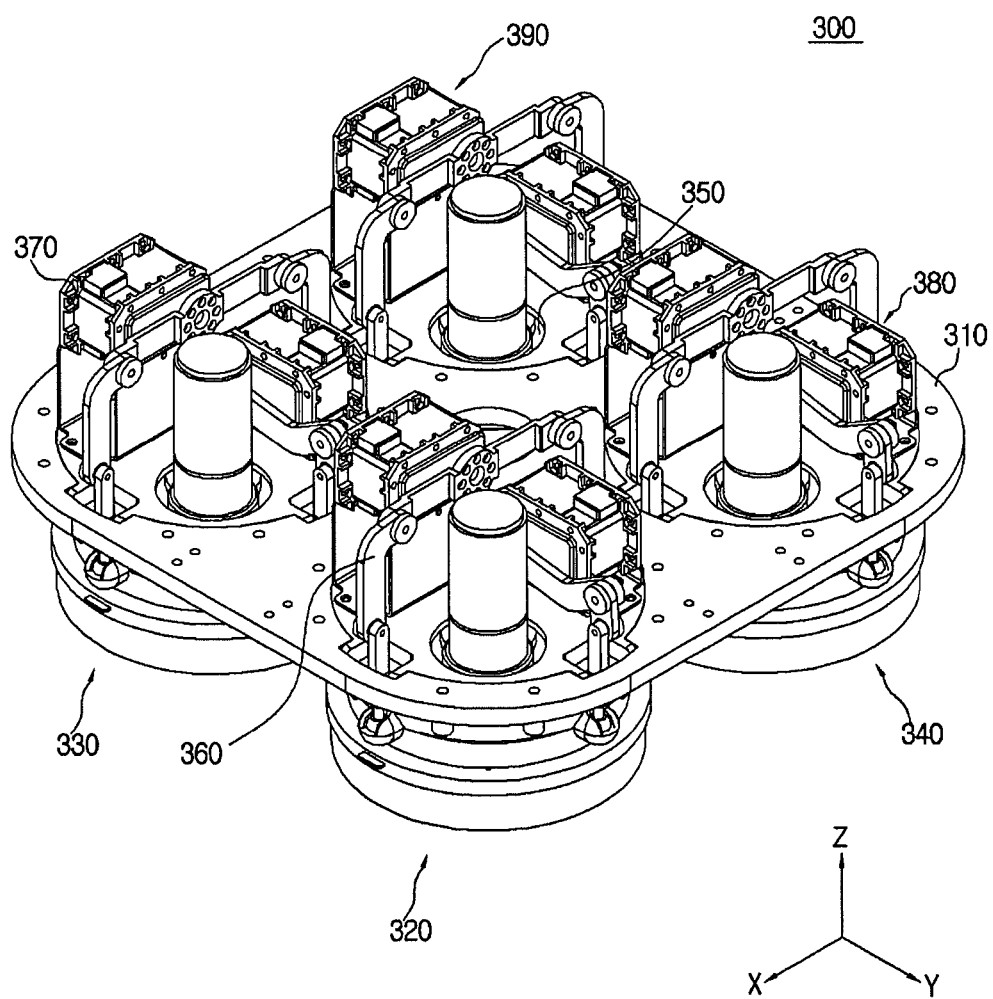
FIG. 10 is a view illustrating a main body of a cleaning robot according to another embodiment.

FIG. 10 is a view illustrating a main body of a cleaning robot according to another embodiment. The main body includes four pad assemblies differently from the above-described embodiment.

The main body 300 of the cleaning robot according to the another embodiment includes a frame 310, a first pad assembly 320, a second pad assembly 330, a third pad assembly 340, and a fourth pad assembly 350. The main body 300 further includes a plurality of drive assemblies 360, 370, 380, 390 to drive the respective pad assemblies.

Figure 11:
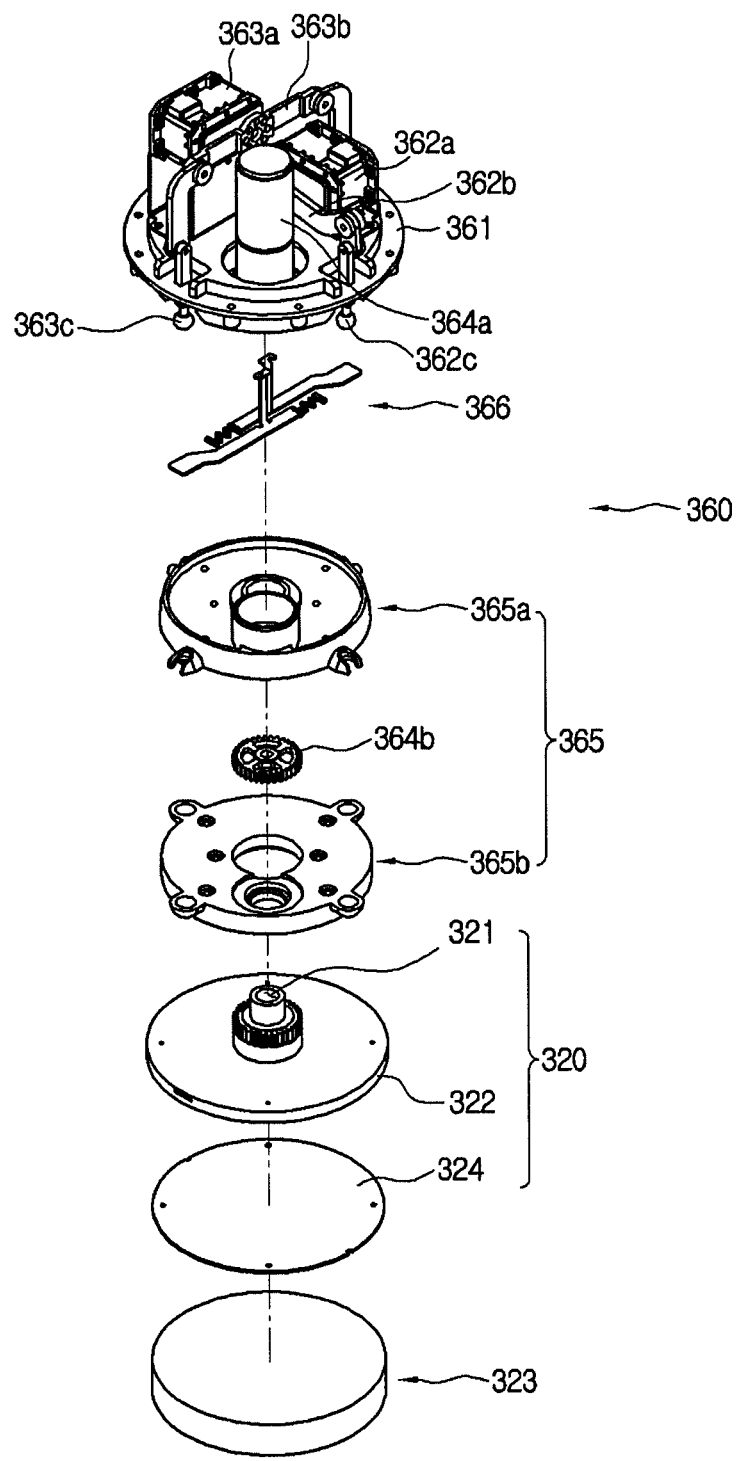
FIG. 11 is an exploded perspective view of a first pad assembly and a first drive assembly included in the main body of the cleaning robot according to the another embodiment.

FIG. 11 is an exploded perspective view of the first pad assembly of the cleaning robot according to the another embodiment. The first pad assembly has the same configuration as that of the second, third, and fourth pad assemblies, and thus the first pad assembly will hereinafter be described by way of example. In addition, the first drive assembly has the same configuration as that of the second, third, and fourth drive assemblies, and thus only the first drive assembly will hereinafter be described by way of example.

The first pad assembly 320 includes a coupling member 321 coupled to the first drive assembly 360, a rotating plate 322 mounted to the coupling member 321, the rotating plate 322 being tilted by a set angle or rotated based on torque transmitted from the first drive assembly 360, a pad member 323 separably mounted to the rotating plate 322, and an adhesive member 324 mounted to the rotating plate 322 to allow the pad member 323 to be separably mounted to the rotating plate 322.

The first drive assembly 360 includes a main frame 361, and several components mounted to the main frame 361 including a first motor 362a to apply drive power in the X-axis, a first link member 362b to transmit drive power of the first motor 362a, a plurality of first pressure members 362c connected to the first link member 362b to receive drive power of the first motor 362a, a second motor 363a to apply drive power in the Y-axis, a second link member 363b to transmit drive power of the second motor 363a, a plurality of second pressure members 363c connected to the second link member 363b to receive drive power of the second motor 363a, a third motor 364a to apply drive power in the Z-axis, and a gear member 364b to apply drive power of the third motor 364a to the rotating plate 322.

Here, the first motor 362a, the first link member 362b, the first pressure members 362c, the second motor 363a, the second link member 363b, and the second pressure members 363c serve as position variable members to vary a position of the pad member coming into contact with the floor, and implement a tilting motion of the pad member. The third motor 364a and the gear member 364b serve as rotation variable members to vary, e.g., a rotation direction and revolutions per minute of the pad.

Specifically, when the gear member 364b connected to the third motor 364a is rotated, the coupling member 321 tooth-engaged with the gear member 364b is rotated, causing the rotating plate 322 to be rotated about Z-axis. Thereby, the pad member 322 may wipe the floor while rotating in place.

The first drive assembly 360 further includes a gradient adjustment member 365 coming into contact with the pressure members 362c, 363c to adjust a gradient of the rotating plate 322 based on movement of the respective pressure members 362c, 363c.

The pressure members protrude toward the rotating plate 322. When the link member is moved via driving of at least one motor among the first motor 362a and the second motor 363a, the pressure members are moved closer to the rotating plate 322 via movement of the link member, thereby pushing the gradient adjustment member 365 to adjust a gradient of the rotating plate 322.

The gradient adjustment member 365 includes a first adjustment member 365a coupled to the frame 361 and having a support hole into which a rotating shaft of the third motor 364a is inserted, the respective pressure members being supported around the support hole, and a second adjustment member 365b coupled to the first adjustment member 365a and having recesses coming into contact with the respective pressure members.

The first drive assembly 360 further includes a locking member 366 to lock the first adjustment member 365a, the second adjustment member 365b, and the rotating plate 322 so as to fix the same.

In addition, the main body 300 of the cleaning robot may further include a chamber (not shown) to supply water to the pad member 323.

Figure 12:
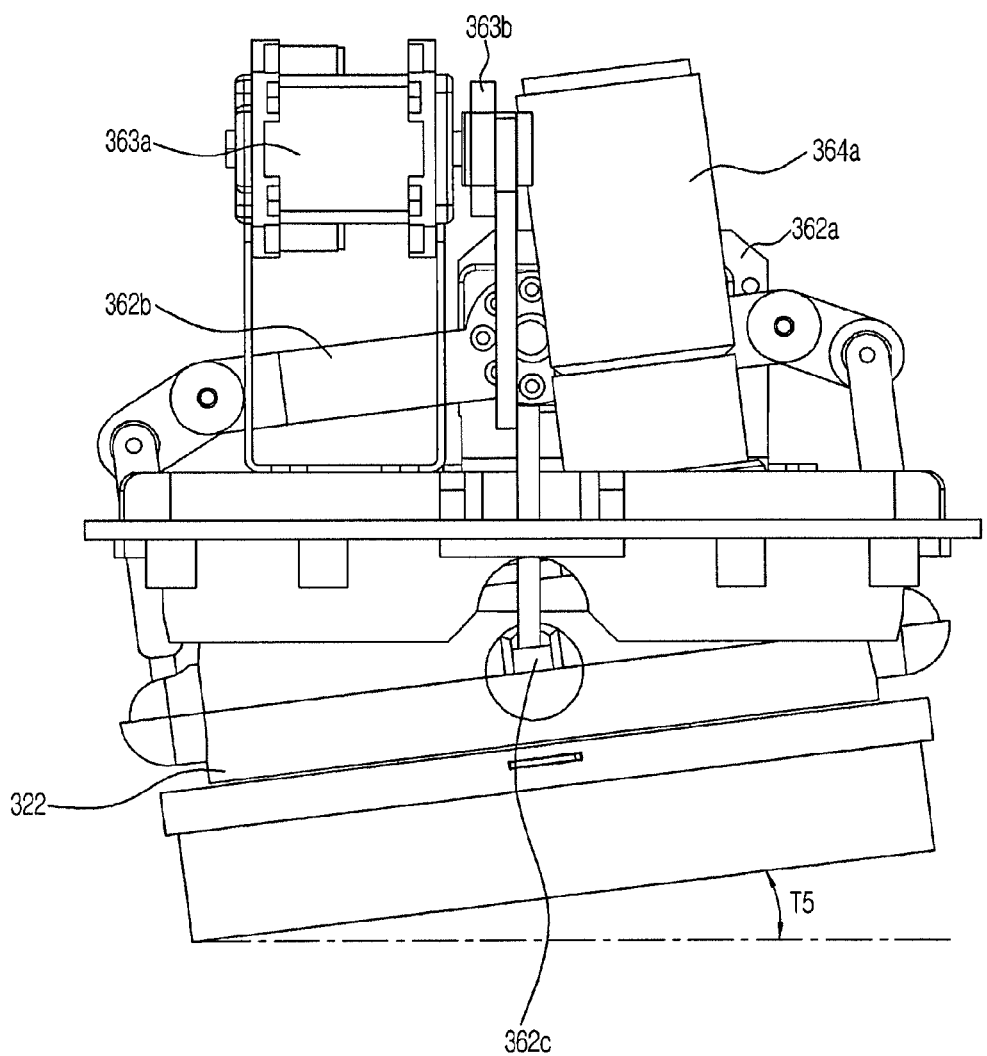
FIG. 12 is a view illustrating rotation of a rotating plate of the first pad assembly of the cleaning robot about the X-axis according to the another embodiment.
Figure 13:
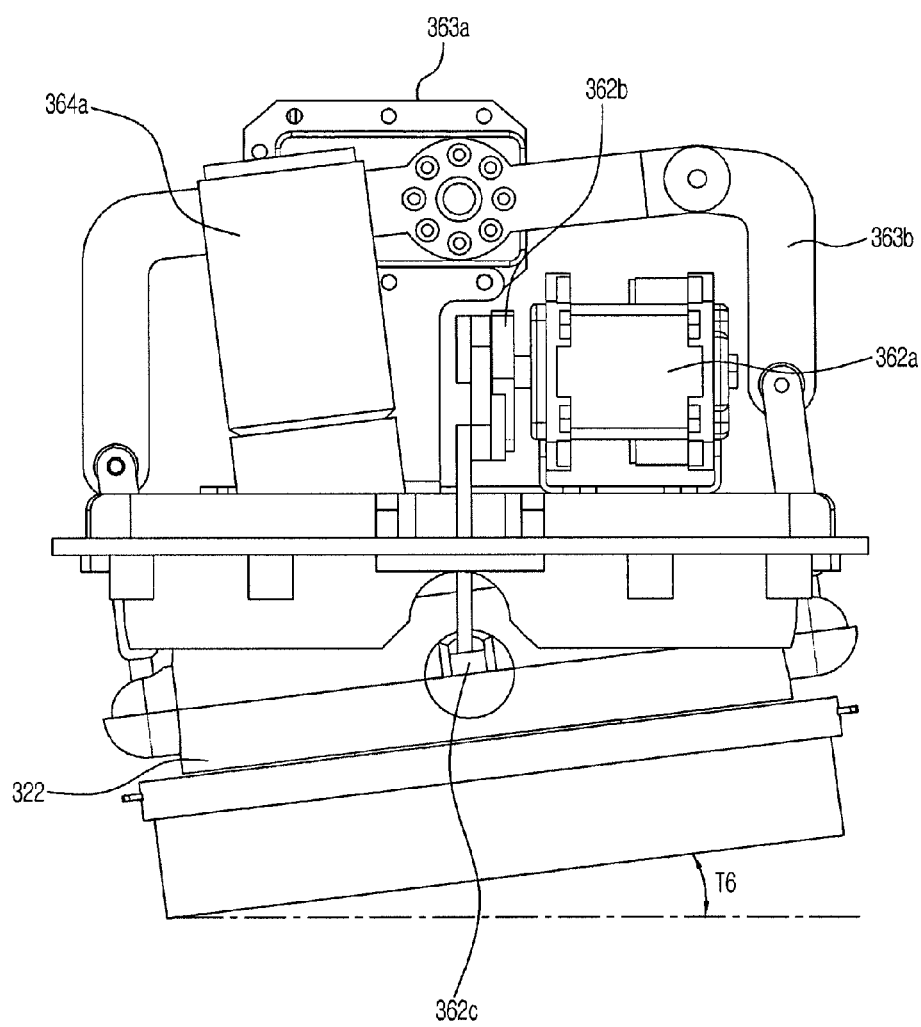
FIG. 13 is a view illustrating rotation of the rotating plate of the first pad assembly of the cleaning robot about the Y-axis according to the another embodiment.

FIG. 12 is a view illustrating rotation of the rotating plate of the first pad assembly of the cleaning robot about the X-axis according to the another embodiment, and FIG. 13 is a view illustrating rotation of the rotating plate of the first pad assembly of the cleaning robot about the Y-axis according to the another embodiment.

The rotating plate 322 of the first pad assembly 320 may be rotated by the first motor 362a and the second motor 363a about the X-axis or the Y-axis so as to be tilted relative to the floor.

As exemplarily shown in FIG. 12, as the first link member 362b is rotated clockwise or counterclockwise via rotation of the first motor 362a, the rotating plate 322 of the first pad assembly 320 is rotated about the X-axis based on a rotation direction of the first link member 362b, thereby being tilted relative to the floor to form a fifth angle T5.

Then, through rotation of the first link member 362b, the first pressure members 362c provided at an end of the first link member 362b are shifted in position. In turn, through position shift of the first pressure members 362c, the rotating plate 322 is rotated about the X-axis, thereby being tilted relative to the floor.

As exemplarily shown in FIG. 13, as the second link member 363b is rotated clockwise or counterclockwise via rotation of the second motor 363a, the rotating plate 322 of the first pad assembly 320 is rotated about the Y-axis based on a rotation direction of the second link member 363b, thereby being tilted relative to the floor to form a sixth angle T6.

Then, through rotation of the second link member 363b, the second pressure members 363c provided at an end of the second link member 363b are shifted in position. In turn, through position shift of the second pressure members 363c, the rotating plate 322 is rotated about the Y-axis, thereby being tilted relative to the floor.

Once the rotating plate 322 of the first pad assembly 320 has been rotated about the X-axis or the Y-axis to thereby be tilted relative to the floor as described above, the pad member 323 provided at a lower surface of the rotating plate 322 may be arranged such that friction between a set portion of the pad member 323 and the floor is greater than friction between the remaining portion of the pad member 323 and the floor even if the entire surface of the pad member 323 comes into contact with the floor.

Figure 14:
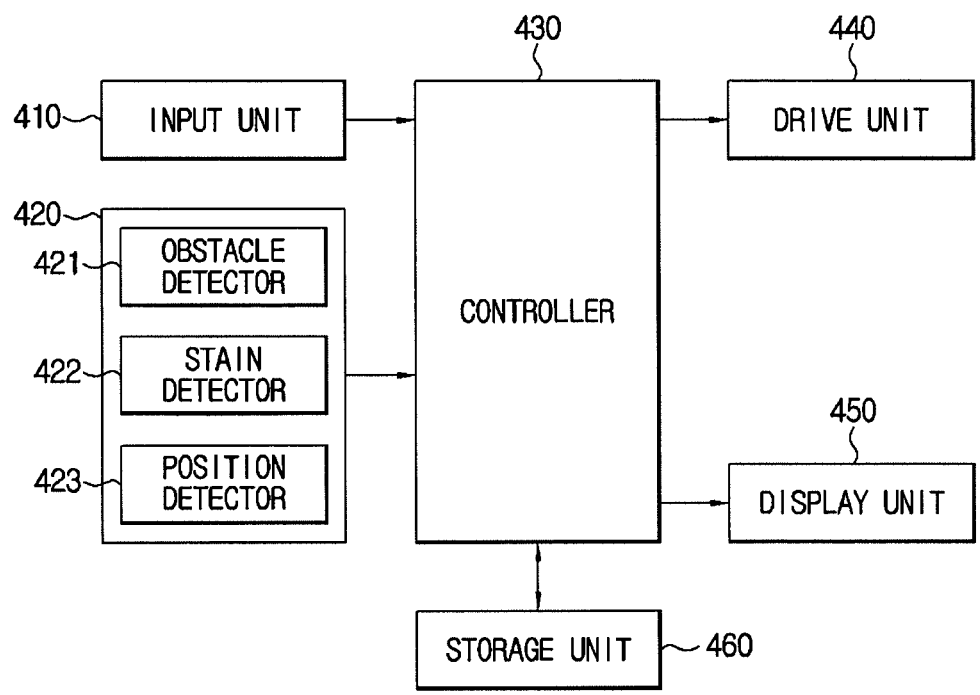
FIG. 14 is a control block diagram of the cleaning robot according to the embodiment.

FIG. 14 is a control block diagram of the cleaning robot. The cleaning robot 1 includes an input unit 410, a detection unit 420, a controller 430, a drive unit 440, a display unit 450, and a storage unit 460.

The cleaning robot of FIG. 10 according to the another embodiment will hereinafter be described by way of example.

The input unit 410 is mounted to the exterior of the housing 100, and receives cleaning start/end instructions, operation information, reservation information, etc. input by the user, and transmits the input information to the controller 430. Here, operation information includes cleaning modes, such as simplified cleaning and intensive cleaning, movement patterns, etc.

The detection unit 420 serves to detect information regarding cleaning environment of a cleaning region. The detection unit 420 includes an obstacle detector 421 to detect an obstacle in the cleaning region, and a stain detector 422 to detect stains on the floor of the cleaning region.

The obstacle detector 421 may be a distance sensor that detects the presence of an obstacle and measures a distance between the cleaning robot 1 and an obstacle. The obstacle detector 421 may be an infrared or ultrasonic sensor.

The obstacle detector 421 may be mounted to each of front, rear, right and left faces of the frame 310 of the main body 300 to detect obstacles present in front, rear, right and left sides of the cleaning robot 1.

Figure 15:
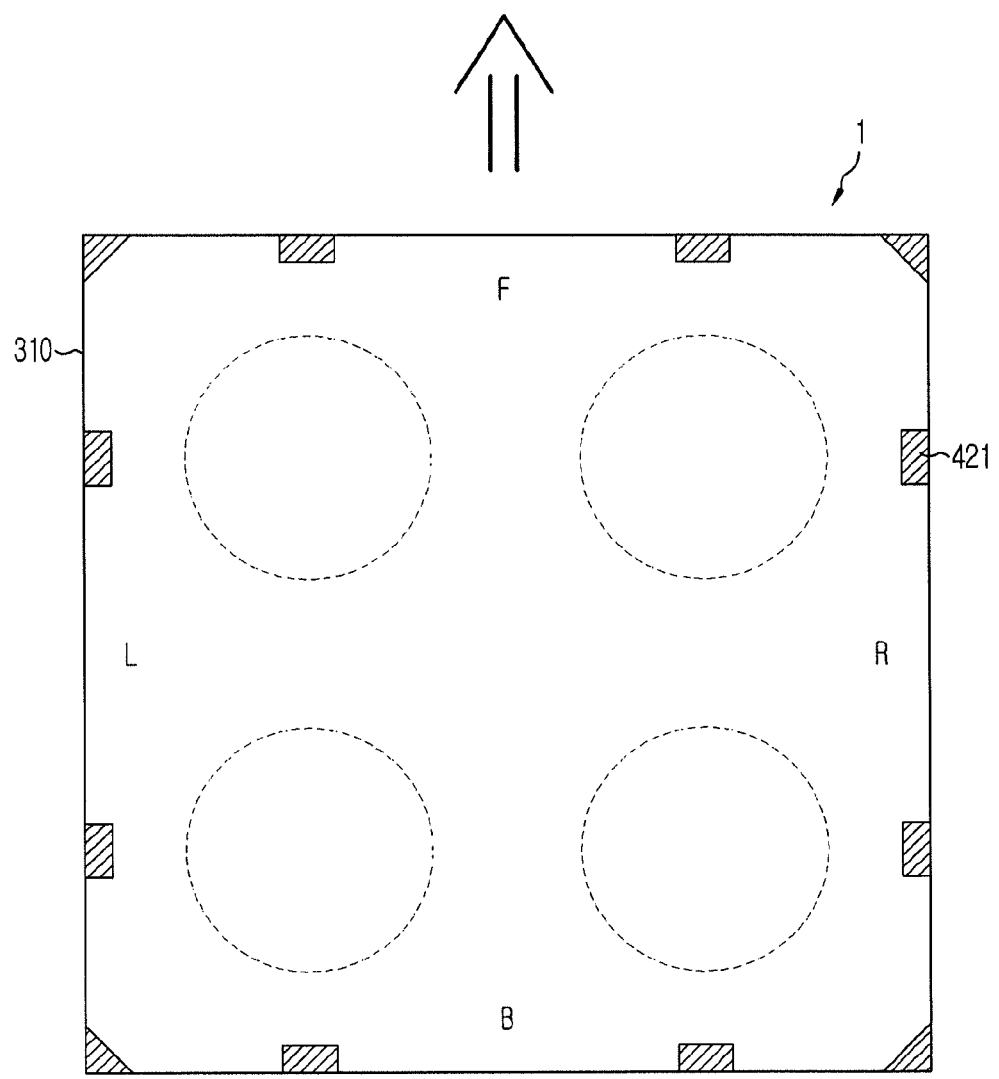
FIG. 15 is a view illustrating installation of an obstacle detector included in the cleaning robot according to the embodiment.

For example, as exemplarily shown in FIG. 15, to assist the cleaning robot 1 in recognizing a movement direction thereof, respective faces of the main body 300 are defined as a first face F, a second face B parallel to the first face F, a third face L connecting the first face F and the second face B to each other, and a fourth face R connecting the first face F and the second face B to each other and parallel to the third face L. In this case, each face is provided with at least one obstacle detector 421.

In addition, the obstacle detector 421 may be provided at each of a corner where the first face F and the third face L meet each other, a corner where the first face F and the fourth face R meet each other, a corner where the second face B and the third face L meet each other, and a corner where the second face B and the fourth face R meet each other.

The stain detector 422 includes an image collector, such as an image sensor or a camera, to collect an image of the floor to judge whether or not a stain is present on the floor.

The stain detector 422 may function to adjust an image collection direction of the image collector, so as to collect a front image in a movement direction of the main body 300.

The stain detector 422 may include a plurality of image collectors to capture images in front and rear directions and left and right directions respectively, and may operate only one of the image collectors corresponding to a movement direction of the main body 300.

In one example, the cleaning robot 1 may include an image collector, which is rotatable to a direction corresponding to the first face F, the second face B, the third face L, and the fourth face R, and thus may collect an image of the floor by rotating the image collector to a direction corresponding to a movement direction.

In another example, the cleaning robot 1 may include image collectors located respectively at the first face F, the second face B, the third face L, and the fourth face R, and thus may collect an image of the floor by operating only one image collector located in a movement direction.

The stain detector 422 as described above detects a stain on the floor by processing the collected image, and transmits the detected result to the controller 430.

The detection unit 420 further includes a position detector 423 to detect a current position of the cleaning robot 1 in the cleaning region. The position detector 423 may be a gyro sensor, an optical sensor, or an image sensor.

Here, a direction in which the cleaning robot will move is determined based on map information regarding a cleaning region, a movement route, and a movement pattern.

When a cleaning instruction is input, the controller 430 controls driving of the respective drive assemblies to realize cleaning and movement.

The controller 430 produces a map by implementing wall following, and stores the resulting map information. Here, the map information includes information regarding shapes and sizes of at least one cleaning region, relative positions and directions between cleaning regions, etc.

Here, the map may be produced upon initial cleaning, or may be produced at an initial stage whenever cleaning is implemented. In addition, the controller 430 may receive map information from an external device.

The controller 430 divides each cleaning region included in the map information into a plurality of cells, and controls the respective drive assemblies to realize movement and cleaning on a per cell basis. Then, the controller 430 produces a movement route for optimized movement about the cleaning region based on the map information, and also produces a movement pattern based on the map information and operation information. As such, the controller 430 controls the respective drive assemblies so as to allow the cleaning robot to implement cleaning while moving in the produced movement pattern along the produced movement route.

In addition, during movement of the cleaning robot, the controller 430 stores movement information including a movement distance and movement direction of the main body, recognizes coordinates in the map based on information regarding positions of a plurality of cells, detects a current position of the main body based on the stored movement information and coordinate information, and acquires target position information regarding a target position, to which the cleaning robot 1 will move, based on the map information and the detected current position.

Here, the target position information includes a movement direction and movement distance.

Figure 16:
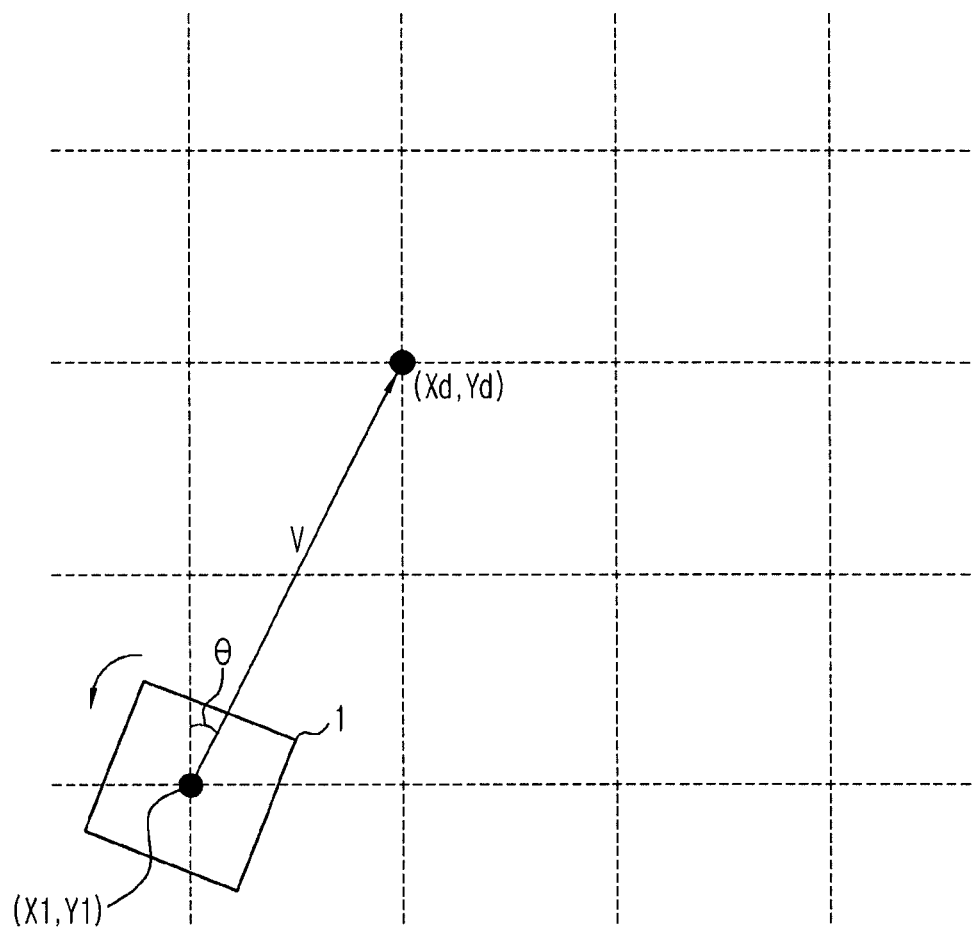
FIG. 16 is a view illustrating movement of the cleaning robot according to the embodiment.

As exemplarily shown in FIG. 16, the controller 430 acquires a vector v from a current position to a target position based on current position information, i.e. current coordinates (x1, y1) and target position information, i.e. target coordinates (xd, yd), and controls movement of the main body based on the acquired vector v.

Thereby, the cleaning robot 1 may move to the target position without rotation of the main body while maintaining a current attitude of the main body.

In addition, the controller 430 may recognize a current position based on information detected by the position detector 423.

The controller 430 controls the respective drive assemblies based on a movement route and a movement pattern when controlling movement of the main body, thereby adjusting a tilting angle and tilting direction of the rotating plate of each pad assembly, revolutions per minute and a rotation direction of the rotating plate, etc.

Specifically, the controller 430 may adjust an X-axis or Y-axis rotation direction of each pad assembly by controlling the first motor and the second motor of each drive assembly, thereby adjusting a tilting direction and tilting angle of each rotating plate. Thereby, the controller 430 may adjust a contact direction and contact portion of each pad member with respect to the floor.

In addition, the controller 430 may adjust a Z-axis rotation direction and revolutions per minute of each pad assembly by controlling the third motor of each drive assembly, thereby adjusting a friction application direction. Thereby, the controller 430 may determine a movement direction and movement speed of the main body.

With reference to FIG. 16, the controller 430 determines a rotation angle θ of the main body from a movement direction based on map information and a current position, and controls the respective drive assemblies such that the rotation angle θ from the movement direction becomes zero. That is, the controller 430 may allow the main body to rotate.

Upon wall following, the controller 430 checks a boundary of the wall based on a detection signal from the obstacle detector, and controls the respective drive assemblies such that a first direction of the checked boundary is parallel to a second direction as a heading direction of the main body.

That is, the controller 430 may adjust a rotation angle of the main body such that the main body is parallel to the boundary of an obstacle.

Here, assuming that the cleaning robot moves in a direction, the heading direction of the main body is a direction in which a front face among a plurality of faces of the main body faces the movement direction.

When the stain detector 422 detects a stain on the floor, the controller 430 controls the respective drive assemblies to intensively clean the stain on the floor based on the detected result. In this case, the controller 430 may rotate the rotating plate for a given time to wipe the floor with the entire surface of the pad member after positioning the main body in place.

That is, the controller 430 may change a movement pattern or increase friction to adjust a cleaning strength when a stain is detected.

Upon wall following or obstacle detection, the controller 430 may operate only the obstacle detector mounted on one of plural faces of the main body facing an obstacle or located in a movement direction.

This assists the cleaning robot 1 in recognizing variation of an angle between the main body and the wall, enabling easy wall following.

In addition, the controller 430 may check the content of moisture present in the pad member during cleaning and movement, compare the checked moisture content with a reference moisture content, and control a water supply operation of the chamber based on the result thereof.

The controller 430 may communicate with a charger to enable docking between the cleaning robot 1 and the charger upon judging completion of cleaning.

The drive unit 440 drives the plural motors of each drive assembly in response to an instruction of the controller 430. As the drive unit 440 drives the motors of each drive assembly individually, forward movement, backward movement, lateral movement, curvilinear movement, motion in place, and diagonal movement of the main body as well as rotation of the main body in place may be accomplished.

The display unit 450 displays cleaning reservation information, charge rate information, chamber water-level information, and operation information including operation modes, etc. Here, operation modes include a cleaning mode, a standby mode, a docking mode, etc.

The storage unit 460 stores information regarding positions of the obstacle detectors corresponding to the respective faces of the main body and the stain detector.

The storage unit 460 may also store map information regarding a cleaning region.

The storage unit 460 stores a rotation angle and rotation direction of the rotating plate of each pad assembly as well as a tilting direction (i.e. a contact direction with the floor) of the rotating plate on a per movement pattern basis, for example.

The storage unit 460 may store revolutions per minute of the rotating plate of each pad assembly on a per cleaning mode basis.

When the cleaning robot as described above includes four pad assemblies, the cleaning robot moves using only two pad assemblies arranged at front positions in a movement direction, and the other two pad assemblies are used for wet cleaning of the floor.

Conversely, the cleaning robot may implement cleaning using only two pad assemblies arranged at front positions in a movement direction, and the other two pad assemblies may be used for movement of the cleaning robot.

In addition, when the cleaning robot includes four pad assemblies, the cleaning robot may implement both cleaning and movement using the four pad assemblies In addition, the cleaning robot may set the number of pad assemblies for use in cleaning and the number of pad assemblies for use in movement based on a cleaning mode and a movement pattern.

In this way, the cleaning robot may implement omnidirectional movement without interference by an obstacle, and achieve sufficient friction between the pad members and the floor to realize perfect cleaning.

Figure 17A:
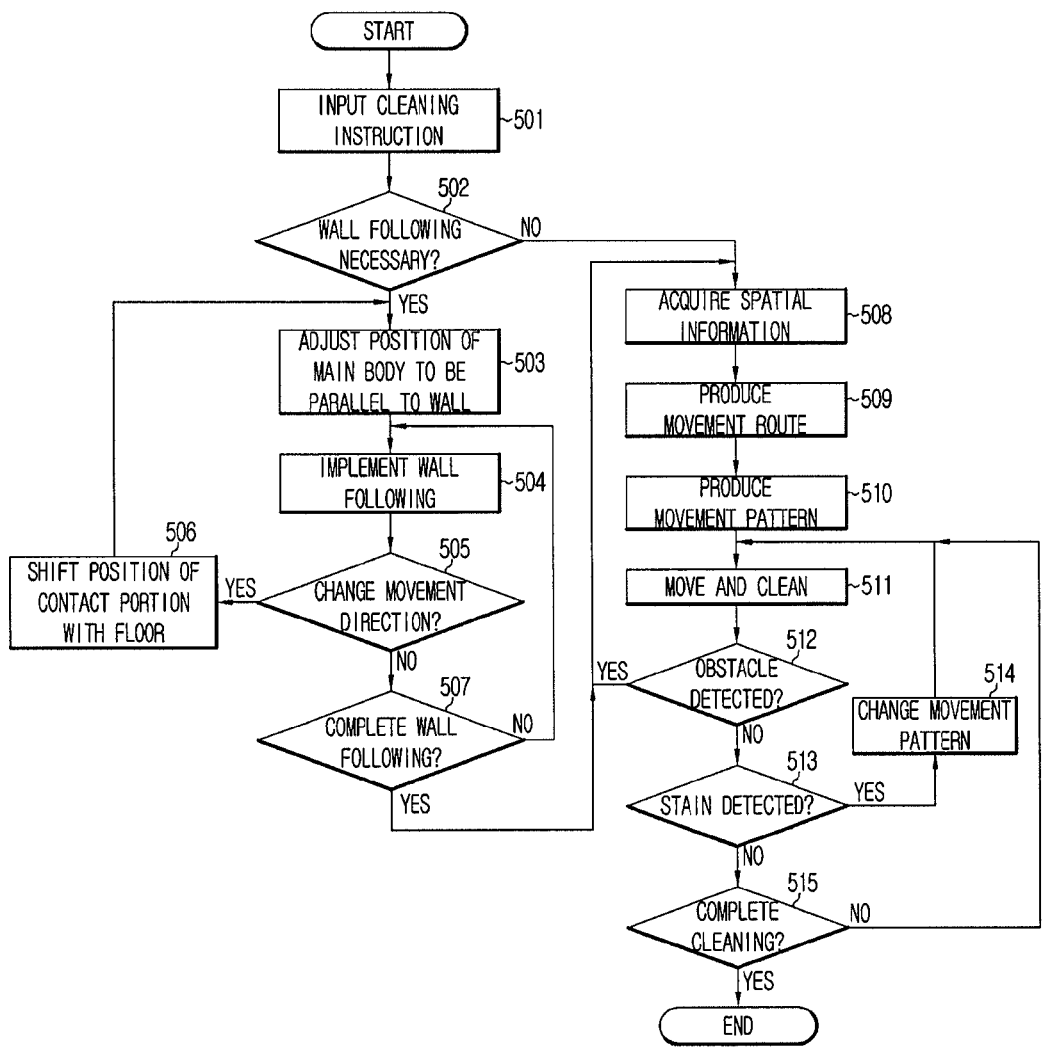
FIGS. 17A and 17B are control flow charts of the cleaning robot according to the embodiment.
Figure 17B:
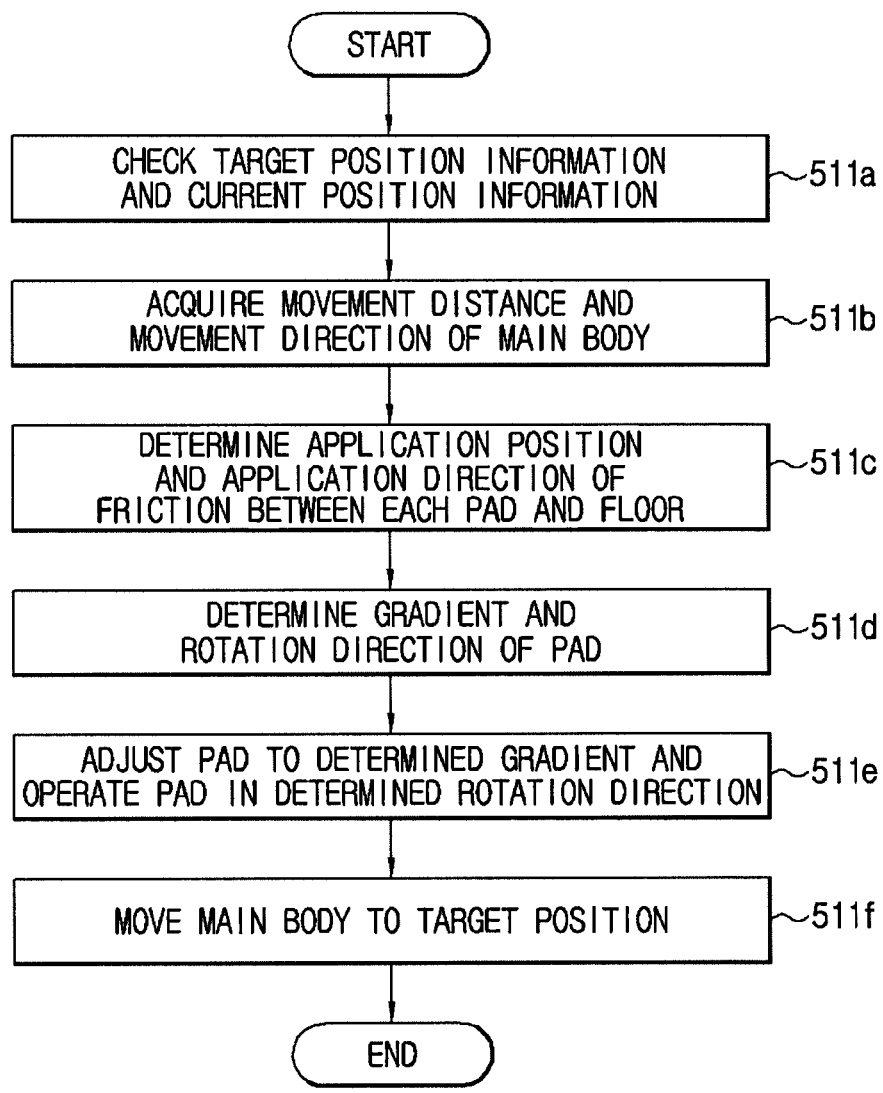

FIGS. 17A and 17B are control flow charts of the cleaning robot according to the embodiment.

A control method that will be described hereinafter may be applied to both the cleaning robot according to the one embodiment and the cleaning robot according to the another embodiment. Hereinafter, the cleaning robot having the four pad assemblies according to the another embodiment will be described by way of example.

When a cleaning instruction is input (501) or when a reserved cleaning time arrives, the cleaning robot controls the respective drive assemblies 360, 370, 380, 390 to adjust friction application positions and directions with respect to the pad members of the respective pad assemblies 320, 330, 340, 350, thereby implementing wet cleaning while moving within a cleaning region.

The cleaning robot moves using friction generated between the pad members and the floor coming into contact with each other, and thus may implement cleaning simultaneously with movement.

When the primary goal is movement, a contact surface area with the floor may be adjusted to be less than a reference size and a movement speed may be adjusted to be greater than a reference speed. When the primary goal is both movement and cleaning, the contact surface area with the floor and the movement speed may be adjusted to be equal to the reference size and the reference speed respectively. When the primary goal is cleaning, the respective pad assemblies may be rotated in place about the Z-axis.

Movement and cleaning of the cleaning robot will now be described in more detail. In addition, the cleaning robot of the present embodiment will be described as simultaneously implementing movement and cleaning by way of example.

When a cleaning instruction is input, the cleaning robot judges whether or not wall following is necessary (502). Upon judging that wall following is necessary, the cleaning robot detects obstacles around the main body using the obstacle detectors 421, and moves to an obstacle, which is predicted as a wall, based on an obstacle detection signal.

Here, judging whether or not wall following is necessary includes judging whether or not the cleaning robot stores map information corresponding to wall following.

In addition, judging whether or not wall following is necessary includes detecting an obstacle in the surroundings before cleaning, judging whether or not map information is changed based on the obstacle detection result, and judging that wall following is necessary upon judging that map information is changed.

As exemplarily shown in FIG. 18, when the cleaning robot 1 completely moves to a position spaced apart from the wall by a given distance, the cleaning robot 1 drives at least two obstacle detectors arranged on any one of faces of the main body adjacent to the wall, and detects distances d1, d2 between any one face of the main body and the wall based on obstacle detection signals from the at least two obstacle detectors.

Next, the cleaning robot 1 judges whether or not any one face of the main body is parallel to the wall by comparing the two distances d1, d2 with each other. Upon judging that any one face of the main body is not parallel to the wall, the cleaning robot 1 controls the respective drive assemblies to adjust a position of the main body such that any one face of the main body is parallel to the wall (503).

Here, any one face of the main body is the face provided with the obstacle detectors that have detected the distances from the wall.

That is, the cleaning robot 1 judges that any one face of the main body is parallel to the wall when the two distances are equal to each other, and judges that any one face of the main body is not parallel to the wall when the two distances differ from each other. Upon judging that any one face of the main body is not parallel to the wall, the cleaning robot 1 predicts a rotation angle of the main body based on a difference between the two distances, and controls rotation of the main body such that the main body is rotated by the predicted rotation angle.

When the main body is parallel to the wall, position adjustment of the main body may be omitted.

Next, the cleaning robot 1 implements wall following to move along the wall (504), and judges whether or not change of a movement direction is necessary during wall following (505).

Here, judging whether or not change of a movement direction is necessary includes judging whether a front obstacle in front of the cleaning robot 1 is detected using the obstacle detectors provided at a front face of the main body in a movement direction or whether the wall is not detected using the obstacle detectors provided at a face adjacent to the wall that the cleaning robot 1 is following.

When the front obstacle is detected or the wall is not detected, the cleaning robot 1 controls the respective drive assemblies to shift contact positions of the pad members with the floor so as to change a movement direction (506). Then, implementing wall following after adjusting a position of the main body such that the main body is parallel to the wall present in the changed movement direction is repeated.

In addition, when the main body is parallel to the wall, position adjustment of the main body may be omitted.

Hereinafter, wall following will be described with reference to FIGS. 19, 20, and 21.

Figure 19:
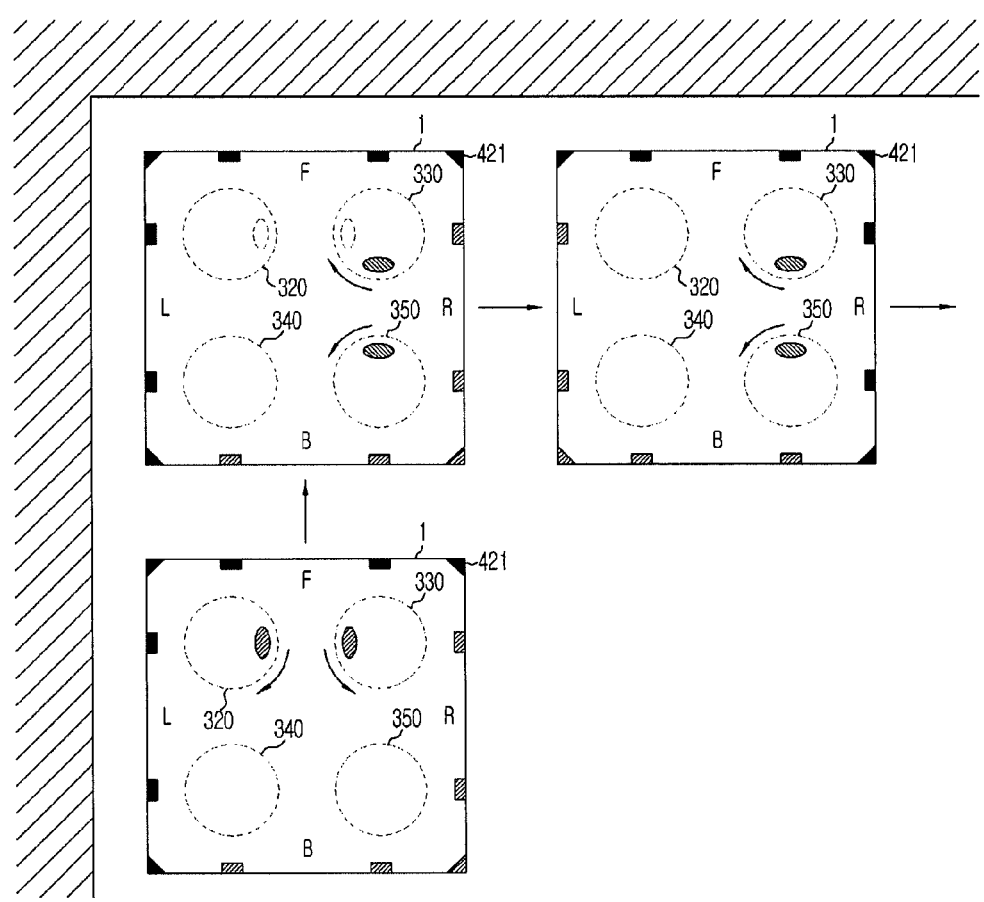

As exemplarily shown in FIG. 19, the cleaning robot 1 drives the first motor and the second motor of the first drive assembly such that the rotating plate of the first pad assembly 320 has a set gradient with the floor and also drives the first motor and the second motor of the second drive assembly such that the rotating plate of the second pad assembly 330 has a set gradient with the floor, thereby causing the pad members of the first pad assembly 320 and the second pad assembly 330 to partially come into contact with the floor.

Here, the set gradient is a gradient for easy movement, and may be constant or vary according to straight movement, diagonal movement, curvilinear movement, motion in place, etc.

As the cleaning robot 1 rotates the pad member of the first pad assembly 320 in a first rotation direction in a state in which an inner portion of the pad member comes into contact with the floor and rotates the pad member of the second pad assembly 330 in a second rotation direction in a state in which an inner portion of the pad member comes into contact with the floor, friction is applied to a front center portion of the lower surface of the main body, thus causing the cleaning robot 1, having the first face F as a front face, to move forward using the friction.

In this case, the pad member of the third pad assembly 340 and the pad member of the fourth pad assembly 350 may be rotated while partially coming into contact with the floor to apply additional movement force to the main body, in the same manner as the first and second pad assemblies 320, 330.

In addition, the pad member of the third pad assembly 340 and the pad member of the fourth pad assembly 350 may be adapted to wholly come into contact with the floor while applying less friction than that applied to contact portions of the first and second pad assemblies 320 and 330, so as to clean the floor.

In this case, the cleaning robot 1 moves parallel to the wall with a constant distance therebetween using obstacle detection signals from the obstacle detectors provided at the third face L adjacent to the wall. In addition, the cleaning robot 1 checks whether the wall that the cleaning robot 1 is following is not detected using obstacle detection signals from the obstacle detectors provided at the third face L, and judges the presence of a wall located in front of the cleaning robot 1 using obstacle detection signals from the obstacle detectors provided at the first face F that is a front face in a movement direction.

That is, the cleaning robot 1 activates only the obstacle detectors mounted to some of the plural faces of the main body, i.e. the front face in a movement direction and the face adjacent to the wall.

When the obstacle detectors detect a wall in front of the cleaning robot 1 during wall following, the cleaning robot 1 stops movement and drives the first motor and the second motor of the second drive assembly respectively such that the rotating plate of the second pad assembly 330 has a set gradient with the floor and also drives the first motor and the second motor of the fourth drive assembly respectively such that the rotating plate of the fourth pad assembly 350 has a set gradient with the floor, thereby causing the pad members of the second pad assembly 330 and the fourth pad assembly 350 to partially come into contact with the floor.

As the cleaning robot 1 rotates the pad member of the second pad assembly 330 in a first rotation direction in a state in which an inner portion of the pad member comes into contact with the floor and rotates the pad member of the fourth pad assembly 350 in a second rotation direction in a state in which an inner portion of the pad member comes into contact with the floor, friction is applied to a right center portion of the lower surface of the main body, thus causing the cleaning robot 1, having the fourth face R as a front face, to move forward using the friction.

In this case, the pad member of the first pad assembly 320 and the pad member of the third pad assembly 340 may be rotated while partially coming into contact with the floor to apply additional movement force to the main body, in the same manner as the second and fourth pad assemblies 330, 350.

In addition, the cleaning robot 1 moves parallel to the wall with a constant distance therebetween using obstacle detection signals from the obstacle detectors provided at the first face F adjacent to the wall. In addition, the cleaning robot 1 checks whether the wall that the cleaning robot 1 is following is not detected using obstacle detection signals from the obstacle detectors provided at the first face F, and judges the presence of a wall located in front of the cleaning robot 1 using obstacle detection signals from the obstacle detectors provided at the fourth face R that is a front face in a movement direction.

In this way, the cleaning robot 1 may change a movement direction without rotation of the main body, which may reduce wall following time.

Figure 20:
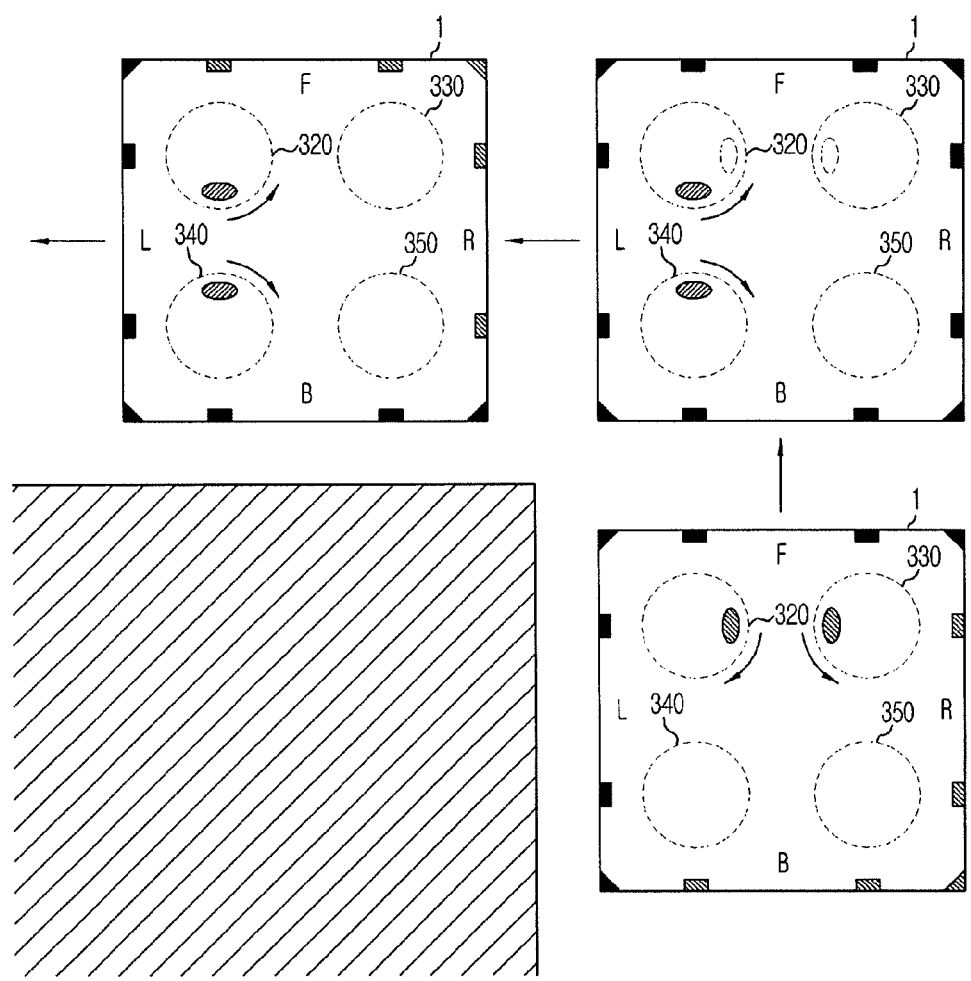

As exemplarily shown in FIG. 20, the cleaning robot 1 drives the first motor and the second motor of the first drive assembly respectively such that the rotating plate of the first pad assembly 320 has a set gradient with the floor and also drives the first motor and the second motor of the second drive assembly respectively such that the rotating plate of the second pad assembly 330 has a set gradient with the floor, thereby causing the pad members of the first pad assembly 320 and the second pad assembly 330 to partially come into contact with the floor.

As the cleaning robot 1 rotates the pad member of the first pad assembly 320 in a first rotation direction in a state in which an inner portion of the pad member comes into contact with the floor and rotates the pad member of the second pad assembly 330 in a second rotation direction in a state in which an inner portion of the pad member comes into contact with the floor, friction is applied to a front center portion of the lower surface of the main body, thus causing the cleaning robot 1, having the first face F as a front face, to move forward using the friction.

In this case, the pad member of the third pad assembly 340 and the pad member of the fourth pad assembly 350 may be rotated while partially coming into contact with the floor to apply additional movement force to the main body, in the same manner as the first and second pad assemblies 320, 330.

During wall following, the cleaning robot 1 moves parallel to the wall with a constant distance therebetween using obstacle detection signals from the obstacle detectors provided at the third face L adjacent to the wall. In addition, the cleaning robot 1 checks whether the wall that the cleaning robot 1 is following is not detected using obstacle detection signals from the obstacle detectors provided at the third face L, and judges the presence of a wall located in front of the cleaning robot 1 using obstacle detection signals from the obstacle detectors provided at the first face F that is a front face in a movement direction.

Upon judging that the obstacle detectors do not detect the wall that the cleaning robot 1 is following during wall following, the cleaning robot 1 stops movement. Then, the cleaning robot 1 operates the obstacle detectors provided at the first face F, the second face B, the third face L, and the fourth face R to detect a wall in the surroundings, and moves to the detected wall. The following description assumes that a wall is present at the left of the cleaning robot 1 and thus the cleaning robot 1 moves leftward.

The cleaning robot 1 drives the first motor and the second motor of the first drive assembly respectively such that the rotating plate of the first pad assembly 320 has a set gradient with the floor and also drives the first motor and the second motor of the third drive assembly respectively such that the rotating plate of the third pad assembly 340 has a set gradient with the floor, thereby causing the pad members of the first pad assembly 320 and the third pad assembly 340 to partially come into contact with the floor.

As the cleaning robot 1 rotates the pad member of the first pad assembly 320 in a second rotation direction in a state in which an inner portion of the pad member comes into contact with the floor and rotates the pad member of the third pad assembly 340 in a first rotation direction in a state in which an inner portion of the pad member comes into contact with the floor, friction is applied to a left center portion of the lower surface of the main body, thus causing the cleaning robot 1, having the third face L as a front face, to move forward using the friction.

Here, the first rotation direction is a clockwise direction, and the second rotation direction is a counterclockwise direction.

In this case, the pad member of the second pad assembly 330 and the pad member of the fourth pad assembly 350 may be rotated while partially coming into contact with the floor to apply additional movement force to the main body, in the same manner as the first and third pad assemblies 320, 340.

The cleaning robot 1 moves parallel to the wall with a constant distance therebetween using obstacle detection signals from the obstacle detectors provided at the second face B adjacent to the wall. In addition, the cleaning robot 1 checks whether the wall that the cleaning robot 1 is following is not detected using obstacle detection signals from the obstacle detectors provided at the second face B, and judges the presence of a wall located in front of the cleaning robot 1 using obstacle detection signals from the obstacle detectors provided at the third face L that is a front face in a movement direction.

In this way, the cleaning robot 1 may change a movement direction without rotation of the main body, which may reduce wall following time.

Figure 21:
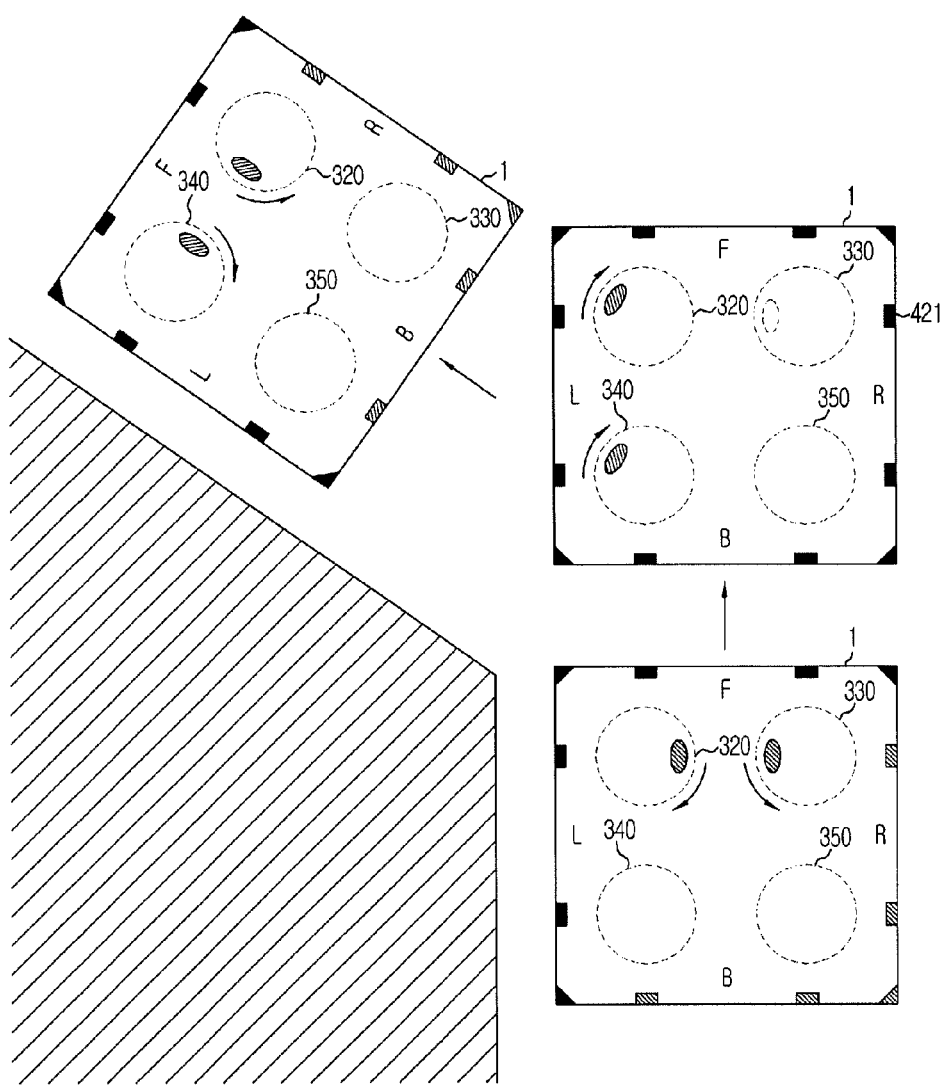

As exemplarily shown in FIG. 21, the cleaning robot 1 drives the first motor and the second motor of the first drive assembly respectively such that the rotating plate of the first pad assembly 320 has a set gradient with the floor and also drives the first motor and the second motor of the second drive assembly respectively such that the rotating plate of the second pad assembly 330 has a set gradient with the floor, thereby causing the pad members of the first pad assembly 320 and the second pad assembly 330 to partially come into contact with the floor.

As the cleaning robot 1 rotates the pad member of the first pad assembly 320 in a first rotation direction in a state in which an inner portion of the pad member comes into contact with the floor and rotates the pad member of the second pad assembly 330 in a second rotation direction in a state in which an inner portion of the pad member comes into contact with the floor, friction is applied to a front center portion of the lower surface of the main body, thus causing the cleaning robot 1, having the first face F as a front face, to move forward using the friction.

In this case, the pad member of the third pad assembly 340 and the pad member of the fourth pad assembly 350 may be rotated while partially coming into contact with the floor to apply additional movement force to the main body, in the same manner as the first and second pad assemblies 320, 330.

During wall following, the cleaning robot 1 moves parallel to the wall with a constant distance therebetween using obstacle detection signals from the obstacle detectors provided at the third face L adjacent to the wall. In addition, the cleaning robot 1 checks whether the wall that the cleaning robot 1 is following is not detected using obstacle detection signals from the obstacle detectors provided at the third face L, and judges the presence of a wall located in front of the cleaning robot 1 using obstacle detection signals from the obstacle detectors provided at the first face F that is a front face in a movement direction.

Upon judging that the obstacle detectors do not detect the wall that the cleaning robot 1 is following during wall following, the cleaning robot 1 stops movement. Then, the cleaning robot 1 operates the obstacle detectors provided at the first face F, the second face B, the third face L, and the fourth face R to detect a wall in the surroundings. When a specific one of the obstacle detectors detects a wall, the cleaning robot 1 judges whether or not the detected wall has a right angle with the previous wall based on obstacle detection signals from some obstacle detectors arranged on the same face as the specific obstacle detector that has detected the wall. Upon judging that the detected wall does not have a right angle with the previous wall, the cleaning robot 1 predicts an angle between the detected wall and the previous wall based on obstacle detection signals from the obstacle detectors on the same face, and calculates a rotation angle of the main body based on the predicted angle.

Next, the cleaning robot 1 adjusts a position of the main body based on the calculated rotation angle such that the main body is parallel to the detected wall.

The following description assumes that a wall, which does not have a right angle with the previous wall, is present at the left of the cleaning robot 1 and thus the cleaning robot 1 moves leftward.

The cleaning robot 1 drives the first motor and the second motor of the first drive assembly respectively such that the rotating plate of the first pad assembly 320 has a set gradient with the floor and also drives the first motor and the second motor of the third drive assembly respectively such that the rotating plate of the third pad assembly 340 has a set gradient with the floor, thereby causing the pad members of the first pad assembly 320 and the third pad assembly 340 to partially come into contact with the floor.

As the cleaning robot 1 rotates the pad member of the first pad assembly 320 in a first rotation direction in a state in which an inner portion of the pad member comes into contact with the floor and rotates the pad member of the third pad assembly 340 in a first rotation direction in a state in which an inner portion of the pad member comes into contact with the floor, friction is applied to contact portions of the two pad members.

In this case, to allow the main body to be parallel to the detected wall, the cleaning robot 1 predicts a first movement distance, by which the first pad assembly 320 must move, and a second movement distance, by which the third pad assembly 340 must move. In addition, the cleaning robot 1 checks revolutions per minute of the rotating plate of the first pad assembly 320 required to allow the first pad assembly 320 to move by the first movement distance, and revolutions per minute of the rotating plate of the third pad assembly 340 required to allow the third pad assembly 340 to move by the second movement distance.

Then, the cleaning robot 1 rotates the rotating plate of the first pad assembly 320 and the rotating plate of the third pad assembly 340 about the Z-axis respectively at the checked revolutions per minute. That is, revolutions per minute the first pad assembly 320 and the third pad assembly 340 are differently controlled.

In addition, greater friction applied to the pad member of the first pad assembly 320 than friction applied to the pad member of the third pad assembly 340 may be accomplished by providing the rotating plate of the first pad assembly 320 and the rotating plate of the third pad assembly 340 with different gradients to provide the pad member of the first pad assembly 320 and the pad member of the third pad assembly 340 with different contact surface areas.

In this way, the main body is rotated using different magnitudes of friction applied to the pad member of the first pad assembly 320 and the pad member of the third pad assembly 340.

In this case, the pad member of the second pad assembly 330 and the pad member of the fourth pad assembly 350 may be rotated while partially coming into contact with the floor to apply additional movement force to the main body, in the same manner as the first and third pad assemblies 320, 340.

The cleaning robot 1 moves parallel to the wall with a constant distance therebetween using obstacle detection signals from the obstacle detectors provided at the third face L adjacent to the wall. In addition, the cleaning robot 1 checks whether the wall that the cleaning robot 1 is following is not detected using obstacle detection signals from the obstacle detectors provided at the third face L, and judges the presence of a wall located in front of the cleaning robot 1 using obstacle detection signals from the obstacle detectors provided at the first face F that is a front face in a movement direction.

In this way, even if two neighboring walls are not perpendicular to each other, wall following may be accomplished via rotation of the main body. In addition, only some of the obstacle detectors may be activated based on a direction in which the wall is located, which may reduce power consumption.

Next, upon judging that change of a movement direction is not necessary, the cleaning robot 1 judges whether or not to complete wall following (507). Upon judging completion of wall following, the cleaning robot 1 completes wall following and implements cleaning.

Here, judging whether or not to complete wall following includes judging whether or not a current position is an initial position of wall following.

In addition, when map information is stored in the storage unit 460, the cleaning robot 1 implements wet cleaning based on previously stored map information without requiring wall following.

Now, a cleaning method will be described in more detail with reference to FIG. 17B, and FIGS. 22 to 28.

Figure 22:
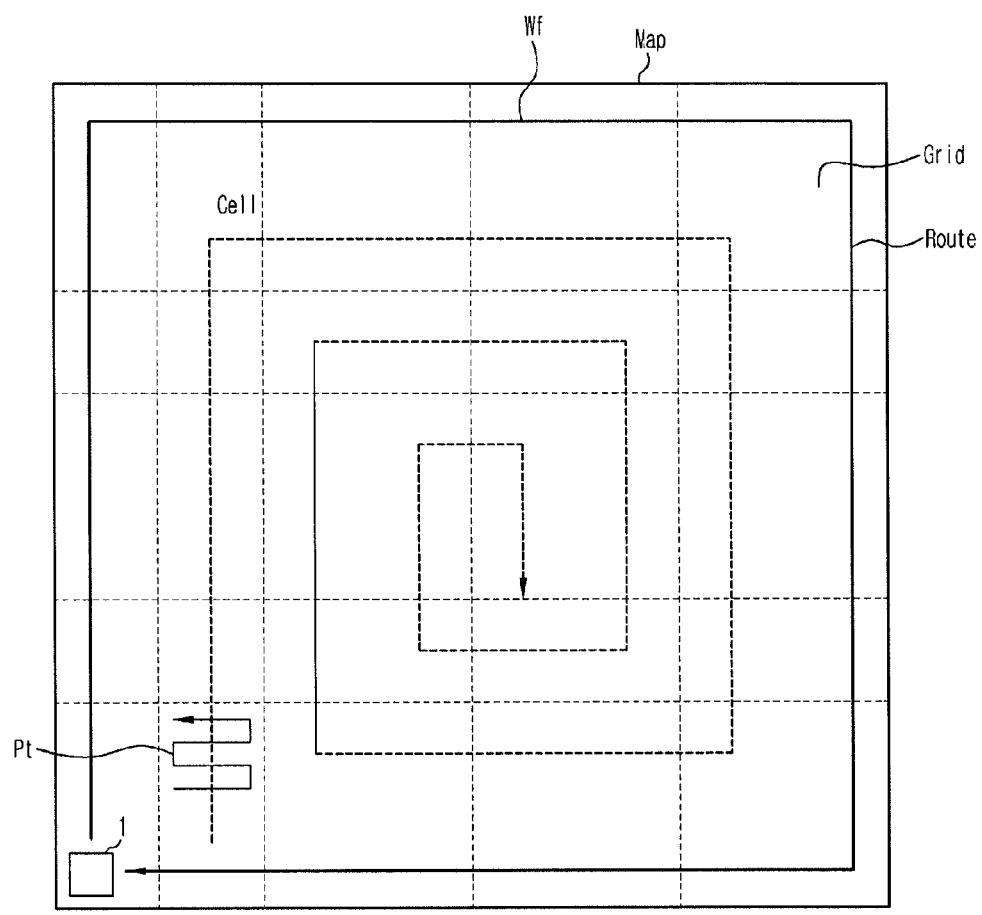
FIG. 22 is a view illustrating production of a movement route and movement pattern of the cleaning robot according to the embodiment.

As exemplarily shown in FIG. 22, the cleaning robot 1 acquires map information Map of a cleaning region based on wall following information Wf, and acquires spatial information of the cleaning region by checking an area of the cleaning region based on the acquired map information (508). In addition, the cleaning robot 1 may acquire spatial information of the cleaning region based on previously stored map information.

Here, a wall may be an actual wall present in the cleaning region, and may be a boundary of a virtual space.

Next, the cleaning robot 1 divides each cleaning region into grids Grid based on the acquired spatial information, i.e. the area of the cleaning region. As such, each cleaning region consists of a plurality of cells Cell.

Next, the cleaning robot 1 produces an optimum movement route based on the spatial information (509). Here, the optimum movement route is a movement route to reduce cleaning time or to enhance cleaning efficiency.

Next, the cleaning robot produces a movement pattern Pt based on the produced movement route, cell information, and a cleaning mode (510).

Here, the movement pattern is any one pattern between a curvilinear pattern and a straight pattern to reduce cleaning time and enhance cleaning efficiency, or may be a movement pattern selected by the user.

Next, the cleaning robot 1 may determine optimum friction based on a cleaning mode selected by the user, the movement route, and the movement pattern, and may determine tilting angles and tilting directions of the rotating plates with respect to the floor and revolutions per minute of the rotating plates, respectively, to apply the determined friction.

Next, the cleaning robot 1 implements cleaning while moving about the cleaning region by driving the first motor, the second motor, and the third motor of the respective drive assemblies based on the tilting angles, tilting directions, revolutions per minute of the rotating plates of the respective pad assemblies (511).

During movement and cleaning, the cleaning robot 1 uses two pad assemblies arranged at the front in a movement direction for movement, and uses the other two pad assemblies arranged at the rear for cleaning.

In addition, the cleaning robot may implement cleaning and movement using four pad assemblies, and may use two pad assemblies arranged at the front in a movement direction for cleaning, and use the other two pad assemblies arranged at the rear for movement.

Movement and cleaning of the cleaning robot 1 will be described hereinafter with reference to FIG. 17A.

As exemplarily shown in FIG. 17B, the cleaning robot 1 checks target position information and current position information (511a).

Next, the cleaning robot 1 acquires a movement distance and movement direction of the main body based on the checked current position information and target position information (511b), and determines an application position and application direction of friction between the plural pad members and the floor based on the movement distance and movement direction (511c).

Next, the cleaning robot 1 determines gradients and rotation directions of the pad members based on the application position and application direction of friction (511d), adjusts the gradients of the pad members and operates the pad members in the determined rotation directions (511e), and moves the main body to a target position (511f).

The cleaning robot 1 moves about the cleaning region in the produced movement pattern along the movement route by repeating the above-described process.

Then, the cleaning robot 1 detects an obstacle, such as furniture or office utensils, present in the cleaning region during movement and cleaning (512), checks a distance from the obstacle based on obstacle detection signals from the obstacle detectors, and changes a position of a contact portion of each pad member coming into contact with the floor based on the result. In this way, the cleaning robot 1 implements wet cleaning in the cleaning region while autonomously changing directions.

Movement and cleaning of the cleaning robot 1 based on change of a movement direction will hereinafter be described with reference to FIGS. 23 to 25.

Figure 23:
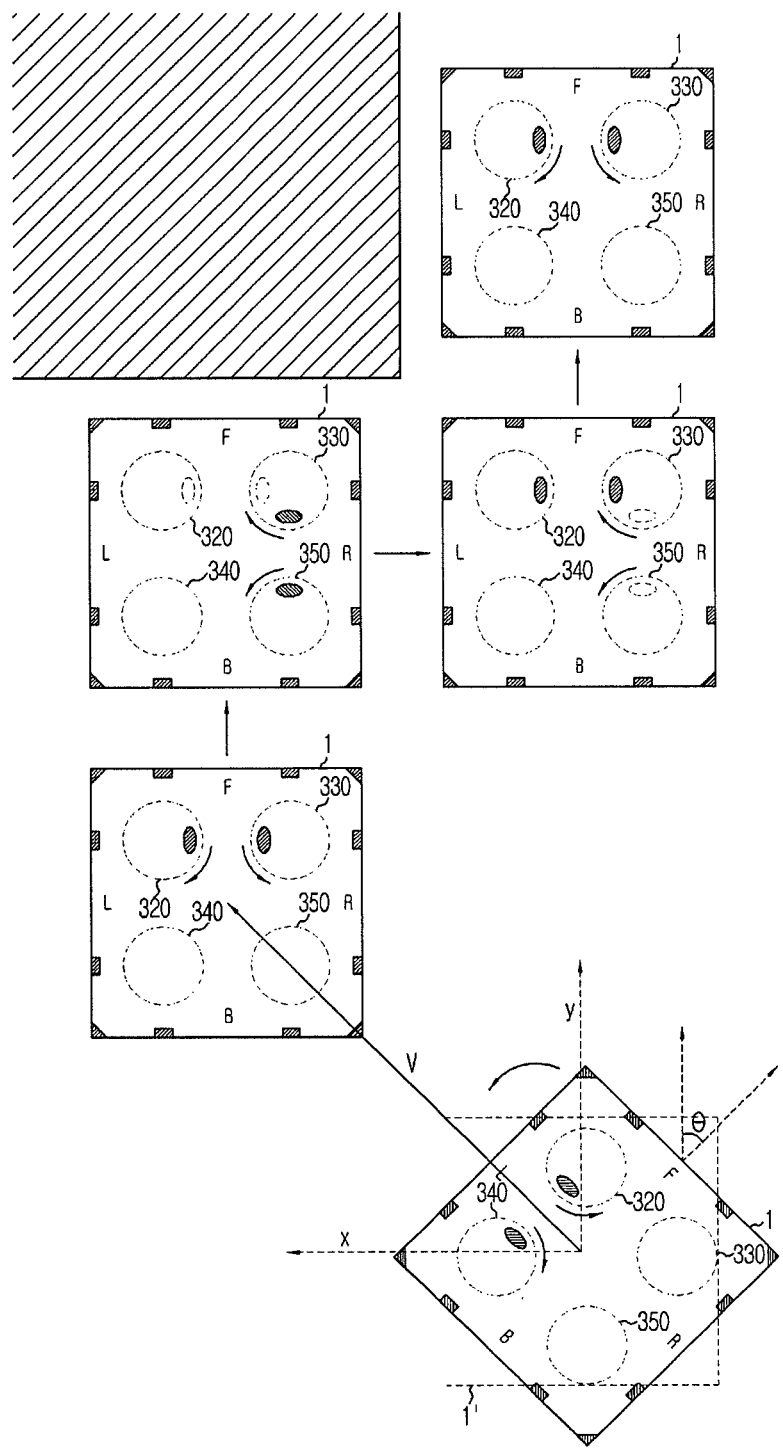
FIG. 23 is a view illustrating movement of the cleaning robot during cleaning according to the embodiment.

As exemplarily shown in FIG. 23, the cleaning robot 1 checks a first direction that one face of the main body set to a front face faces among current attitude information of the main body, determines a required rotation angle $\theta$ of the main body based on the first direction and a second direction that is a selected movement direction for cleaning, determines rotation angles of the first and second motors of the first, second, third, and fourth drive assemblies to rotate the main body by the determined rotation angle $\theta$, and rotates the first and second motors of the first, second, third, and fourth drive assemblies by the respective determined rotation angles.

Then, the cleaning robot 1 determines rotation directions of the third motors of the first, second, third, and fourth drive assemblies based on the rotation direction of the main body and friction application directions of the respective pad members, and rotates the third motors of the first, second, third, and fourth drive assemblies in the determined rotation directions.

As the cleaning robot 1 rotates the third motors of the first, second, third, and fourth drive assemblies in a state in which gradients of the rotating plates of the first, second, third, and fourth pad assemblies are adjusted to allow the respective pad members to come into contact with the floor, the cleaning robot 1 causes a direction that any one face of the main body faces to coincide with a movement direction.

In addition, the cleaning robot 1 acquires information regarding a vector v from a current position to a target position based on current position information, i.e. current coordinates (x1, y1) and target position information, i.e. target coordinates (xd, yd) (see FIG. 16), determines rotation angles of the first and second motors of the first, second, third, and fourth drive assemblies to move the main body based on the acquired vector information, and rotates the first and second motors of the first, second, third, and fourth drive assemblies by the respective determined rotation angles.

Then, the cleaning robot 1 determines rotation directions of the third motors of the first, second, third, and fourth drive assemblies based on the movement direction of the main body and friction application directions of the respective pad members, and rotates the third motors of the first, second, third, and fourth drive assemblies in the determined rotation directions.

As the cleaning robot 1 rotates the third motors of the first, second, third, and fourth drive assemblies in a state in which gradients of the rotating plates of the first, second, third, and fourth pad assemblies are adjusted to allow the respective pad members to come into contact with the floor, the cleaning robot 1 causes the main body to move to the target position based on the vector information.

Although the sequence of first rotating the main body and then, moving the main body has been described above, it may be possible to rotate the main body after moving the main body.

In addition, the cleaning robot 1 may determine movement distances X, Y of the main body from a current position of the main body to a target position for implementation of cleaning based on a movement route and movement pattern, and may primarily move the main body in the X-axis and thereafter secondarily move the main body in the Y-axis.

Even in this case, the cleaning robot 1 determines rotation angles of the first and second motors of the first, second, third, and fourth drive assemblies to move the main body based on the determined movement distances in the X-axis and the Y-axis, rotates the first and second motors of the first, second, third, and fourth drive assemblies by the respective determined rotation angles, determines rotation directions of the third motors of the first, second, third, and fourth drive assemblies based on the movement direction of the main body and friction application directions of the respective pad members, and rotates the third motors of the first, second, third, and fourth drive assemblies in the determined rotation directions.

Thereby, the cleaning robot 1 moves the main body to a target position using torque of the third motors of the first, second, third, and fourth drive assemblies in a state in which gradients of the rotating plates of the first, second, third, and fourth pad assemblies are adjusted to allow the respective pad members to come into contact with the floor.

After moving to the target position for cleaning, the cleaning robot 1 determines contact positions and contact surface areas of the contact portions of the pad members, the magnitudes of friction, and friction application directions, respectively, based on a movement pattern and cleaning mode.

That is, the cleaning robot determines rotation angles, rotation directions, and revolutions per minute of the rotating plates of the first, second, third, and fourth pad assemblies corresponding to the determined contact positions and contact surface areas of the contact portions of the pad members, the determined magnitudes of friction, and the determined friction application directions.

More specifically, the cleaning robot 1 determines rotation angles of the rotating plate of the first pad assembly 320 about the X-axis and the Y-axis, rotation angles of the rotating plate of the second pad assembly 330 about the X-axis and the Y-axis, rotation angles of the rotating plate of the third pad assembly 340 about the X-axis and the Y-axis, and rotation angles of the rotating plate of the fourth pad assembly 350 about the X-axis and the Y-axis.

In addition, the cleaning robot 1 determines a rotation direction about the Z-axis and revolutions per minute of the rotating plate of the first pad assembly 320, a rotation direction about the Z-axis and revolutions per minute of the rotating plate of the second pad assembly 330, a rotation direction about the Z-axis and revolutions per minute of the rotating plate of the third pad assembly 340, and a rotation direction about the Z-axis and revolutions per minute of the rotating plate of the fourth pad assembly 350.

Next, the cleaning robot 1 determines rotation angles of the first and second motors of the first drive assembly, the second drive assembly, the third drive assembly, and the fourth drive assembly corresponding respectively to rotation angles of the rotating plates of the pad assembles, and rotates the first and second motors of the respective drive assemblies by the determined rotation angles. In addition, the cleaning robot 1 determines rotation directions and revolutions per minute of the third motors of the first drive assembly, the second drive assembly, the third drive assembly, and the fourth drive assembly corresponding to rotation directions and revolutions per minute of the rotating plates of the respective pad assemblies, and rotates the third motors of the respective drive assemblies in the determined rotation directions and at the determined revolutions per minute.

For example, the cleaning robot 1 drives the first motor and the second motor of the first drive assembly to provide the rotating plate of the first pad assembly 320 with a set gradient with the floor and drives the first motor and the second motor of the second drive assembly to provide the rotating plate of the second pad assembly 330 with a set gradient with the floor, thereby causing the pad members of the first pad assembly and the second pad assembly to partially come into contact with the floor.

As the cleaning robot 1 rotates the pad member of the first pad assembly 320 in a first rotation direction in a state in which an inner portion of the pad member comes into contact with the floor and rotates the pad member of the second pad assembly 330 in a second rotation direction in a state in which an inner portion of the pad member comes into contact with the floor, friction is applied to a front center portion of the lower surface of the main body, thus causing the cleaning robot 1, having the first face F as a front face, to move forward using the friction.

In this case, the pad member of the third pad assembly 340 and the pad member of the fourth pad assembly 350 may be rotated while partially coming into contact with the floor to apply additional movement force to the main body.

Figure 24:
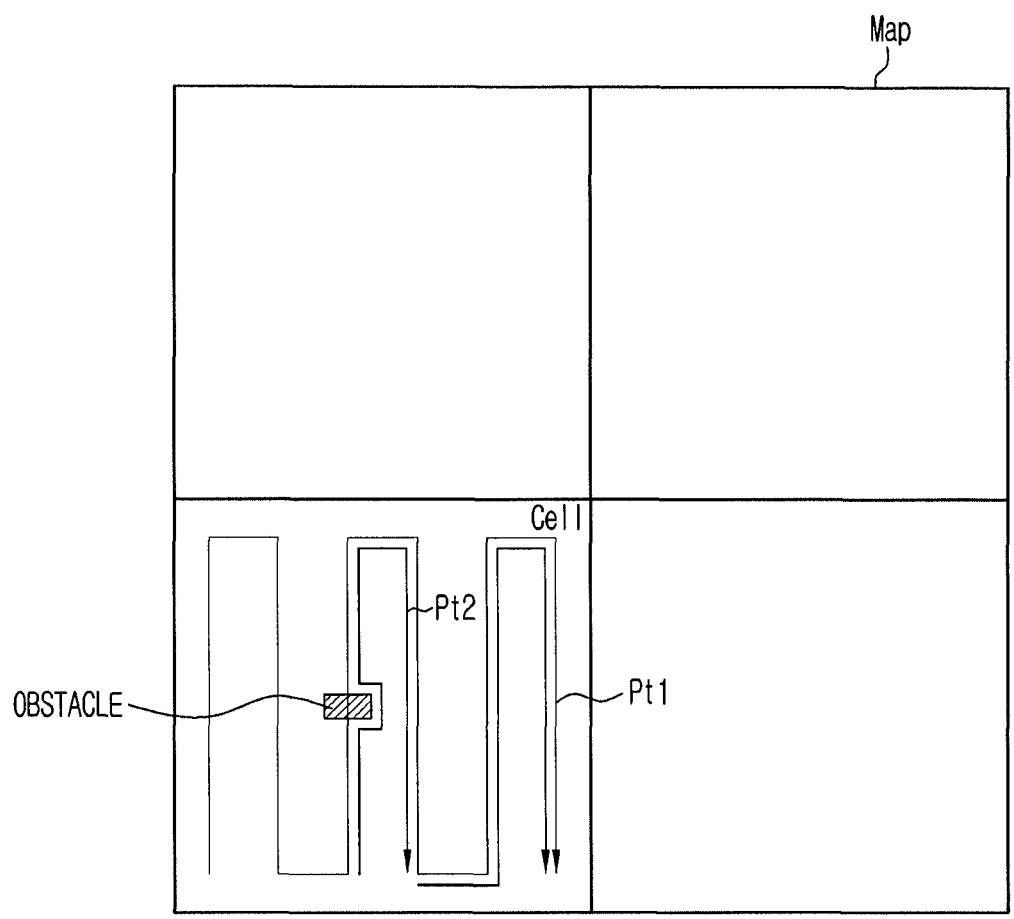
FIG. 24 is a view illustrating reproduction of a movement pattern of the cleaning robot when an obstacle is detected during cleaning according to the embodiment.

As exemplarily shown in FIGS. 23 and 24, the cleaning robot 1 checks whether or not an obstacle is present at the front side or the lateral side in a movement direction using the obstacle detectors provided at the respective faces of the main body during cleaning and movement, stops movement upon judging that the obstacle is present at the front side, corrects map information by adding position information of the obstacle to the map information, and reproduces a movement route and movement pattern.

In addition, the cleaning robot 1 judges whether or not to correct the movement route based on detection signals from the obstacle detectors, and corrects only the movement pattern without correction of the movement route upon judging that the obstacle is located only in a cell where the main body is currently located.

That is, in the case of correcting only the movement pattern in the map, the cleaning robot 1 checks an avoidance route, along which the cleaning robot 1 may move while avoiding the obstacle, reproduces a movement pattern Pt1, produced before obstacle detection, into a new movement pattern Pt2 based on the checked avoidance route, and moves in the reproduced movement pattern Pt2.

The cleaning robot 1 corrects the movement route as well as the movement pattern upon judging that the obstacle is located in another cell as well as the cell where the main body is currently located.

Figure 25:
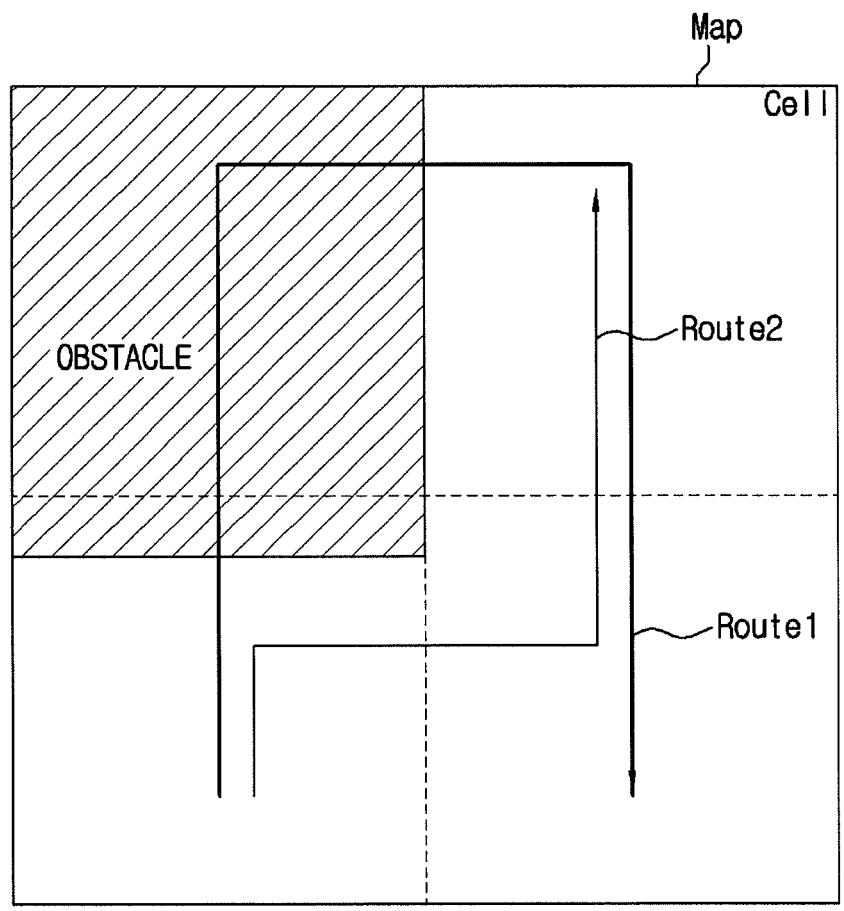
FIG. 25 is a view illustrating reproduction of a movement route of the cleaning robot during cleaning according to the embodiment.

As exemplarily shown in FIG. 25, in the case of correcting the movement route in the map, the cleaning robot 1 produces a movement route, along which the cleaning robot 1 may move from a current cell to the other cells while avoiding the obstacle. As such, the cleaning robot 1 reproduces a movement route Route 1, produced before obstacle detection, into a new movement route Route 2, and implements cleaning while moving along the reproduced movement route Route 2.

In addition, the cleaning robot 1 may change the movement route even when the obstacle is located only in one cell.

Then, the cleaning robot 1 acquires target position information, i.e. target coordinates based on the reproduced movement route and movement pattern, and moves based on the acquired target coordinates and current coordinates.

To this end, the cleaning robot 1 drives the first motor and the second motor of the second drive assembly to provide the rotating plate of the second pad assembly 330 with a set gradient with the floor and drives the first motor and the second motor of the fourth drive assembly to provide the rotating plate of the fourth pad assembly 350 with a set gradient with the floor, thereby causing the pad members of the second pad assembly 330 and the fourth pad assembly 350 to partially come into contact with the floor.

As the cleaning robot 1 rotates the pad member of the second pad assembly 330 in a first rotation direction in a state in which an inner portion of the pad member comes into contact with the floor and rotates the pad member of the fourth pad assembly 350 in a second rotation direction in a state in which an inner portion of the pad member comes into contact with the floor, friction is applied to contact portions of the two pad members, thus causing the cleaning robot 1, having the fourth face R as a front face, to move forward using the friction.

In the case of the above-described straight movement, the cleaning robot 1 may move based on the size of the obstacle, and may move based on a given constant.

Upon judging that no obstacle is detected by the obstacle detectors while the cleaning robot 1 having the fourth face R as a front face is moving forward, the cleaning robot 1 stops movement. Then, the cleaning robot 1 drives the first motor and the second motor of the first drive assembly respectively such that the rotating plate of the first pad assembly 320 has a set gradient with the floor and also drives the first motor and the second motor of the second drive assembly respectively such that the rotating plate of the second pad assembly 330 has a set gradient with the floor, thereby causing the pad members of the first pad assembly 320 and the second pad assembly 330 to partially come into contact with the floor.

As the cleaning robot 1 rotates the pad member of the first pad assembly 320 in a first rotation direction in a state in which an inner portion of the pad member comes into contact with the floor and rotates the pad member of the second pad assembly 330 in a second rotation direction in a state in which an inner portion of the pad member comes into contact with the floor, friction is applied to a front center portion of the lower surface of the main body, thus causing the cleaning robot 1, having the first face F as a front face, to move forward using the friction.

The cleaning robot 1 may move while avoiding the obstacle without rotation of the main body by adjusting only contact positions of the contact portions of the pad members coming into contact with the floor and friction application directions.

In addition, the cleaning robot 1 detects a stain on the floor during cleaning and movement (513), changes a movement pattern based on stain detection results from the stain detector (514), and cleans the stain based on the changed movement pattern. This will hereinafter be described with reference to FIG. 26.

Figure 26:
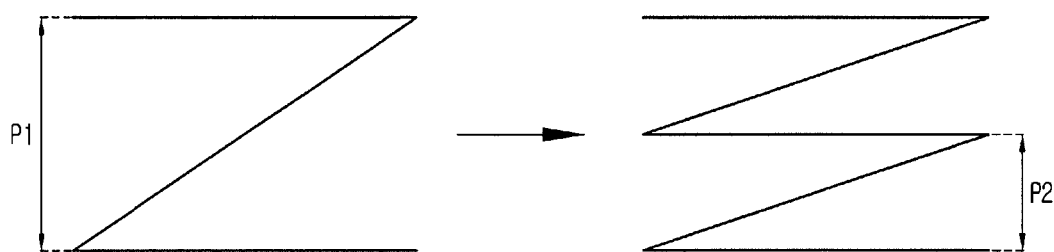
FIG. 26 is a view illustrating reproduction of a movement pattern of the cleaning robot when a stain is detected during cleaning according to the embodiment.

As exemplarily shown in FIG. 26, the cleaning robot 1 implements cleaning while moving in a cell in a zigzag pattern having a first pitch length P1. In this case, when the stain detector detects a stain, the cleaning robot 1 changes the zigzag movement pattern having the first pitch length P1 to a zigzag pattern having a second pitch length P2, and implements cleaning while moving in the cell based on the changed movement pattern.

In addition, when the stain is detected, the cleaning robot 1 may increase the size of the contact portions of the pad members coming into contact with the floor, may increase friction between the pad members and the floor, or may increase the number of the pad members coming into contact with the floor.

Cleaning of the stain may be implemented as the size of the contact portions of the pad members, friction between the pad members and the floor, and the number of the pad members coming into contact with the floor are adjusted based on the size of the stain.

When no stain is detected while the cleaning robot 1 implements movement and cleaning while changing a movement pattern based on stain detection results, the cleaning robot 1 implements cleaning while moving in the zigzag pattern having the first pitch length P1.

When the stain is detected, to enhance stain removal performance, the number of times the cleaning robot 1 wipes a region where the stain is detected may be set to be greater than the number of times the cleaning robot 1 wipes another region having the same size.

The cleaning robot 1 determines whether or not to complete cleaning while implementing cleaning (515), implements both obstacle detection and stain detection until cleaning is completed, and implements cleaning and movement while changing at least one of a movement pattern and movement route based on detection results.

The cleaning robot 1 as described above may implement diagonal movement and curvilinear movement. This will hereinafter be described with reference to FIGS. 27 and 28.

Figure 27:
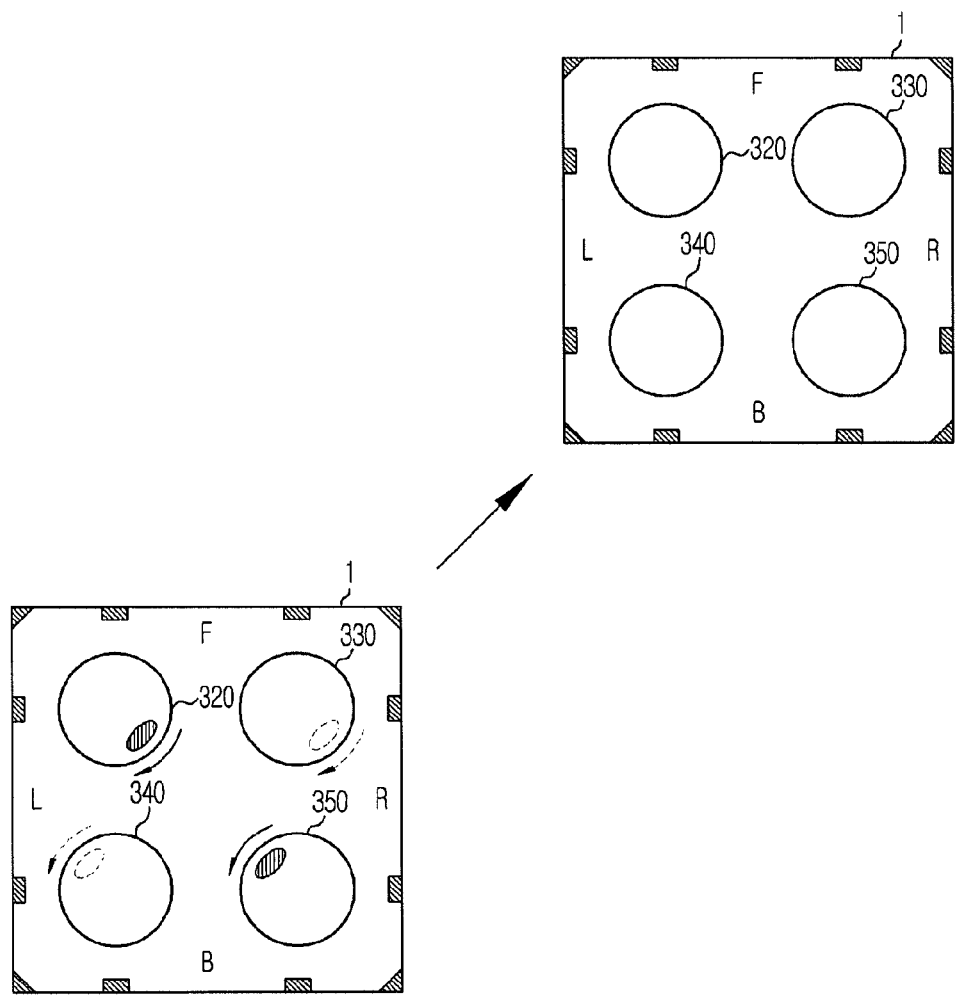
FIG. 27 is a view illustrating diagonal movement of the cleaning robot according to the embodiment.

As exemplarily shown in FIG. 27, the cleaning robot 1 drives the first motor and the second motor of the first drive assembly to provide the rotating plate of the first pad assembly 320 with a set gradient with the floor and drives the first motor and the second motor of the fourth drive assembly to provide the rotating plate of the fourth pad assembly 350 with a set gradient with the floor, thereby causing the pad members of the first pad assembly 320 and the fourth pad assembly 350 to partially come into contact with the floor.

As the cleaning robot 1 rotates the pad member of the first pad assembly 320 in a first rotation direction in a state in which an inner portion of the pad member comes into contact with the floor and rotates the pad member of the fourth pad assembly 350 in a second rotation direction in a state in which an inner portion of the pad member comes into contact with the floor, friction is applied to contact portions of the two pad members, thus causing the cleaning robot 1, having a corer as a front face, to diagonally move using the friction.

In this case, friction of the pad members of the second and third pad assemblies 330, 340 may provide additional movement force for diagonal movement.

That is, the cleaning robot 1 drives the first motor and the second motor of the second drive assembly to provide the rotating plate of the second pad assembly 330 with a set gradient with the floor and drives the first motor and the second motor of the third drive assembly to provide the rotating plate of the third pad assembly 340 with a set gradient with the floor, thereby causing the pad members of the second pad assembly 330 and the third pad assembly 340 to partially come into contact with the floor.

In this case, as the cleaning robot 1 rotates the pad member of the second pad assembly 330 in a first rotation direction in a state in which an inner portion of the pad member comes into contact with the floor and rotates the pad member of the third pad assembly 340 in a second rotation direction in a state in which an inner portion of the pad member comes into contact with the floor, friction is applied to contact portions of the two pad members, thus causing the cleaning robot 1, having a corner as a front face, to diagonally move using the friction.

In this way, the cleaning robot 1 may diagonally move even without rotation of the main body, and thus may move at a high speed.

Figure 28:
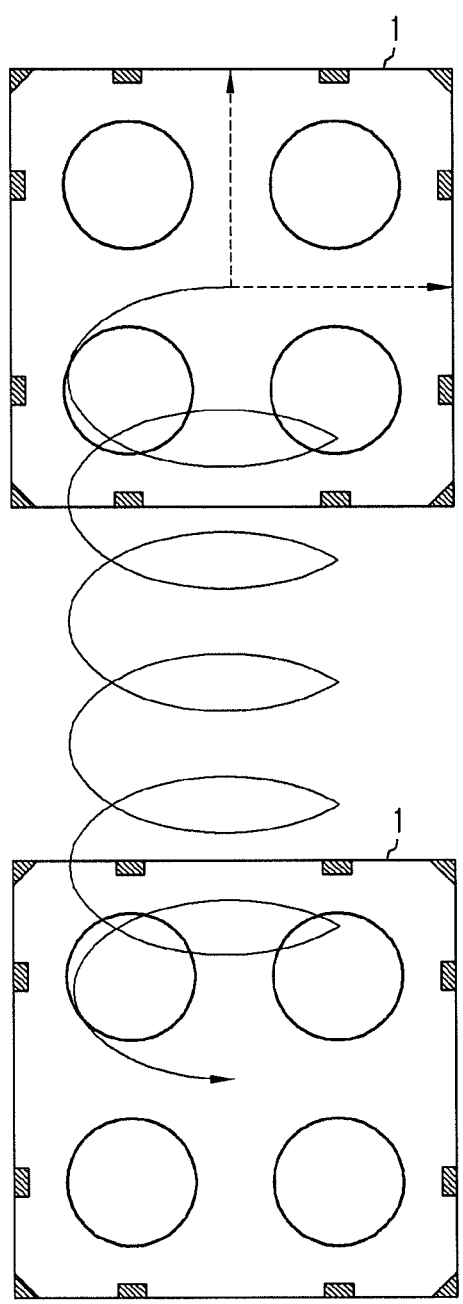
FIG. 28 is a view illustrating movement of the cleaning robot in a curvilinear pattern according to the embodiment.

As exemplarily shown in FIG. 28, the cleaning robot 1 causes the pad members of the first, second, third, and fourth pad assemblies coming into contact with the floor to draw a curvilinear pattern by changing contact positions of the contact portions of the first, second, third, and fourth pad assemblies, thereby rotating in the curvilinear pattern.

That is, as the pad member moves in contact with the floor along a curvilinear movement route, the cleaning robot 1 may implement cleaning while moving as if the user actually wipes the floor.

In the case of implementing cleaning in the curvilinear pattern as described above, rotating the main body of the cleaning robot 1 may not be necessary, which ensures implementation of cleaning without speed deterioration.

Further, cleaning may be implemented in a curvilinear pattern, a radius of rotation R of which is less than a length L of the main body of the cleaning robot 1.

Furthermore, cleaning may be implemented in a curvilinear pattern, a diameter of which is equal to or greater than a length of the main body of the cleaning robot 1.

As is apparent from the above description, according to the embodiments of the present disclosure, a cleaning robot may implement omni-directional movement without rotation of a main body, thus achieving fast movement.

Further, enhanced cleaning efficiency of the cleaning robot may be accomplished via imitation of a human wiping pattern. Furthermore, various cleaning patterns including curvilinear patterns and straight patterns may be easily applied to the cleaning robot.

Figure 29:
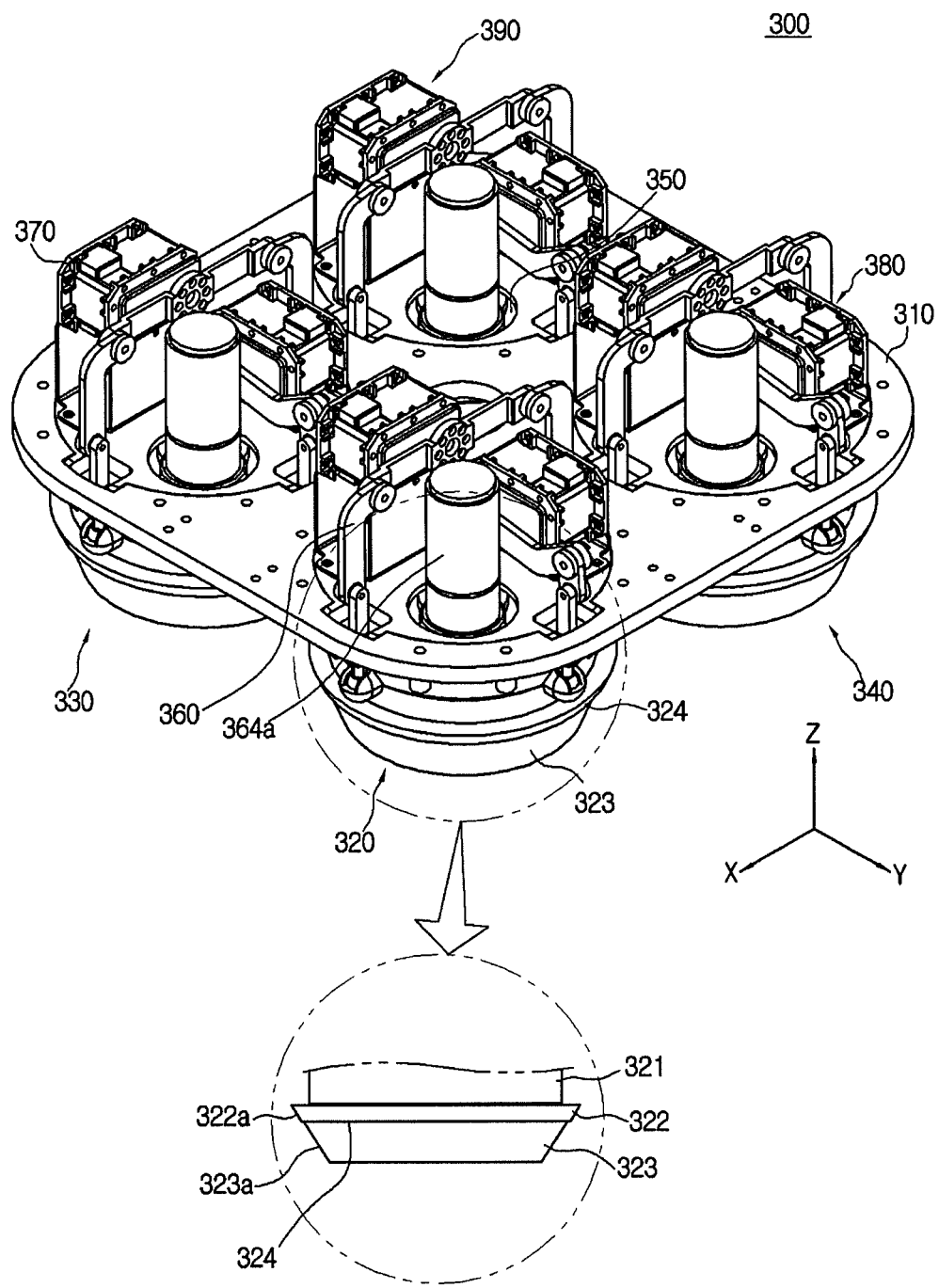
FIG. 29 is a view illustrating a main body of a cleaning robot according to yet another embodiment.

FIG. 29 is a view illustrating a main body of a cleaning robot according to yet another embodiment. Unlike the embodiment of the cleaning robot shown in FIG. 10, the main body 300 of the cleaning robot includes four pad assemblies each having sloped side.

The main body 300 of the cleaning robot according to the yet another embodiment includes a frame 310, a first pad assembly 320, a second pad assembly 330, a third pad assembly 340, and a fourth pad assembly 350. The main body 300 further includes a plurality of drive assemblies 360, 370, 380, 390 to drive the respective pad assemblies.

The first pad assembly 320 includes a coupling member 321 coupled to the first drive assembly 360, a rotating plate 322 mounted to the coupling member 321, the rotating plate 322 being tilted or rotated at a set angle based on a rotational force transmitted from the first drive assembly 360, a pad member 323 detachably mounted to the rotating plate 322, and an adhesive member 324 mounted to the rotating plate 322 to allow the pad member 323 to be detachable from the rotating plate 322.

The rotating plate 322 has sloped side 322a that makes the bottom have a smaller area than the area of the top.

The sloped side 322a is tilted at a certain angle.

The pad member 323 may also have sloped side 323a that makes the bottom have a smaller area than the area of the top.

The sloped side 323a is tilted at a certain angle.

The cleaning robot may easily climb over an obstacle even with small power.

Figure 30:
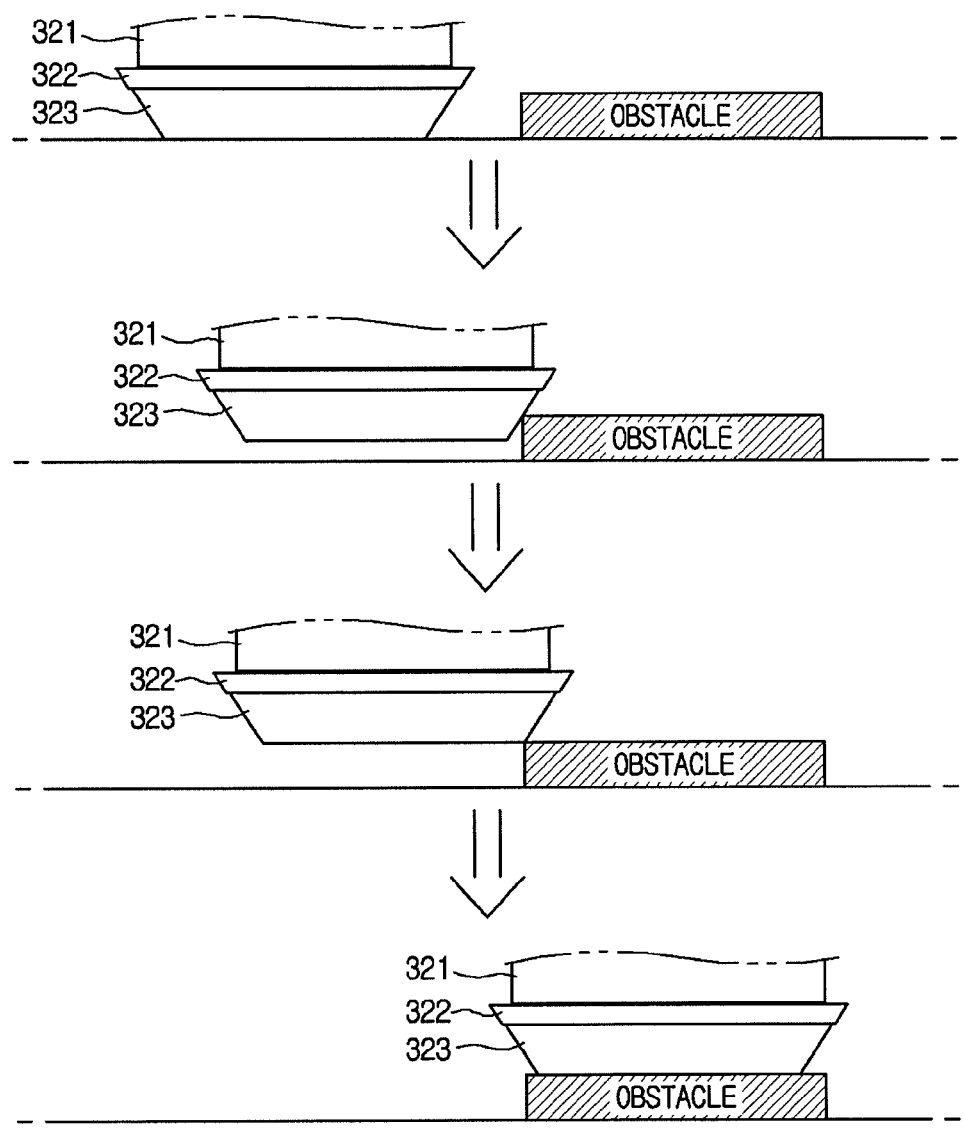
FIG. 30 is a view illustrating a pad assembly included in the cleaning robot according to the yet another embodiment.

As shown in FIG. 30, even if detecting an obstacle while moving around on the even (or flat) ground (also called 'in flat ground movement'), the cleaning robot keeps it in the flat ground movement.

In this case, the sloped side 323a of the pad assembly may come into contact with the edge of the obstacle. The sloped side 323a may then move to the top of the obstacle along the edge by a movement force of the cleaning robot. Then, the bottom of the pad member of the pad assembly comes on the top of the obstacle.

With the operations, the cleaning robot may easily climb up the obstacle.

Furthermore, the cleaning robot determines a movement mode, such as flat ground movement, avoidance movement, and climbing movement based on elasticity of the pad member and the height of an obstacle.

For the climbing movement, the cleaning robot determines an angle of the pad assembly based on the height of the obstacle.

The second, third and fourth pad assemblies have the same structure as that of the first pad assembly, so the description of how they climb up the obstacle will be omitted herein.

The first to fourth drive assemblies have the same structure as that of the drive assembly of the cleaning robot shown in FIG. 10, so the description of them will be omitted herein.

Figure 31:
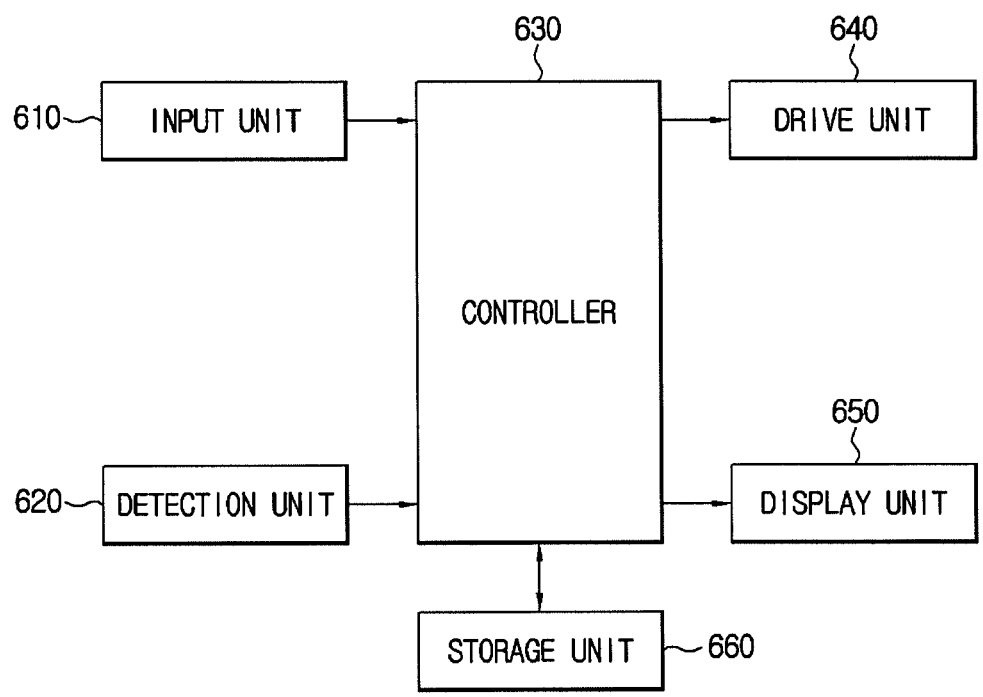
FIG. 31 is a control block diagram of the cleaning robot according to the yet another embodiment.

FIG. 31 is a control block diagram of the cleaning robot according to the yet another embodiment.

The cleaning robot 1 includes an input unit 610, a detection unit 620, a controller 630, a drive unit 640, a display unit 650, and a storage unit 660.

The input unit 610 is mounted on the exterior of the housing 100, and receives cleaning start/end instructions, operation information, reservation information, etc. input by the user, and transmits the input information to the controller 630. Here, operation information includes cleaning modes, such as simplified cleaning and intensive cleaning, movement patterns, etc.

The detection unit 620 for detecting information regarding cleaning conditions of the cleaning region includes obstacle detectors mounted on the front, rear, and left and right sides of the frame 310 of the main body 300 for detecting obstacles in front, back, left and right of the cleaning robot.

The obstacle detector includes an image capturer, such as an image sensor or a camera that captures an image of the floor.

For example, the obstacle detectors each have a single image capturer whose capturing orientation is adjusted according to the moving direction of the main body.

For example, the cleaning robot may include a rotatable image capturer and capture an image of the floor by rotating the image capturer in a direction corresponding to the moving direction of the cleaning robot.

In another example, the obstacle detectors may each include a plurality of image capturers for capturing images in the front, back, left and right.

For example, the cleaning robot may include image capturers arranged on four sides of the frame of the cleaning robot, and activate only one image capturer to capture an image of the floor, which is arranged in a position corresponding to the moving direction of the cleaning robot.

When a cleaning instruction is input, the controller 630 controls driving of the respective drive assemblies to move around and do cleaning based on a moving route and pattern.

Specifically, in the flat ground movement, the controller 630 obtains a vector from a current position to a target position based on information about the current position, i.e., current coordinates, and information about the target position, i.e., target coordinates; obtains information regarding the movement of the main body (hereinafter, referred to as movement information) based on the vector; and controls first and second motors of each drive assembly based on the movement information to adjust turning directions of the pad assembly around X- and Y-axes, thereby adjusting tilting direction and angle of each rotating plate.

This enables adjustment of direction and portion of contact between the pad member of the pad assembly and the floor.

Furthermore, the controller 630 may adjust turning directions and rotational speeds of respective pad assemblies around the Z-axis by controlling the third motor of respective drive assemblies, thereby enabling adjustment of a direction in which a frictional force is applied. This determines the direction and speed of the movement of the main body.

With the mechanism, the cleaning robot may move to the target position without rotating the main body 300, while sticking to the current position of the main body 300.

Upon detection of an obstacle in the flat ground movement for cleaning, the controller 630 controls the cleaning robot to come to a stop and be in the avoidance movement, flat ground movement, or climbing movement.

More specifically, when an image captured by the image capturer is input, the controller 630 processes the image, determines from the processed image whether there is an obstacle ahead, and determines the height of the obstacle if determining that there is an obstacle ahead.

Then, the controller 630 compares the height of the obstacle with a first reference height. If the height of the obstacle is less than the first reference height, the controller 630 controls the cleaning robot to be in the flat ground movement; if the height of the obstacle is equal to or greater than the first reference height but equal to or less than a second reference height, the controller 630 controls the cleaning robot to be in the climbing movement; and if the height of the obstacle is greater than the second reference height, the controller 630 controls the cleaning robot to be in the avoidance movement.

The climbing movement is performed by adjusting tilting angles of the rotating plates of two pad assemblies adjacent to the obstacle, among the four pad assemblies, to the greatest tilting angle at which the rotating plates of the pad assemblies may be tilted, or to a tilting angle that corresponds to the height of the obstacle; moving forward by frictional forces produced by the pad members of the remaining pad assemblies; and moving forward by frictional forces produced by the pad members of the pad assemblies with the adjusted tilting angles when the pad assemblies with the adjusted tilting angles are on the top of the obstacle.

The remaining pad assemblies adjust their rotating plates to be tilted at certain angle in a certain direction so as to produce frictional forces for movement.

The controller 630 may determine the horizontal width of the obstacle and control at least one of the two pad assemblies located in the front based on the horizontal width of the obstacle.

If determining that the obstacle is to be avoided, the controller 630 updates the map by reflecting the detected obstacle on the map.

In the avoidance movement, the controller 630 controls the cleaning robot to move aside to the left or the right or diagonally based on the horizontal width of the obstacle.

The drive unit 640 drives multiple motors for each pad assembly in response to an instruction of the controller 630. The drive unit 640 may enable the main body to be in the flat ground movement, including forward movement, backward movement, lateral movement, curvilinear movement, motion in place, and diagonal movement, or to even be rotated, by driving the motors of each drive assembly individually, The display unit 650 displays cleaning reservation information, charge rate information, the chamber's water level information, and operation information including operation modes, etc. Operation modes herein used include a cleaning mode, a standby mode, a docking mode, etc.

The storage unit 660 stores height information for determining a movement mode.

Specifically, the storage unit 660 stores first and second reference heights for determining the flat ground movement, climbing movement, avoidance movement, etc.

The storage unit 660 may also store map information regarding a cleaning region.

The storage unit 660 stores a maximum tilting angle of a rotating plate in the climbing movement (mode).

The storage unit 630 may also store a tilting angle of a rotating plate, which corresponds to the height of an obstacle.

The storage unit 660 stores a tilting angle, a tilting direction (i.e., direction in which the rotating plate contacts the floor), and a turning direction of the rotating plate of each pad assembly, for the flat ground movement.

The storage unit 660 may also store rotation speed of the rotating plate of each pad assembly for each cleaning mode.

In the flat ground movement, the cleaning robot moves using only two pad assemblies arranged in the front while doing wet cleaning on the floor with the remaining two pad assemblies.

On the contrary, in the climbing movement, the cleaning robot climbs up using two pad assemblies arranged in the front while applying a movement force for the main body using the remaining two pad assemblies. When the two pad assemblies arranged in the front are on the top of the obstacle, a movement force for the main body is produced using the two pad assemblies located on the top of the obstacle.

Figure 32:
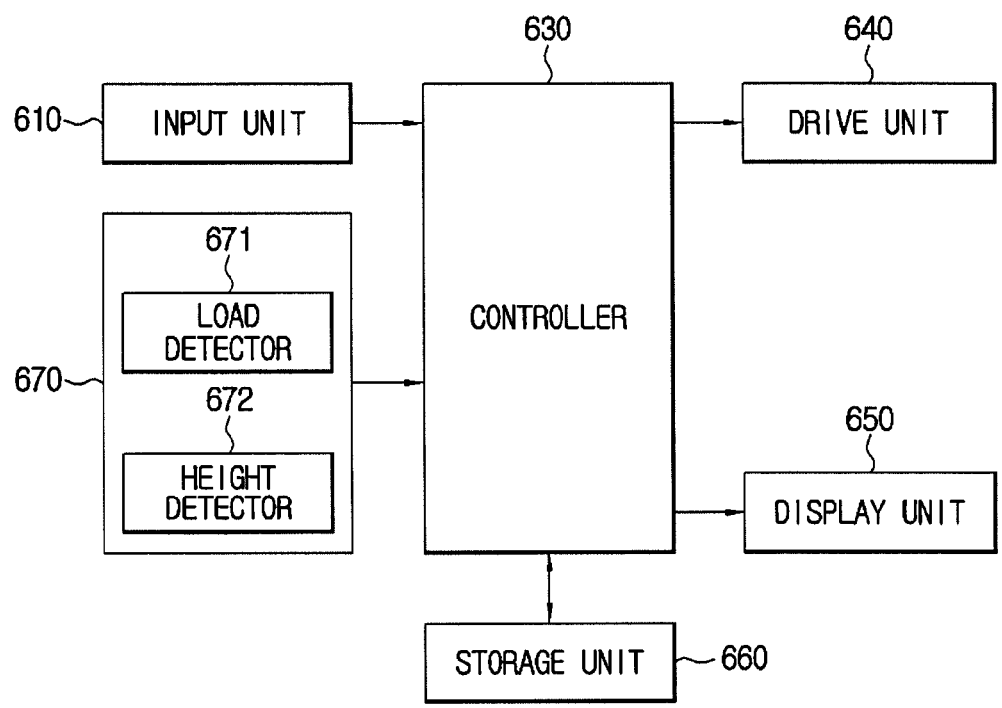
FIG. 32 is another control block diagram of the cleaning robot according to the yet another embodiment.
Figure 33:
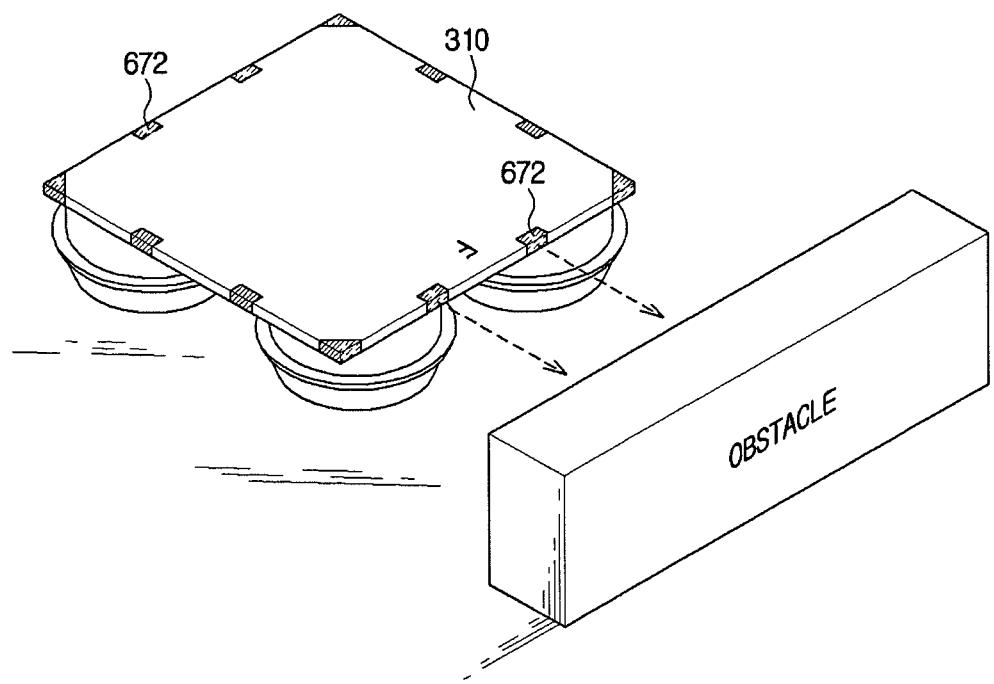
FIG. 33 is a view illustrating a height detector included in the cleaning robot according to the yet another embodiment.

FIG. 32 is another control block diagram of the cleaning robot according to the yet another embodiment, and FIG. 33 is a view illustrating an obstacle detector included in the cleaning robot according to the yet another embodiment.

The cleaning robot 1 includes an input unit 610, a detection unit 670, a controller 630, a drive unit 640, a display unit 650, and a storage unit 660.

Configurations of the input unit 610, the drive unit 640, and the display unit 650 are the same as those shown in FIG. 31, so the description of them will be omitted herein. For the controller 630 and the storage unit 660, different configurations than those shown in FIG. 31 will only be described.

The detection unit 670 includes an obstacle detector for detecting an obstacle placed in front or back of the cleaning robot or on the left or right side of the cleaning robot.

Unlike the detection unit 620 shown in FIG. 31, the detection unit 670 includes a load detector 671 and a height detector 672, which are collectively referred to as an 'obstacle detector'.

The load detector 671 detects an amount of load applied to each pad member, particularly an amount of load of the third motor 364a that regulates the rotation speed of the pad member.

The load detector may include a current detector for detecting a current of the third motor 364a.

Specifically, if the cleaning robot contacts an obstacle by its pad member while moving around, an amount of load applied to the third motor 364a that applies a rotational force to the rotating plate is increased, which leads to an increase in the current of the third motor 364*a*. Accordingly, detection of the current of the third motor 364*a* may enable determination of the presence of an obstacle.

The height detector 672 is arranged on the frame 310 for detecting a height of an obstacle, and may include a infrared (IR) sensor, a laser sensor, or a ultrasonic sensor.

Referring to FIG. 33, multiple height detectors 672 are arranged on four sides of the frame 310 at certain intervals, such that they are positioned in parallel with the floor.

The height detector 672 produces a signal in a direction parallel with the floor and detects an echo signal.

The echo signal detected by the height detector 672 may be a light intensity if the height detector 672 is an IR sensor or a laser sensor, and may be ultrasounds if the height detector 672 is an ultrasonic sensor.

The controller 630 determines from the signal detected by the load detector 671 whether there is an obstacle ahead. If it is determined that there is an obstacle ahead, the controller 630 determines a height of the obstacle based on a signal detected by the height detector 672. The controller 630 determines if the height of the obstacle is less than a reference height, and controls the cleaning robot to be in the climbing movement if the height of the obstacle is less than the reference height and controls the cleaning robot to be in the avoidance movement if the height of the obstacle is equal to or greater than the reference height.

The reference height may correspond to the second reference height aforementioned with reference to FIG. 31, or may be equal to the height of the frame, or may be shorter than the height of the frame by a certain height.

More specifically, determining if the height of an obstacle is less than the reference height may include determining whether the obstacle is higher or lower than the frame.

For example, in the case that the height detector is an ultrasonic sensor, the controller 630 may determine whether the height of an obstacle is greater than the reference height based on a time difference between when the ultrasound signal is produced and when the echo signal is detected.

Specifically, since a time difference in the case there is an obstacle higher than the reference height is shorter than a time difference in the case there is an obstacle lower than the reference height, such a time difference between the signal production (or irradiation) and the echo detection may be used to determine the height of an obstacle.

The storage unit 660 stores the reference height to be used for controlling the climbing movement.

The storage unit 660 stores a reference current to determine whether there is an obstacle.

Figure 34:
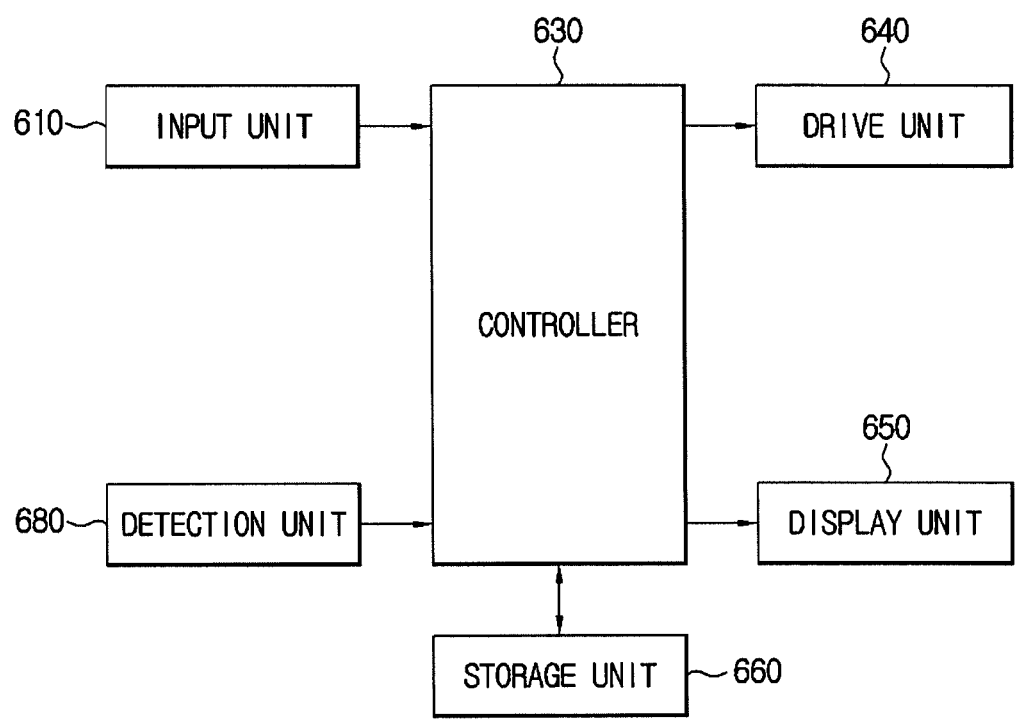
FIG. 34 is yet another control block diagram of the cleaning robot according to the yet another embodiment.
Figure 35:
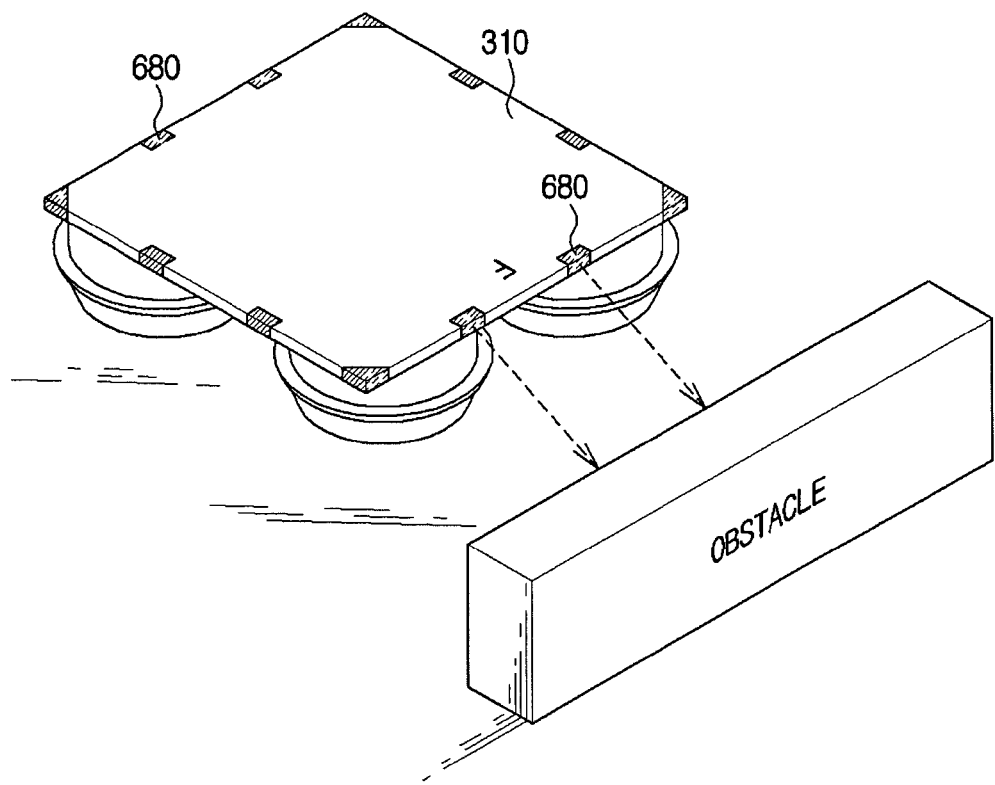
FIG. 35 is a view illustrating a height detector included in the cleaning robot according to the yet another embodiment.

FIG. 34 is yet another control block diagram of the cleaning robot according to the yet another embodiment, and FIG. 35 is a view illustrating an obstacle detector included in the cleaning robot according to the yet another embodiment.

Configurations of the input unit 610, the drive unit 640, and the display unit 650 are the same as those shown in FIG. 31, so the description of them will be omitted herein. For the controller 630 and the storage unit 660, different configurations than those shown in FIG. 31 will only be described.

The detection unit 680 includes an obstacle detector for detecting an obstacle placed in front or back of the cleaning robot or on the left or right side of the cleaning robot.

Unlike the detection unit 620 shown in FIG. 31 and the detection unit 670 shown in FIG. 32, the detection unit 680 has the obstacle detector having a laser sensor, an IR sensor, or an ultrasonic sensor.

As shown in FIG. 35, multiple obstacle detectors 680 are arranged on four sides of the frame 310 at certain intervals, such that signals output from the obstacle detectors 680 are directed toward the floor, and detects echo signals reflected from the floor or an obstacle.

If the obstacle detector has an IR sensor or a laser sensor, the echo signal may correspond to a light intensity, or if the obstacle detector has an ultrasonic sensor, the echo signal may be ultrasounds.

The controller 630 determines from the signal detected by the obstacle detector 680 whether there is an obstacle. If it is determined that there is an obstacle, the controller 630 controls the cleaning robot to head for the obstacle to narrow the distance to the obstacle and determines a height of the obstacle based on a signal detected during the movement control.

Then, the controller 630 compares the height of the obstacle with a first reference height. If the height of the obstacle is less than the first reference height, the controller 630 controls the cleaning robot to be in the flat ground movement; if the height of the obstacle is equal to or greater than the first reference height but equal to or less than a second reference height, the controller 630 controls the cleaning robot to be in the climbing movement; and if the height of the obstacle is greater than the second reference height, the controller 630 controls the cleaning robot to be in the avoidance movement.

The storage unit 660 stores the first and second reference heights to be used for controlling the climbing movement.

Figure 36:
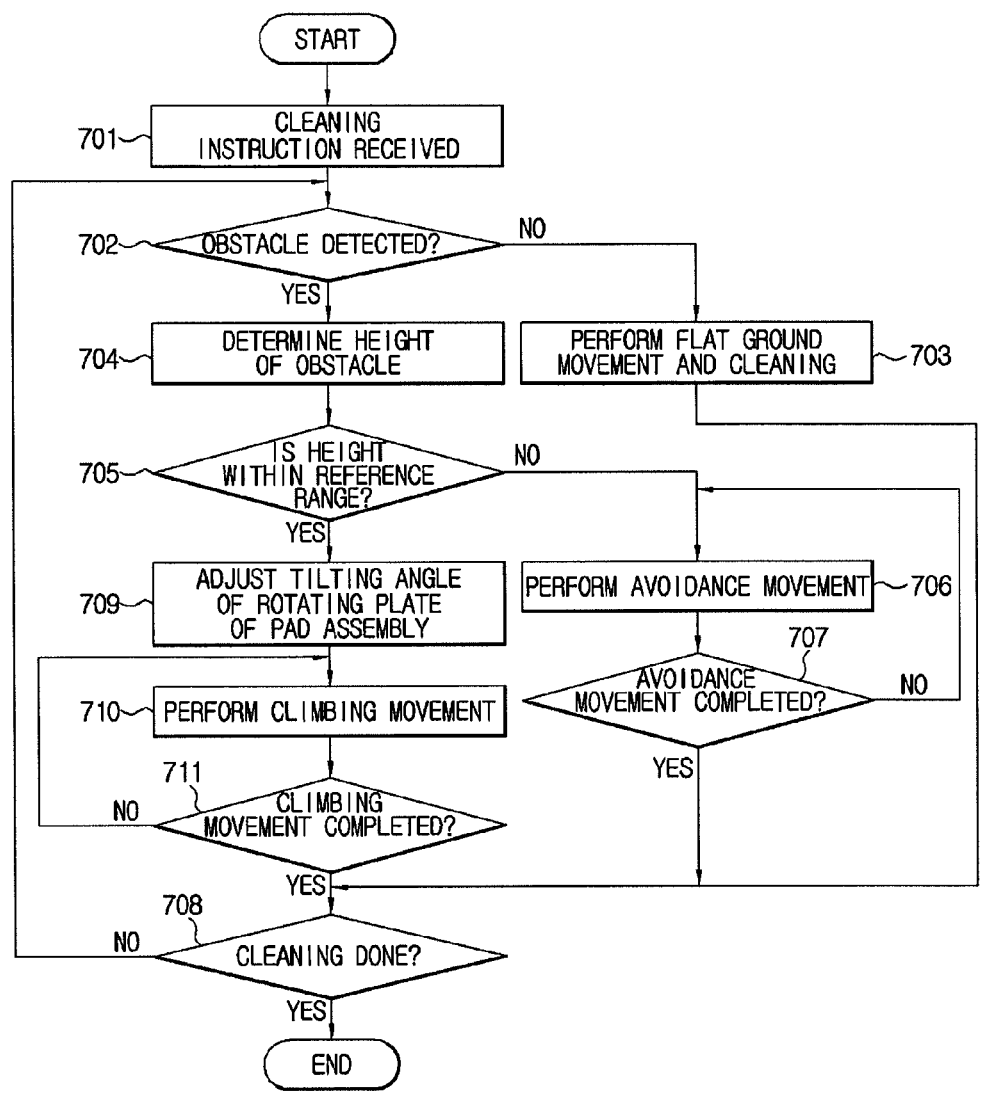
FIG. 36 is a flow chart illustrating control operations of the cleaning robot according to the yet another embodiment.

FIG. 36 is a flow chart illustrating control operations of the cleaning robot according to the yet another embodiment.

If a cleaning instruction is input to the input unit 610 in operation 701 or if it is a reserved cleaning time, the cleaning robot adjusts the position and direction of frictional forces to be applied to respective pad members of the pad assemblies 320, 330, 340, and 350 based on the map, cleaning route, cleaning pattern, and/or cleaning mode.

The cleaning robot moves by frictional forces produced by the contact between the floor and pad members, moving around the cleaning region and doing wet cleaning.

The cleaning robot detects an obstacle while moving around and doing cleaning.

Specifically, the cleaning robot determines whether there is an obstacle based on an echo signal detected from the obstacle detector, in operation 702. If determining that there is no obstacle, the cleaning robot simultaneously perform cleaning and flat ground movement, in operation 703.

How to perform cleaning and flat ground movement will now be described.

The cleaning robot 1 drives first and second motors of the first drive assembly such that the rotating plate of the first pad assembly 320 has a set slope (or gradient) with respect to the floor, and drives first and second motors of the second drive assembly such that the rotating plate of the second pad assembly 330 has a set slope with respect to the floor, thereby making parts of the pad members of the first and second pad assemblies 320 and 330 contact the floor.

The set slopes are slopes for easy flat ground movement, which may be the same or different depending on straight movement, diagonal movement, curvilinear movement, motion in place, etc.

The cleaning robot 1 rotates the pad member of the first pad assembly 320 in the first turning direction while keeping the inner part of the pad member in contact with the floor and rotates the pad member of the second pad assembly 330 in the second turning direction while keeping the inner part of the pad member in contact with the floor, thus enabling frictional forces to be produced from the inner side of the front in the bottom of the main body, and uses the frictional force to move forward with the first face F being its front.

In this way, the cleaning robot 1 may move forward with the second, third, or fourth face being its front.

The cleaning robot determines the presence of an obstacle using an echo signal detected by the obstacle detector, and determines the height of the obstacle if present, in operation 704.

Detecting an obstacle and determining its height includes processing an image captured by the image capturer as shown in FIG. 31, recognizing an obstacle from the processed image, and determining the height of the obstacle.

With the image capturer to detect an obstacle, the cleaning robot may detect the obstacle before colliding with the obstacle.

In another example, detecting an obstacle and determining its height includes detecting an obstacle if an amount of load detected by the load detector as shown in FIG. 32 is greater than a reference amount of load and determining the height of the obstacle based on a signal detected by the height detector.

In yet another example, detecting an obstacle and determining its height includes determining the presence of an obstacle and the height of the obstacle based on an echo signal detected by the obstacle detector as shown in FIG. 34.

The cleaning robot determines whether the height of the obstacle is within a reference range, in operation 705.

Determining whether the height of the obstacle is within the reference range includes determining if the height of the obstacle is equal to or greater than the first reference height and equal to or less than the second reference height.

The cleaning robot keeps it in the flat ground movement if the height of the obstacle is less than the first reference height. In this case, the cleaning robot may climb over the obstacle without adjustment of the slope of the pad assemblies, due to the elasticity of the pad member.

In addition, if an obstacle is lower than the first reference height, the cleaning robot may exclude the obstacle from those in need of movement control.

If determining that the height of an obstacle exceeds the reference range, the cleaning robot performs the avoidance movement.

Determining that the height of an obstacle exceeds the reference range includes determining if the height of an obstacle exceeds the second reference height.

If determining that the height of an obstacle exceeds the second reference height, the cleaning robot performs the avoidance movement, in operation 706.

The avoidance movement includes changing a moving direction of the cleaning robot.

The cleaning robot determines if the avoidance movement has been completed, in operation 707. If it is determined that the avoidance movement has been completed, the cleaning robot determines whether cleaning has been done, in operation 708. If it is determined that the cleaning has been done, the cleaning robot stops cleaning and moving, or else if it is determined that the cleaning has not been done, the cleaning robot keeps doing cleaning in the flat ground movement in operation 703 while performing obstacle detection until the cleaning is done.

Determining that the avoidance movement has been completed includes determining that the avoidance movement has been completed if no obstacle is detected ahead of the cleaning robot.

The cleaning robot may climb over the obstacle if the height of the obstacle is equal to or greater than the first reference height and equal to or less than the second reference height by performing the climbing movement after adjustment of the tilting angle of the rotating plate arranged on at least one of the multiple pad assemblies, in operations 709 and 710.

The climbing movement is performed by adjusting tilting angles of rotating plates of two pad assemblies adjacent to the obstacle, among the four pad assemblies, to a greatest tilting angle at which the rotating plates of the pad assemblies may be tilted, or to a tilting angle that corresponds to the height of the obstacle; moving forward by frictional forces produced by the remaining pad assemblies; and moving forward by frictional forces produced by the pad assemblies with the adjusted tilting angles when the pad assemblies with the adjusted tilting angles are located on the top of the obstacle.

The remaining pad assemblies adjust their rotating plates to be tilted at a certain angle in a certain direction so as to produce frictional forces for movement.

Furthermore, the rotating plates of the two pad assemblies adjacent to the obstacle are tilted at an angle toward the vertical direction, which is greater than tilting angles of the rotating plates of the remaining two pad assemblies.

In addition, if a detected horizontal width of the obstacle is narrower than a reference width, the cleaning robot may adjust a tilting angle of only a single pad assembly.

The cleaning robot determines if the climbing movement has been completed, in operation 711. If it is determined that the climbing movement has been completed, the cleaning robot determines whether cleaning has been done, in operation 708. If it is determined that the cleaning has been done, the cleaning robot stops moving and cleaning, or else if it is determined that the cleaning has not been done, the cleaning robot keeps moving around and doing cleaning in operation 703 while performing obstacle detection until the cleaning is done.

Determining if the cleaning has been done includes determining that cleaning has been done if the cleaning robot has moved all around the cleaning region based on the map, the moving route, and the moving pattern.

Furthermore, the cleaning robot may perform docking when the cleaning is done.

Referring to FIGS. 37A to 50D, climbing and avoidance movements will be described in more detail.

FIGS. 37A to 37J illustrate climbing movements of the cleaning robot, viewed from a side; FIG. 38 illustrates adjustment of a tilting angle of a pad assembly of the cleaning robot; and FIGS. 39 to 44 illustrate positions and directions of frictional forces applied to multiple pad members in the climbing movements as shown in FIGS. 37A to 37J.

Figure 37A:
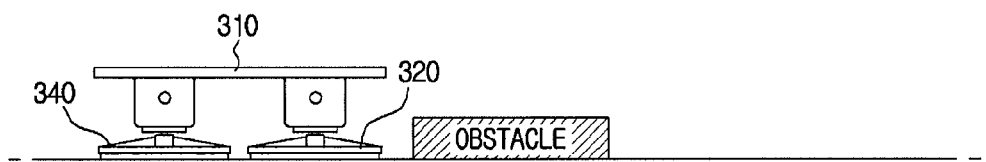
FIGS. 37A to 37J are views illustrating climbing movements of the control robot according to the yet another embodiment.
Figure 38:
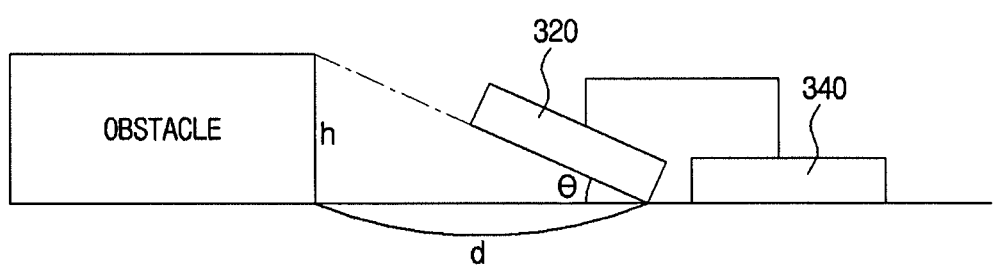
FIG. 38 is a view illustrating angle adjustment for a pad assembly included in the cleaning robot according to the yet another embodiment.

Referring to FIG. 37A, if determining that there is an obstacle ahead, the cleaning robot stops the flat ground movement as well as cleaning operations.

Figure 37B:
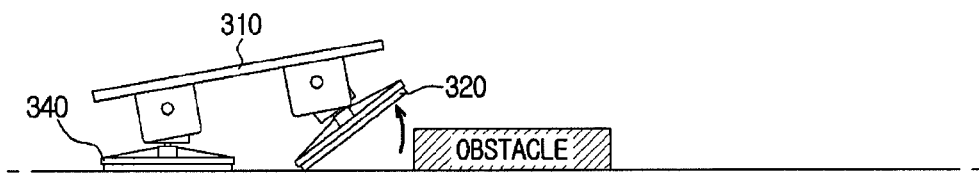

Referring to FIG. 37B, the cleaning robot adjusts the tilting angle of the pad assembly 320 adjacent to the obstacle toward the vertical direction.

Referring to FIG. 38, the cleaning robot calculates an angle θ to be adjusted based on the height h of the obstacle and the distance d to the obstacle, and adjusts the angle of the rotating plate of the first pad assembly 320 to the calculated angle θ.

Furthermore, the cleaning robot may adjust the angle of the rotating plate to a predetermined maximum angle or adjust the angle of the rotating plate after retrieving a pre-stored angle that corresponds to the height of the obstacle.

Figure 37C:
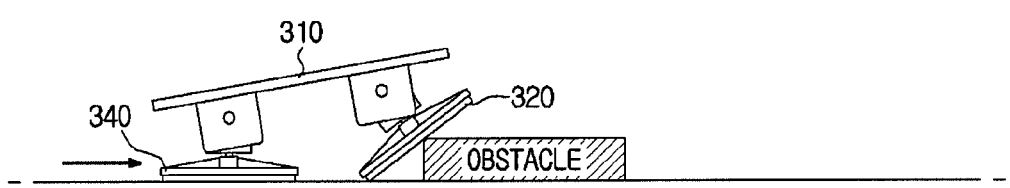
Figure 37D:
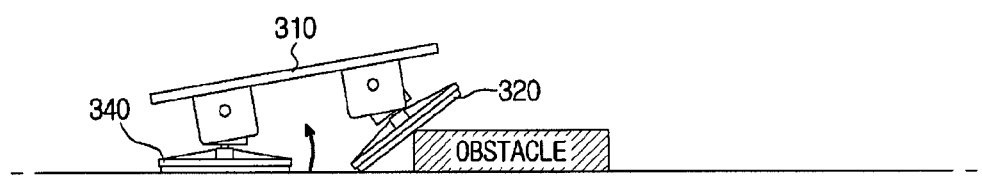

Referring to FIGS. 37C and 37D, the cleaning robot adjusts the slope of the rotating plate of the pad assembly adjacent to the obstacle to an angle allowing for climbing, adjusts the slope of rotating plates of the remaining pad assemblies to angles allowing to produce frictional forces for the main body, and then rotates the rotating plates of the remaining pad assemblies, thereby enabling the main body to move over to the top of the obstacle.

Figure 39:
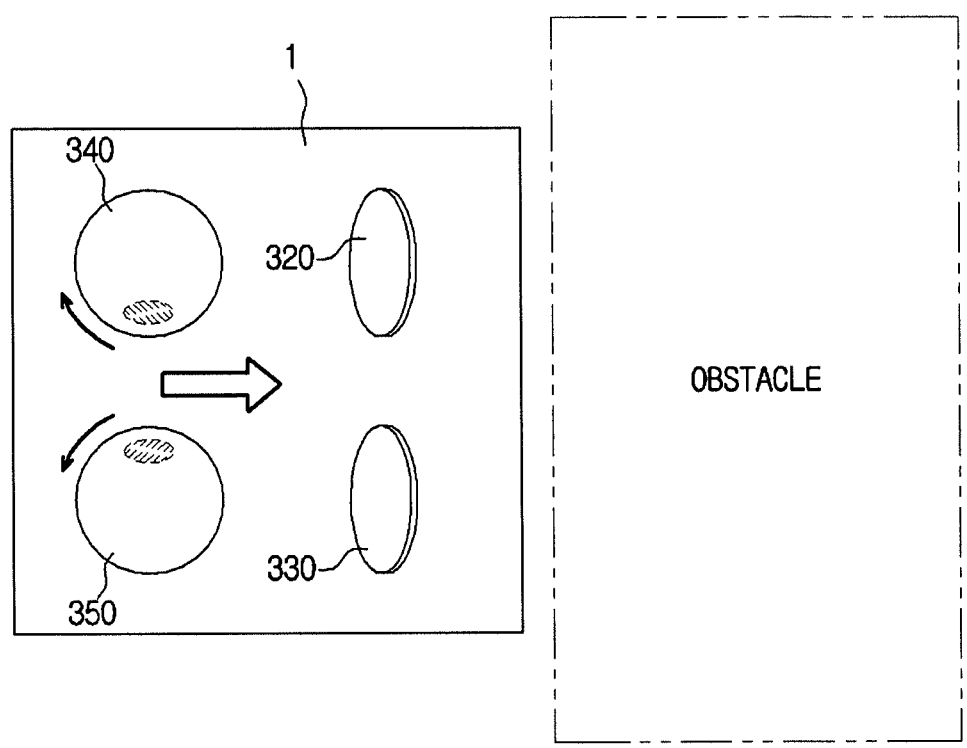
FIGS. 39 to 44 are views illustrating operations of pad assemblies in climbing movements as shown in FIGS. 37A to 37J.

Referring to FIG. 39, with the tilting angles of the rotating plates of the first and second pad assemblies 320 and 330 adjusted toward the vertical direction based on the height of the obstacle and the tilting angles of the rotating plates of the third and fourth pad assemblies 340 and 350 adjusted such that inner parts of the pad members of the third and fourth pad assemblies 340 and 350 come into contact with the floor, the cleaning robot 1 rotates the rotating plate of the third pad assembly 340 in the first turning direction and rotates the rotating plate of the fourth pad assembly 350 in the second turning direction, enabling the main body to move toward the obstacle.

Figure 40:
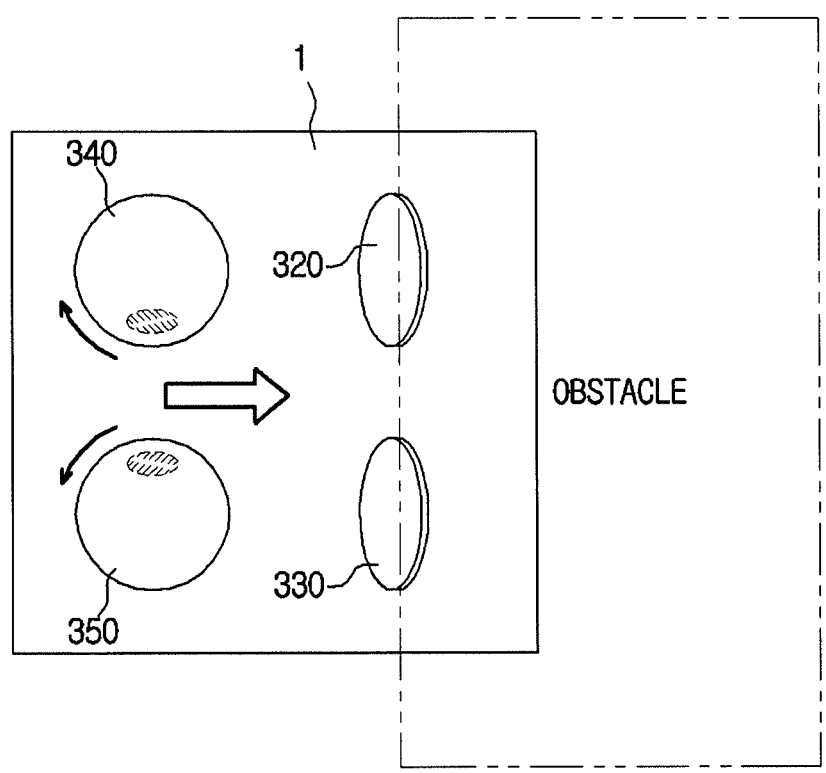

Referring to FIG. 40, even when the first and second pad assemblies 320 and 330 has moved onto the top of the obstacle along the edge, the cleaning robot 1 keeps moving the main body by frictional forces applied to the third and fourth pad assemblies 340 and 350.

Figure 41:
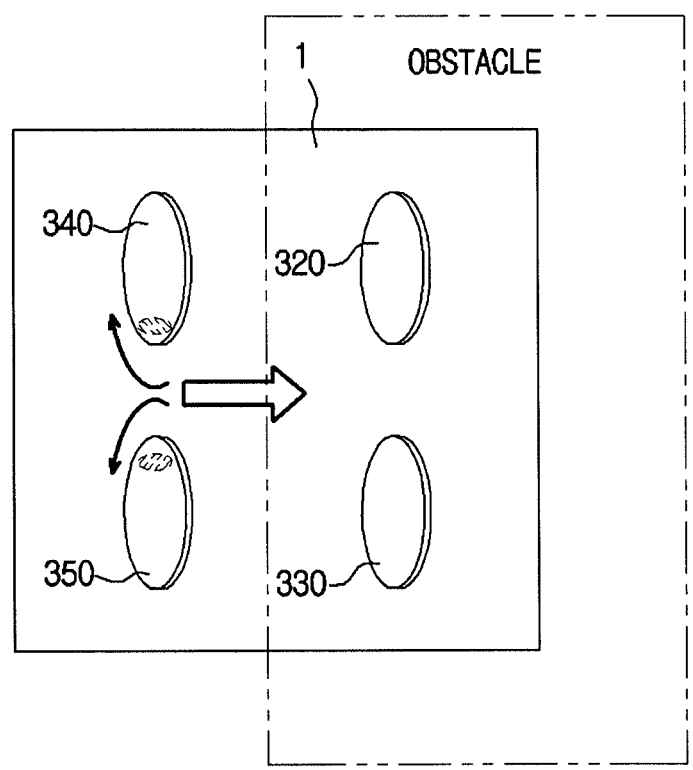

Referring to FIG. 41, as the main body of the cleaning robot 1 has moved over to the top of the obstacle, the pad members of the third and fourth pad assemblies 340 and 350 gradually come off the floor, which changes portions of the pad members of the third and fourth pad assemblies 340 and 350 which are in contact with the floor.

Despite this, the cleaning robot 1 keeps rotating the rotating plates of the third and fourth pad assemblies 340 and 350, which are in contact with the floor, thereby producing frictional forces between the pad members of the third and fourth pad assemblies 340 and 350 and the floor, enabling the main body to move over to the top of the obstacle.

To summarize the operations of the cleaning robot as shown in FIGS. 39 to 41, the cleaning robot adjusts slopes of the pad members of the first and second pad assemblies by changing axes of the first and second pad assemblies, and accordingly shifts the center of mass of the cleaning robot toward the third and fourth pad assemblies to keep its balance using the third and fourth pad assemblies.

Also, the cleaning robot moves toward the obstacle by frictional forces produced between the third and fourth pad assemblies and the floor by rotating the pad members of the third and fourth pad assemblies.

As such, the cleaning robot performs systematic control over operations of the pad assemblies adjacent to the obstacle and the remaining pad assemblies, thereby stabilizing the center of mass as well as moving over to the top of the obstacle.

Figure 37E:
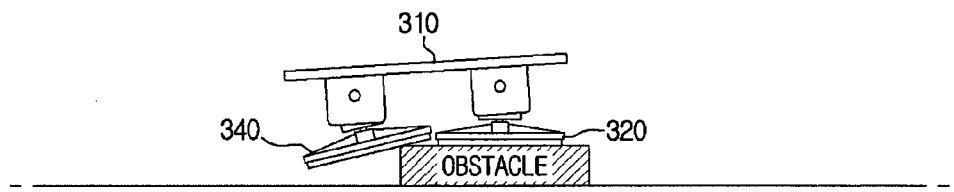

Referring to FIG. 37E, the cleaning robot rotates the pad members of the third and fourth pad assemblies, to keep applying movement forces for the main body to move over to the top of the obstacle.

In this regard, the cleaning robot adjusts slopes of the rotating plates of the first and second pad assemblies toward the vertical direction by changing axes of the rotating plates, such that respective pad members of the first and second pad assemblies make contact with the top face of the obstacle.

In other words, the cleaning robot adjusts the tilting angles of the rotating plates of the first and second pad assemblies in the opposite direction of an occasion where it climbs up to the top of the obstacle.

Figure 42:
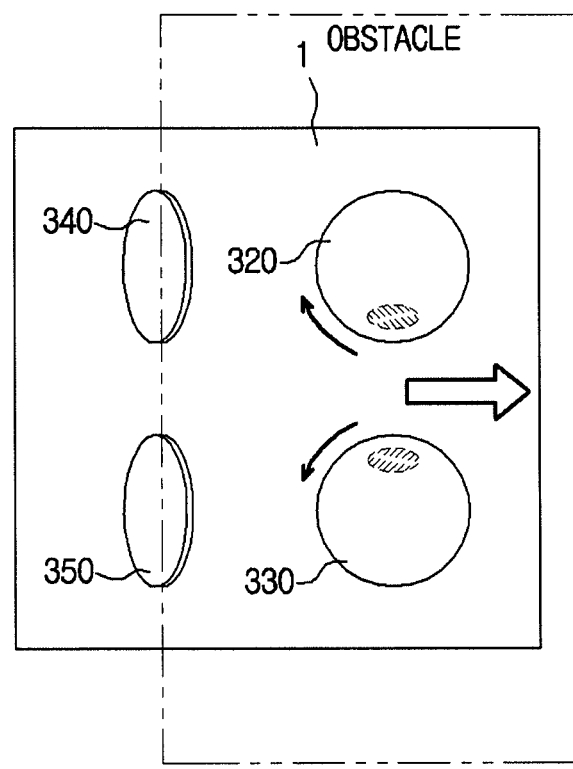

Referring to FIG. 42, the cleaning robot adjusts the rotating plates of the first and second pad assemblies to be tilted inwardly, and then rotates them to produce frictional forces, generating movement forces for the main body.

Then, the pad members of the third and fourth pad assemblies come into contact with the obstacle and climb up to the top of the obstacle by the frictional forces produced by the first and second pad assemblies.

As such, when the pad members of the third and fourth pad assemblies come into contact with the obstacle, the center of mass of the main body is shifted and the cleaning robot then keeps it balanced using the first and second pad assemblies.

Furthermore, when the pad members of the first and second pad assemblies come into contact with the top face of the obstacle through adjustment of the axes of the rotating plates of the first and second pad assemblies, the cleaning robot adjusts the angle tilted toward the vertical direction of the rotating plates of the third and fourth pad assemblies to make the pad members of the third and fourth pad assemblies contact the top of the obstacle as well by changing the axes of the rotating plates of the third and fourth pad assemblies.

Figure 37F:
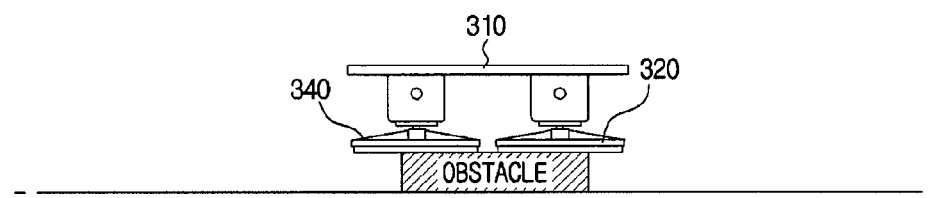

That is, as shown in FIG. 37F, the cleaning robot may make four pad members contact the top face of the obstacle if the top face of the obstacle has an area greater than a certain size.

By doing this, the cleaning robot may be positioned stably on the top face of the obstacle.

Figure 43:
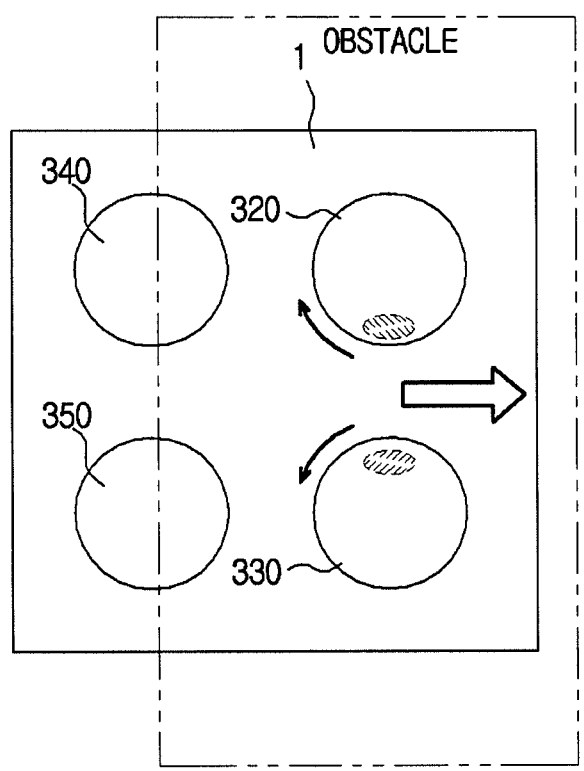
Figure 44:
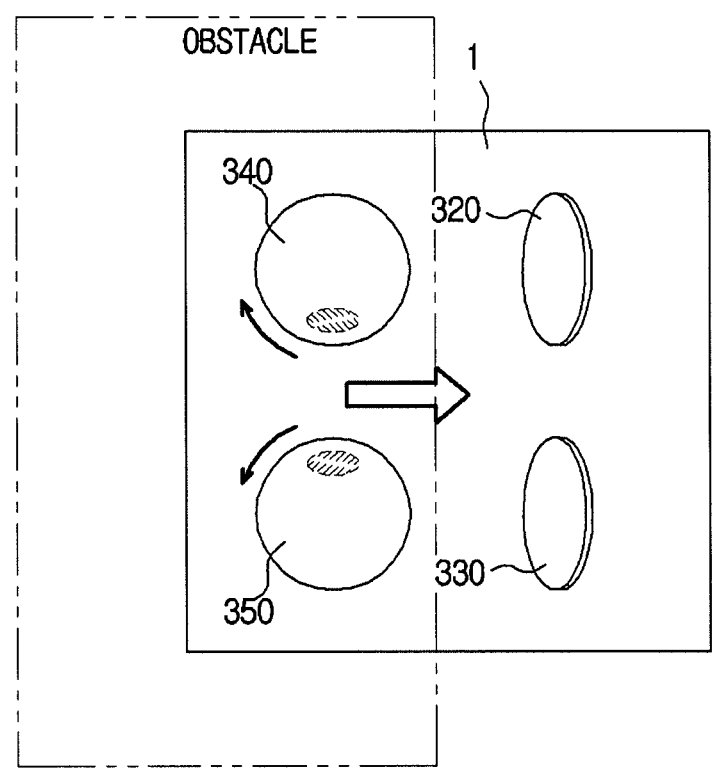

Referring to FIG. 43, the cleaning robot 1 keeps rotating the first pad assembly 320 in the first turning direction and the second pad assembly 330 in the second turning direction while maintaining the slopes of the rotating plates of the first and second pad assemblies 320 and 330 which are in contact with the top face of the obstacle, thereby producing frictional forces applied to the pad members of the first and second pad assemblies to enable the main body to be moved along the top face of the obstacle.

Figure 37G:
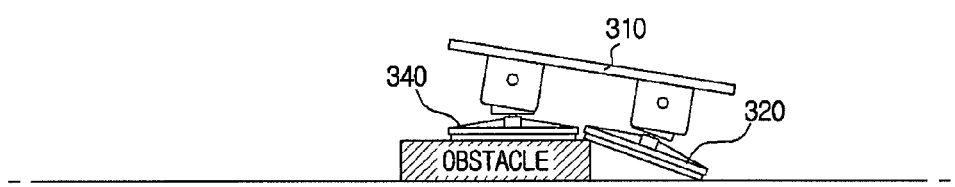

Referring to FIG. 37G, the cleaning robot determines whether it is to move down to the lower part of the obstacle (i.e., whether there is a stepped part) while moving on the top face of the obstacle. If it is determined that there is a stepped part, the cleaning robot makes slope adjustment by changing the axes of the rotating plates of the first and second pad assemblies, rotates the rotating plate of the third pad assembly 340 in the first turning direction and rotates the rotating plate of the fourth pad assembly 350 (not shown in FIG. 37G) in the second turning direction, thereby enabling the main body to be moved along the obstacle.

Determining whether it is to move down to the lower part of the obstacle may include determining whether there is a stepped part based on amounts of load applied to the rotating plates of the first and second pad assemblies 320 and 330 or based on information detected by the obstacle detector.

Figure 37H:
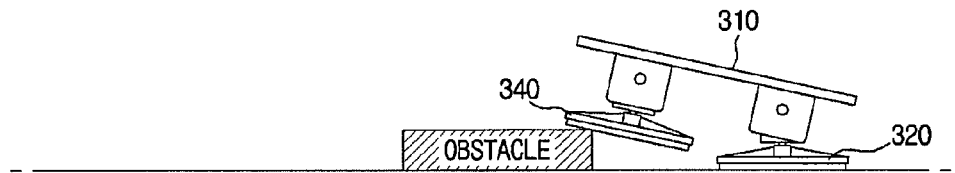
Figure 37I:
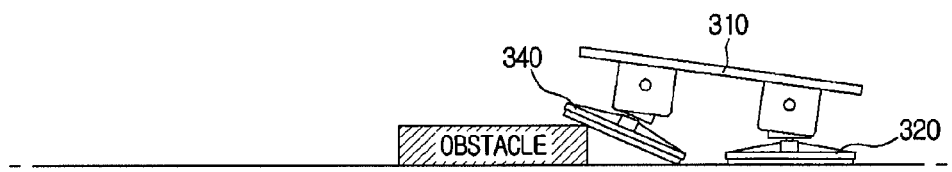

Referring to FIGS. 37H and 37I, if determining that the pad members of the first and second pad assemblies 320 and 330 are in contact with the floor, the cleaning robot makes slope adjustment by changing the axes of the rotating plates of the first and second pad assemblies such that the pad members of the first and second pad assemblies are in contact with the floor.

The cleaning robot then moves the main body by frictional forces of the pad members of the first and second pad assemblies 320 and 330.

If determining that the third and fourth pad assemblies 340 and 350 are located on a stepped part of the obstacle, the cleaning robot makes slope adjustment by changing the axes of the rotating plates of the third and fourth pad assemblies, such that the third and fourth pad assemblies may stably come down to the floor along the edge of the obstacle.

Figure 37J:
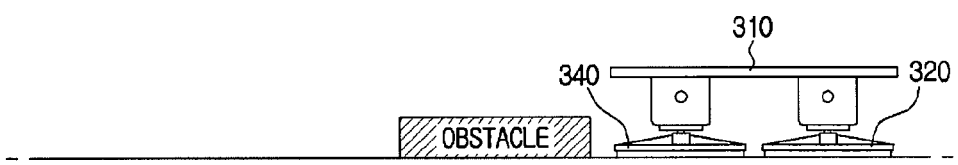

Referring to FIG. 37J, if determining that the third and fourth pad assemblies 340 and 350 come into contact with the floor, the cleaning robot makes slope adjustment toward the vertical direction by changing the axes of the rotating plates of the third and fourth pad assemblies, such that the entire area of the pad members of the third and fourth pad assemblies are in contact with the floor.

If the climbing movement is completed, the cleaning robot stops rotating the first to fourth pad assemblies.

Accordingly, all the pad members of the pad assemblies come into contact with the floor, and then the cleaning robot restores the tilting angles of the first and second pad assemblies.

With these operations, the cleaning robot may climb over the obstacle.

Figure 45:
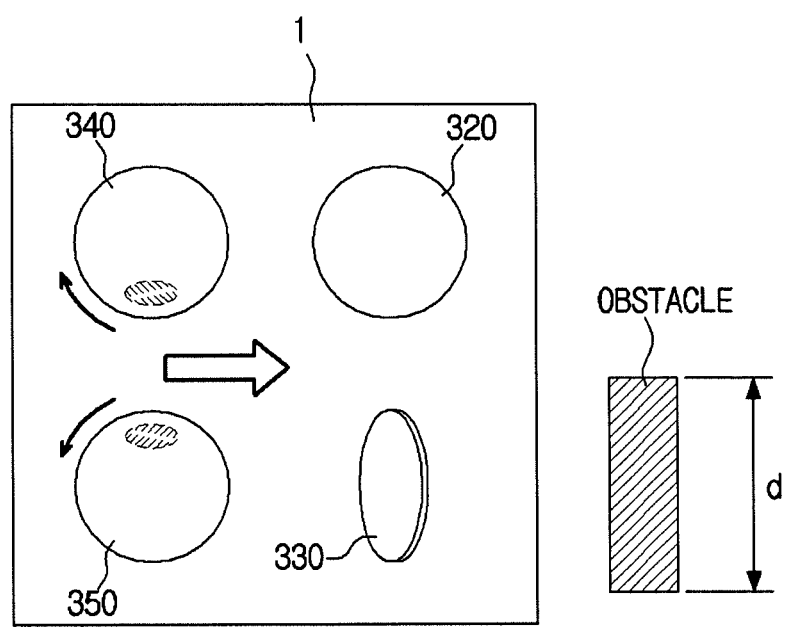
FIG. 45 is a view illustrating a climbing movement of the cleaning robot according to the yet another embodiment.
Figure 46:
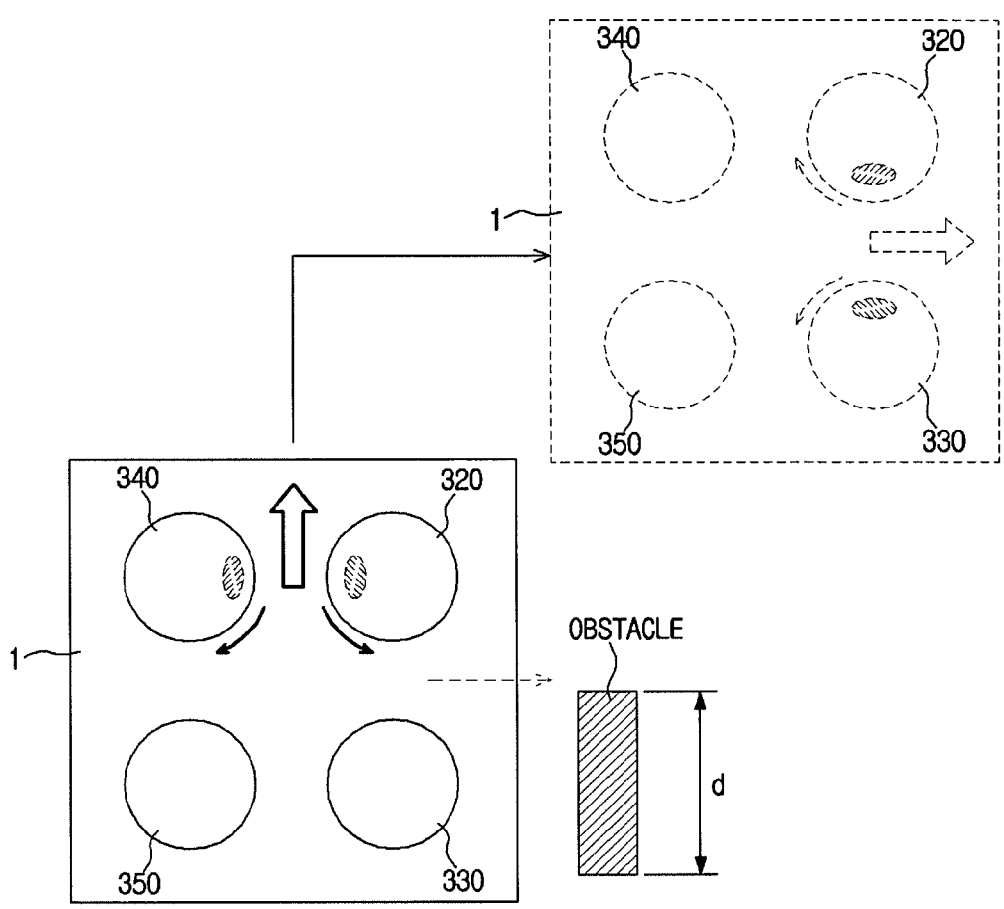
FIGS. 46 and 47 are views illustrating avoidance movements of the cleaning robot according to the yet another embodiment.

FIGS. 45 and 46 illustrate other embodiments of climbing movement of the cleaning robot.

Referring to FIG. 45, upon detection of an obstacle in the flat ground movement, the cleaning robot 1 determines the horizontal width of the obstacle. If the horizontal width is less than a reference width, the cleaning robot 1 determines the height of the obstacle. If the height is less than the second reference height, the cleaning robot 1 puts the second pad assembly 330 in a position that faces the obstacle and adjusts the slope of the rotating plate of only the second pad assembly 330 to an angle allowing for climbing.

With the tilting angles of the rotating plates of the third and fourth pad assemblies 340 and 350 adjusted such that inner parts of the pad members of the third and fourth pad assemblies 340 and 350 are in contact with the floor, the cleaning robot 1 rotates the rotating plate of the third pad assembly 340 in the first turning direction and rotates the rotating plate of the fourth pad assembly 350 in the second turning direction, enabling the main body to be moved toward the obstacle.

Referring to FIG. 46, upon detection of an obstacle in the flat ground movement, the cleaning robot 1 determines the horizontal width of the obstacle. If the horizontal width is less than a reference width, the cleaning robot 1 determines the height of the obstacle. If the height is greater than the second reference height, the cleaning robot 1 performs avoidance movement to move aside as much as the horizontal width of the obstacle.

With the tilting angles of the rotating plates of the first and third pad assemblies 320 and 340 adjusted such that inner parts of the pad members of the first and third pad assemblies 320 and 340 are in contact with the floor, the cleaning robot 1 rotates the rotating plate of the first pad assembly 320 in the second turning direction and rotates the rotating plate of the third pad assembly 340 in the first turning direction, enabling the main body to move aside to the left of the obstacle.

Having moved aside as much as the horizontal width of the obstacle, the cleaning robot 1 adjusts tilting angles of the first and second pad assemblies to have slopes allowing for movement, and then rotates the first pad assembly in the first turning direction while rotating the second pad assembly in the second turning direction, thereby producing frictional forces applied to the pad members of the first and second pad assemblies to enable the main body to move forward.

Figure 47:
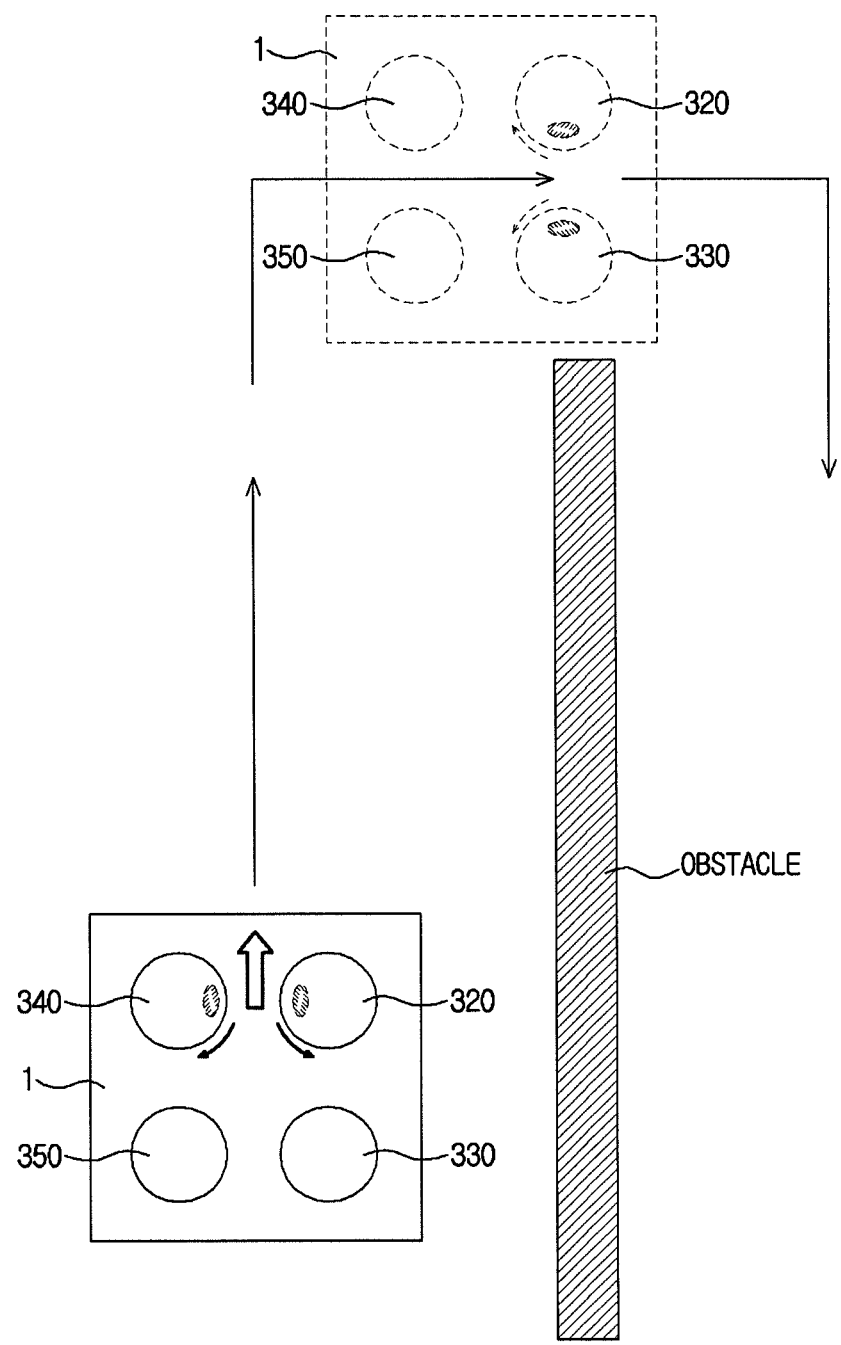

FIG. 47 illustrates avoidance movement of the cleaning robot.

Referring to FIG. 47, upon detection of an obstacle in the flat ground movement, the cleaning robot 1 determines if the height of the obstacle is greater than the second reference height. If it is determined that the height of the obstacle is greater than the second reference height, with the tilting angles of the rotating plates of the first and third pad assemblies 320 and 340 adjusted such that inner parts of the pad members of the first and third pad assemblies 320 and 340 are in contact with the floor, the cleaning robot 1 rotates the rotating plate of the first pad assembly 320 in the second turning direction and rotates the rotating plate of the third pad assembly 340 in the first turning direction, enabling the main body to move along the obstacle.

The cleaning robot 1 moves to a point where no obstacle is detected. The cleaning robot 1 then adjusts tilting angles of the first and second pad assemblies to have slopes allowing for movement, and rotates the first pad assembly in the first turning direction while rotating the second pad assembly in the second turning direction, thereby producing frictional forces applied to the pad members of the first and second pad assemblies to enable the main body to move forward.

FIGS. 48A to 48F illustrate other embodiments of climbing movement of the cleaning robot.

The cleaning robot detects an obstacle in the flat ground movement. The obstacle may have a width less than the length of the main body of the cleaning robot.

An example where the cleaning robot climbs up a stepped part with the first and second pad assemblies 320 and 330 will now be described. FIGS. 48A to 48F are side views of the moving cleaning robot, in which only the first and third pad assemblies are shown while the second and fourth pad assemblies are hidden.

Upon detection of an obstacle ahead, the cleaning robot determines the height and width of the obstacle. If determining that the height of the obstacle requires the cleaning robot to climb over, the cleaning robot determines whether the width of the obstacle is less than a certain width. If determining that the width is less than the certain width, the cleaning robot adjusts the tilting angles of the rotating plates of the first and second pad assemblies toward the vertical direction based on positions of the third and fourth assemblies.

Figure 48A:
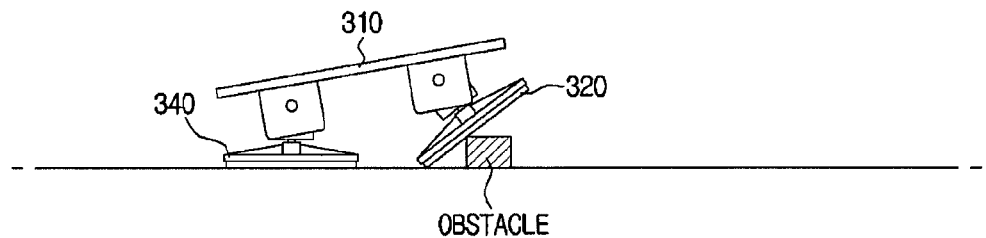
FIGS. 48A to 50D are views illustrating the cleaning robot according to the yet another embodiment, which climbs over a stepped part.

Referring to FIG. 48A, upon detection of an obstacle having a height requiring the cleaning robot to climb over and a width less than a certain width, the cleaning robot stops performing the flat ground movement and doing cleaning, adjusts the tilting angles of pad assemblies adjacent to the obstacle, i.e., the first and second pad assemblies 320 and 330 to angles allowing for climbing based on the height of the obstacle, and applies a movement force to the main body by using the third and fourth pad assemblies 340 and 350.

Figure 48B:
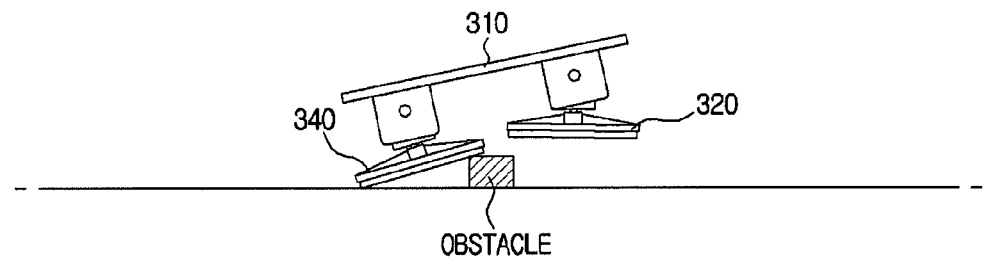
Figure 48C:
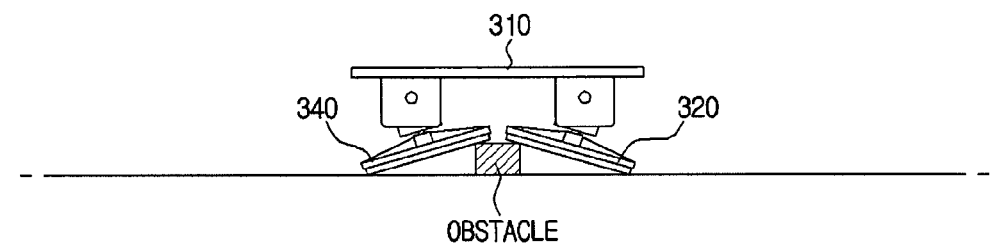

Referring to FIGS. 48B and 48C, even when the first and second pad assemblies 320 and 330 has moved onto the top of the obstacle along the edge, the cleaning robot 1 keeps moving the main body by frictional forces applied to the third and fourth pad assemblies 340 and 350.

In this regard, the cleaning robot adjusts the angles of the rotating plates of the third and fourth pad assemblies 340 and 350 toward the vertical direction if the pad members of the third and fourth pad assemblies 340 and 350 are being lifted off the floor and adjusts the angles of the rotating plates of the first and second pad assemblies 320 and 330 to angles allowing for descending if the third and fourth pad assemblies 340 and 350 come into contact with the obstacle, thereby directing the rotating plates of the first and second pad assemblies 320 and 330 to the floor.

Determining whether the pad members of the third and fourth pad assemblies 340 and 350 is being lifted off the floor is based on amounts of load of the rotating plates of the third and fourth pad assemblies 340 and 350.

Even while doing these operations, the cleaning robot 1 keeps rotating the rotating plates of the third and fourth pad assemblies 340 and 350, thereby producing frictional forces between the pad members of the third and fourth pad assemblies 340 and 350 and the floor, enabling the main body to move over the top of the obstacle.

Figure 48D:
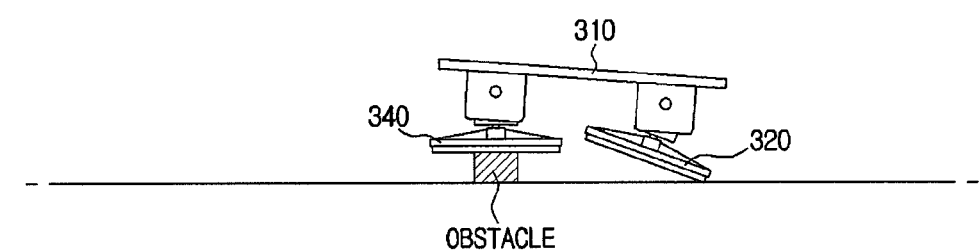

Referring to FIG. 48D, if determining that the pad members of the third and fourth pad assemblies 340 and 350 are located on the top of the obstacle, the cleaning robot adjusts the angles of the rotating plates of the first and second pad assemblies toward the vertical direction such that the first and second pad assemblies 320 and 330 are in contact with the floor. Even while doing this operation, the cleaning robot keeps rotating the rotating plates of the third and fourth pad assemblies 340 and 350, thus enabling the main body to move forward.

Figure 48E:
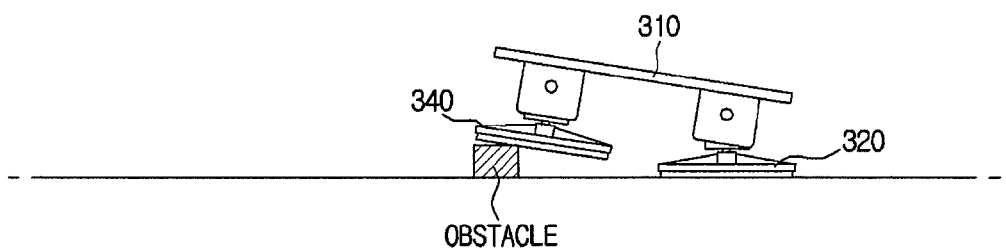
Figure 48F:
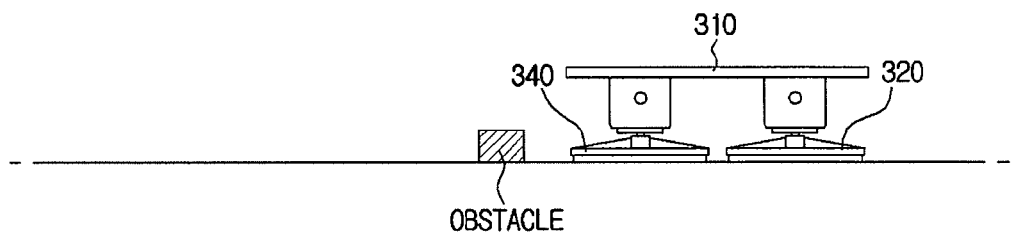

Referring to FIGS. 48E and 48F, if determining that the pad members of the third and fourth pad assemblies 340 and 350 make contact with a corner of the obstacle (i.e., descending edge), the cleaning robot adjusts the angles of the rotating plates of the third and fourth pad assemblies 340 and 350 toward the vertical direction and rotates the first pad assembly 320 in the first turning direction while rotating the second pad assembly 330 in the second turning direction, thereby enabling the main body to move forward by frictional forces applied to the pad members of the first and second pad assemblies 320 and 330.

Determining whether the pad members of the third and fourth pad assemblies 340 and 350 make contact with a corner of the obstacle is based on amounts of load of the rotating plates of the third and fourth pad assemblies 340 and 350.

Furthermore, the cleaning robot adjusts the angles of the rotating plates of the pad members of the third and fourth pad assemblies 340 and 350 toward the vertical direction such that the entire area of the pad members are in contact with the floor, if it is determined that the pad members get out of the obstacle.

As such, even if an obstacle is narrower than a certain width, the cleaning robot may stably climb over the obstacle by systematically adjusting the angles of the pad assemblies adjacent to the obstacle and the remaining pad assemblies distant from the obstacle.

Figure 49A:
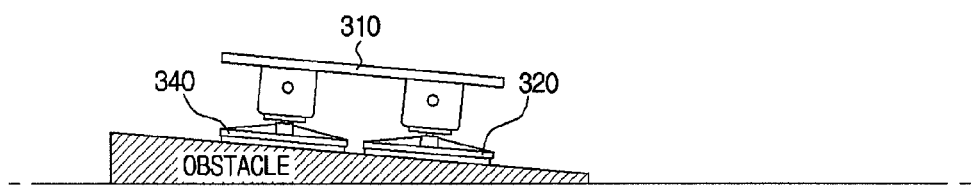
Figure 49B:
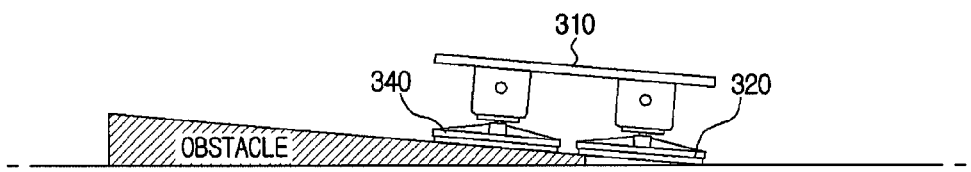
Figure 49C:
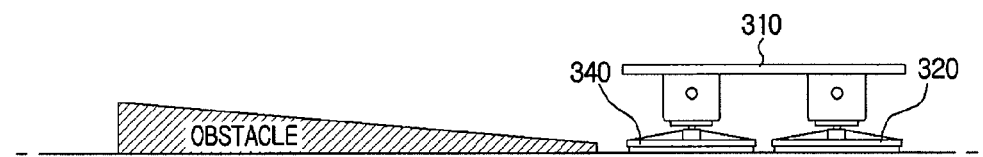

FIGS. 49A to 49C illustrate another embodiment of climbing movement of the cleaning robot.

Assuming that a descending height of an obstacle is less than a certain height, climbing movement of the cleaning robot will now be described.

Referring to FIGS. 49A and 49B, upon detection of a stepped part while moving on the floor or on the top of an obstacle, the cleaning robot determines the height of the stepped part. If determining that the height of the stepped part is less than a certain height, the cleaning robot moves downward on the obstacle by frictional forces of the pad members of the first and second pad assemblies 320 and 330 while maintaining the angles of the rotating plates of the first and second pad assemblies.

Even while the pad members of the first and second pad assemblies 320 and 330 are in contact with the floor, the cleaning robot moves downward on the obstacle (i.e., down to the floor) by frictional forces of the first and second pad assemblies 320 and 330 while maintaining the angles of the rotating plates of the third and fourth pad assemblies 340 and 350.

At this time, it is also possible for the cleaning robot to move downward on the obstacle by the frictional forces of the pad members of the third and fourth pad assemblies 340 and 350 or by the frictional forces of the pad members of all the four pad assemblies 320, 330, 340, and 350.

Referring to FIG. 49C, if the height of the obstacle is less than a certain height, the cleaning robot slides down to the floor while maintaining the angles of the rotating plates of the four pad assemblies 320, 330, 340, and 350.

After arriving at the floor, the cleaning robot may move around while maintaining the angles of the rotating plates of the four pad assemblies 320, 330, 340, and 350.

FIGS. 50A to 50D illustrate yet another embodiment of climbing movement of the cleaning robot.

Assuming that a descending height of an obstacle is greater than a certain height, climbing movement of the cleaning robot will now be described.

Figure 50A:
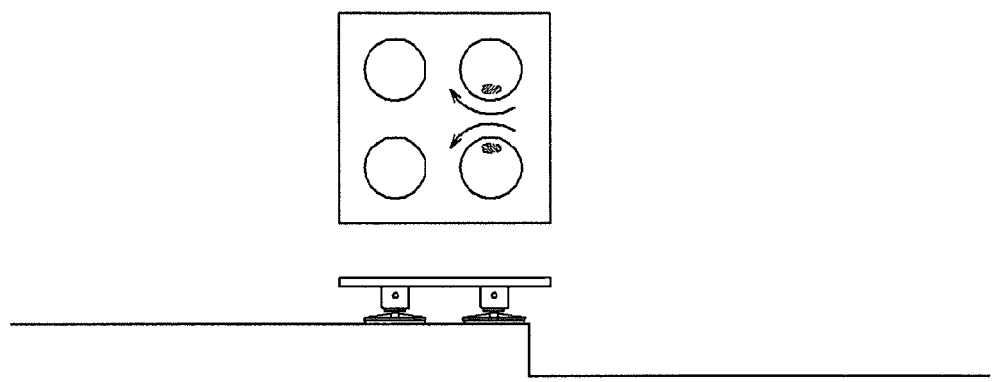

Referring to FIG. 50A, the cleaning robot detects a stepped part while moving around on a flat floor by frictional forces applied to the first and second pad assemblies, determines whether the stepped part leads to a surface lower than the floor, and determines whether the height of the stepped part is greater than a certain height if it is determined that the stepped part leads to a surface lower than the floor.

If determining that the stepped part is higher than the certain height, the cleaning robot adjusts a tilting angle (or slope) of a pad assembly arranged in the front.

The slope of the pad assembly to be adjusted when the stepped part leads to a surface lower than the floor is in opposite direction of the slope to be adjusted when the stepped part leads to a surface higher than the floor.

Figure 50B:
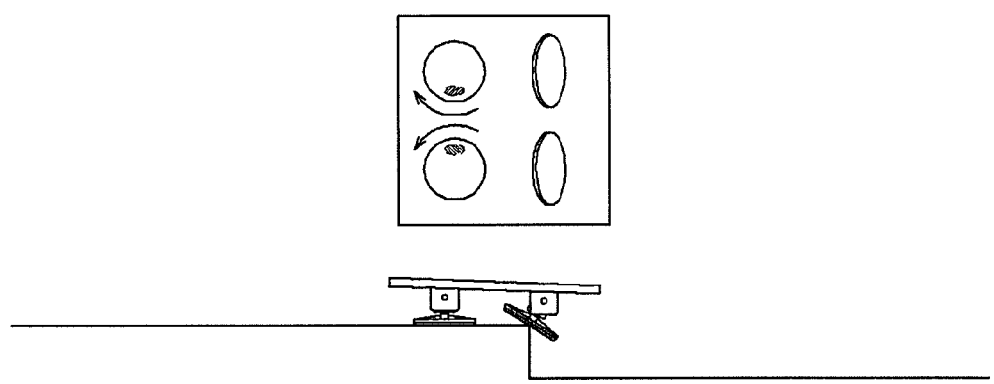

Referring to FIG. 50B, the cleaning robot adjusts the tilting angles of the first and second pad assemblies 320 and 330 to angles allowing the cleaning robot to climb the stepped part down to the floor, and moves the main body by frictional forces applied to the third and fourth pad assemblies 340 and 350.

Accordingly, the cleaning robot enables the first and second pad assemblies 320 and 330 to move along the edge of the stepped part.

Figure 50C:
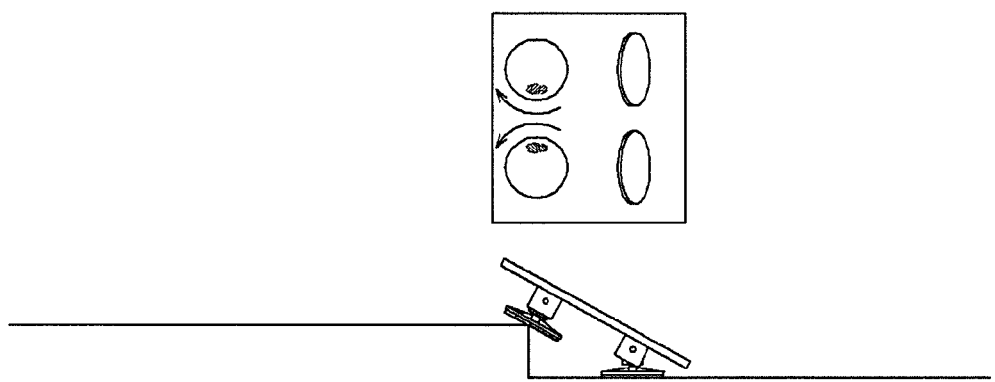

Referring to FIG. 50C, when the third and fourth pad assemblies 340 and 350 come into contact with a corner, the cleaning robot adjusts the angles of the rotating plates of the third and fourth pad assemblies 340 and 350 toward the vertical direction such that the third and fourth pad assemblies 340 and 350 may move down to the floor along the edge of the stepped part.

Determination of whether a pad assembly comes into contact with the stepped part is made based on an amount of load applied to the pad assembly.

Alternatively, determination of whether a pad assembly comes into contact with the stepped part is made based on a signal detected by the obstacle detector.

Then, the cleaning robot adjusts angles of the rotating plates of the first and second pad assemblies 320 and 330 such that the pad members of the first and second pad assemblies 320 and 330 are in contact with the floor.

Specifically, the cleaning robot adjusts angles of the rotating plates of the first and second pad assemblies 320 and 330 such that the pad members of the first and second pad assemblies 320 and 330 are in contact with the floor, if determining that the first and second pad assemblies 320 and 330 get out of the edge of the stepped part.

The cleaning robot moves forward by frictional forces of the pad members of the first and second pad assemblies 320 and 330.

Figure 50D:
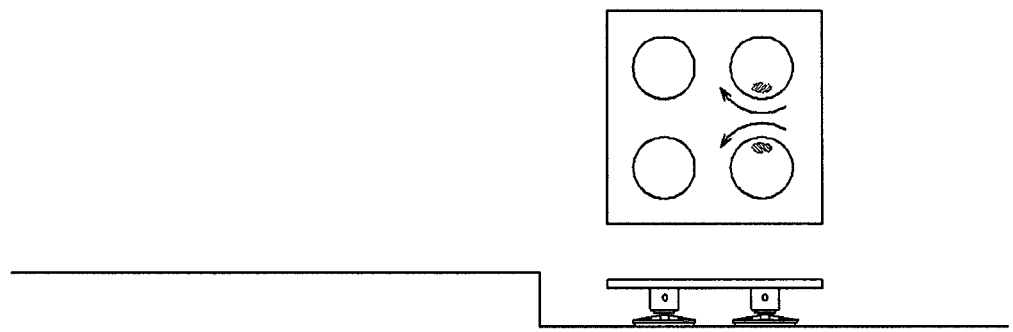

Referring to FIG. 50D, when the third and fourth pad assemblies 340 and 350 get out of the edge of the stepped part, the cleaning robot adjusts the angles of the rotating plates of the third and fourth pad assemblies 340 and 350 toward the vertical direction such that the third and fourth pad assemblies 340 and 350 are in contact with the floor.

With these operations, the cleaning robot may climb over the stepped part down to the floor.

As such, with systematic adjustment of tilting angles of rotating plates of respective pad assemblies, the cleaning robot may stably climb over an obstacle.

Although the embodiments of the present disclosure have been shown and described, it would be appreciated by those skilled in the art that changes may be made in the embodiment without departing from the principles and spirit of the invention, the scope of which is defined in the claims and their equivalents.

What is claimed is:

1. A method for controlling a cleaning robot, the method comprising:
    determining a target position;
    determining slopes and turning directions of a plurality of pad assemblies mounted on the bottom of a main body of the cleaning robot, based on the target position;
    controlling the plurality of pad assemblies to have the determined slopes and rotate in the determined turning directions, thus enabling the main body to move to the target position in a flat ground movement mode;
    detecting an obstacle in the flat ground movement mode;
    controlling the slope of at least one of the plurality of pad assemblies based on the height of the detected obstacle; and
    adjusting positions and directions to which frictional forces applied to remaining pad assemblies are applied, thereby enabling the main body to move along the obstacle.

2. The method according to claim 1, wherein the slope of the at least one pad assembly is greater than any of the slopes of the remaining pad assemblies.

3. The method according to claim 1, wherein detecting an obstacle comprises:
    capturing an image in front of the cleaning robot; and
    recognizing an obstacle from the captured image.

4. The method according to claim 1, wherein detecting an obstacle comprises:
    detecting amounts of load applied to the plurality of pad assemblies; and
    recognizing an obstacle based on the detected amounts of load.

5. The method according to claim 1, further comprising performing avoidance movement when the height of the obstacle exceeds a reference height.

6. The method according to claim 5, wherein performing avoidance movement comprises changing a moving direction by individually adjusting positions and directions to which frictional forces applied to the plurality of pad assemblies are applied.

7. The method according to claim 1, wherein controlling the slope of at least one of the plurality of pad assemblies comprises controlling the at least one pad assembly to have a predetermined maximum tilting angle.

8. The method according to claim 1, wherein controlling the slope of at least one of the plurality of pad assemblies comprises:
    determining the height of a stepped part;
    determining an angle that corresponds to the height of the stepped part; and
    controlling the at least one pad assembly to have the determined angle.

9. The method according to claim 1, further comprising controlling rotation of the at least one pad assembly such that a frictional force is applied to the at least one pad assembly, when the at least one pad assembly is located on the top of the stepped part.

10. A cleaning robot comprising:
    a main body;
    a plurality of pad assemblies mounted on the bottom of the main body for doing cleaning;
    a drive assembly for applying drive power for each of the plurality of pad assemblies; and
    a detection unit for detecting an obstacle,
    wherein the drive assembly adjusts slopes of the plurality of pad assemblies individually based on the height of the obstacle.

11. The cleaning robot according to claim 10, wherein the drive assembly adjusts a tilting angle of at least one pad assembly toward a vertical direction based on the horizontal width of the obstacle.

12. The cleaning robot according to claim 11, wherein the tilting angle toward the vertical direction is greater than a tilting angle of a pad assembly for flat ground movement.

13. The cleaning robot according to claim 10, wherein the detection unit includes an image capturer for capturing an image of a cleaning region, and
    wherein the drive assembly recognizes an obstacle based on the captured image and determines the height of the obstacle.

14. The cleaning robot according to claim 10, wherein the detection unit includes:
    a first detector for detecting whether there is an obstacle; and
    a second detector for detecting the height of the obstacle.

15. The cleaning robot according to claim 14, wherein the first detector comprises a load detector for detecting an amount of load applied to the pad assembly.

16. The cleaning robot according to claim 14, wherein the second detector comprises an infrared (IR) sensor, a laser sensor, or an ultrasonic sensor.

17. The cleaning robot according to claim 10, wherein the drive assembly performs avoidance movement when the height of the obstacle exceeds a reference height.

18. The cleaning robot according to claim 17, wherein the drive assembly changes a moving direction by individually adjusting positions and directions to which frictional forces applied to the plurality of pad assemblies are applied.

19. The cleaning robot according to claim 10, wherein the drive assembly adjusts the tilting angle of a pad assembly adjacent to the obstacle to a certain angle when the height of the obstacle is less than a reference height and individually adjusts positions and directions to which frictional forces applied to the remaining pad assemblies are applied, thereby applying a movement force to the main body.

20. A cleaning robot comprising:
    a main body;
    a plurality of pad assemblies mounted on the bottom of the main body for doing cleaning;
    a drive assembly for applying drive power for each of the plurality of pad assemblies; and
    a detection unit for detecting a stepped part,
    wherein the drive assembly adjusts the slope of at least one pad assembly based on the height of the stepped part and adjusts positions and directions to which frictional forces applied to the remaining pad assemblies are applied, thereby enabling the main body to move along the stepped part.

21. The cleaning robot according to claim 20, wherein the drive assembly adjusts a tilting angle of the at least one pad assembly to a predetermined maximum tilting angle.

22. The cleaning robot according to claim 20, wherein the drive assembly adjusts a tilting angle of the at least one pad assembly to an angle that corresponds to the height of the stepped part.

23. The cleaning robot according to claim 20, wherein the drive assembly controls rotation of the at least one pad assembly such that a frictional force is applied to the at least one pad assembly, when the at least one pad assembly is located on the top of the stepped part.

24. The cleaning robot according to claim 20, wherein the drive assembly adjusts a tilting direction of the at least one pad assembly to a first direction when the stepped part leads to a surface higher than a floor, and to a second direction when the stepped part leads to a surface lower than the floor, the first and second directions being opposite to each other.

25. The cleaning robot according to claim 20, wherein the drive assembly controls the plurality of pad assemblies to avoid the stepped part, when the height of the stepped part is greater than a reference height.

* * * * *